US012140415B2

(12) United States Patent
Nakano et al.

(10) Patent No.: US 12,140,415 B2
(45) Date of Patent: Nov. 12, 2024

(54) IMAGE ANALYSIS DEVICE, ANALYIS DEVICE, SHAPE MEASUREMENT DEVICE, IMAGE ANALYSIS METHOD, MEASUREMENT CONDITION DETERMINATION METHOD, SHAPE MEASUREMENT METHOD, AND PROGRAM

(71) Applicant: NIKON CORPORATION, Tokyo (JP)

(72) Inventors: Sumito Nakano, Kitamoto (JP); Makoto Kondo, Fujisawa (JP)

(73) Assignee: NIKON CORPORATION, Tokyo (JP)

( * ) Notice: Subject to any disclaimer, the term of this patent is extended or adjusted under 35 U.S.C. 154(b) by 52 days.

(21) Appl. No.: 16/976,054

(22) PCT Filed: Feb. 27, 2018

(86) PCT No.: PCT/JP2018/007381
§ 371 (c)(1),
(2) Date: Nov. 23, 2020

(87) PCT Pub. No.: WO2019/167150
PCT Pub. Date: Sep. 6, 2019

(65) Prior Publication Data
US 2021/0072019 A1 Mar. 11, 2021

(51) Int. Cl.
G01B 11/24 (2006.01)
G01B 11/14 (2006.01)
G01B 11/25 (2006.01)

(52) U.S. Cl.
CPC .......... *G01B 11/24* (2013.01); *G01B 11/2416* (2013.01); *G01B 11/2518* (2013.01); *G01B 11/254* (2013.01); *G01B 11/14* (2013.01)

(58) Field of Classification Search
CPC ....... G01B 11/14; G01B 11/16; G01B 11/167; G01B 11/22; G01B 11/24; G01B 11/2408;
(Continued)

(56) References Cited

U.S. PATENT DOCUMENTS 10,192,300 B2  1/2019  Amano et al.
2006/0256341 A1  11/2006  Kuwada
(Continued)

FOREIGN PATENT DOCUMENTS

CN  105190228 A  * 12/2015  ............. G01B 11/24
CN  105473979 A  4/2016
(Continued)

OTHER PUBLICATIONS

JP 2014-106099 A—An English language abstract of this document is enclosed. This document also corresponds to U.S. 2014/0146325 A1.
(Continued)

Primary Examiner — Gordon J Stock, Jr.
(74) Attorney, Agent, or Firm — Finnegan, Henderson, Farabow, Garrett & Dunner, L.L.P.

(57) ABSTRACT

A measurement condition that enables accurate shape measurement can be set easily. An image analysis device includes an image analyzer 83 configured to detect, in a case of capturing an image of light projected onto an object to be measured, an improper image for shape measurement of the object to be measured, on the basis of design information on the object to be measured, and a measurement condition, and an output unit 88 configured to output detection result information that is information based on a detection result of the image analyzer 83.

39 Claims, 30 Drawing Sheets

(58) Field of Classification Search
CPC ............ G01B 11/2416; G01B 11/2425; G01B 11/2433; G01B 11/2441; G01B 11/245; G01B 11/25; G01B 11/2504; G01B 11/2509; G01B 11/2513; G01B 11/2518; G01B 11/2522; G01B 11/2527; G01B 11/2531; G01B 11/2536; G01B 11/254; G01B 11/2545; G01B 11/255; G01B 11/30; G01B 11/303; G01B 11/306; G01B 9/08

See application file for complete search history.

(56) References Cited

U.S. PATENT DOCUMENTS

| | | | |
|---|---|---|---|
| 2010/0165346 A1 | 7/2010 | Wang et al. | |
| 2011/0157353 A1* | 6/2011 | Takayama | G01C 11/26 348/135 |
| 2014/0146324 A1 | 5/2014 | Lim et al. | |
| 2014/0146325 A1 | 5/2014 | Tabuchi | |
| 2015/0276383 A1 | 10/2015 | Yoshikawa et al. | |
| 2016/0161250 A1* | 6/2016 | Nakamura | G01B 11/2513 356/610 |
| 2016/0203592 A1 | 7/2016 | Amano et al. | |
| 2017/0038315 A1 | 2/2017 | Sasaki | |
| 2017/0132784 A1* | 5/2017 | Yamada | G06V 40/20 |
| 2019/0049233 A1* | 2/2019 | Mies | G01B 11/26 |

FOREIGN PATENT DOCUMENTS

| | | | |
|---|---|---|---|
| DE | 102015104732 A1 | 10/2015 | |
| JP | 8-314997 A | 11/1996 | |
| JP | 2006-170908 A | 6/2006 | |
| JP | 2010-256253 A | 11/2010 | |
| JP | 2013-037431 A | 2/2013 | |
| JP | 2014-055815 A | 3/2014 | |
| JP | 2014-092491 A | 5/2014 | |
| JP | 2014-106099 A | 6/2014 | |
| JP | 2014-134389 A | 7/2014 | |
| JP | 2014-145735 A | 8/2014 | |
| JP | 2015-068654 A | 4/2015 | |
| JP | 2015-132509 A | 7/2015 | |
| JP | 2015-197312 A | 11/2015 | |
| JP | 2016-200607 A | 12/2016 | |
| JP | 2017-032521 A | 2/2017 | |
| JP | 2017-173063 A | 9/2017 | |
| TW | 201024713 A | 7/2010 | |
| WO | WO-2015008820 A1 * | 1/2015 | ......... G01B 11/2416 |
| WO | WO 2015/025403 A1 | 2/2015 | |
| WO | WO-2015189985 A1 * | 12/2015 | ......... G01B 11/2416 |
| WO | WO 2017/163476 A1 | 9/2017 | |
| WO | WO-2017162777 A1 * | 9/2017 | ........... G01B 11/245 |
| WO | WO 2017/199691 A1 | 11/2017 | |

OTHER PUBLICATIONS

JP 2014-145735 A—An English language abstract of this document is enclosed.

JP 2015-197312 A—An English language abstract of this document is enclosed. This document also corresponds to U.S. 2015/0276383 A1.

JP 2017-173063 A—An English language abstract of this document is enclosed.

WO 2017/163476 A1—An English language abstract of this document is enclosed.

DE 102015104732 A1—An English language abstract of this document is enclosed.

TW 201024713 A—An English language abstract of this document is enclosed. This document also corresponds to U.S. 2010/0165346 A1.

JP 2015-68654—An English language abstract of this document is enclosed.

Written Opinion of the International Searching Authority dated Apr. 24, 2018, in the corresponding PCT International Application No. PCT/JP2018/007381. (7 pages).

International Search Report dated Apr. 24, 2018, in the corresponding PCT International Application.

Extended European Search Report issued by the European Patent Office in counterpart European Patent Application No. 18907727.4, dated Sep. 8, 2021.

Office Action issued by the Japanese Office on Aug. 2, 2022 in counterpart Japanese Patent Application No. 2020-503145, and computer-generated English Translation thereof.

Office Action issued by the Japanese Patent Office and mailed on Mar. 7, 2023 in counterpart Japanese Patent Application No. 2020-503145, and English Translation thereof.

Computer-generated English translation of JP 2014-134389 A, 2014.

Office Action issued by the European Patent Office and mailed on Aug. 3, 2023 in counterpart European Patent Application No. 18 907 727.4.

Office Action issued by the China National Intellectual Property Administration on Jan. 19, 2023 in counterpart Chinese Patent Application No. 201880092731.X, and English Translation thereof.

Patent Search Report issued by the China National Intellectual Property Administration on Jan. 11, 2023 in counterpart Chinese Patent Application No. 201880092731.X, and English Translation thereof.

Office Action issued by the Patent Office of the People's Republic of China and mailed on Jun. 28, 2023 in counterpart Chinese Patent Application No. 201880092731.X.

Computer-generated English translation of JP 2014-145735 A, 2014.

Office Action issued by the Japanese Patent Office on Sep. 10, 2024, in counterpart Japanese Patent Application No. 2023-176918, and English Translation thereof.

* cited by examiner

IMAGE ANALYSIS DEVICE, ANALYIS DEVICE, SHAPE MEASUREMENT DEVICE, IMAGE ANALYSIS METHOD, MEASUREMENT CONDITION DETERMINATION METHOD, SHAPE MEASUREMENT METHOD, AND PROGRAM

CROSS-REFERENCE TO RELATED APPLICATIONS

This application is a U.S. national phase entry of International Application No. PCT/JP2018/007381 which was filed on Feb. 27, 2018, the disclosure of which is incorporated herein by reference in its entirety.

TECHNICAL FIELD

The present disclosure relates to an image analysis device, an analysis device, a shape measurement device, an image analysis method, a measurement condition determination method, a shape measurement method, and a program stored in a non-transitory computer readable medium.

BACKGROUND ART

For example, a publicly known shape measurement device includes an irradiator that projects measurement light onto an object to be measured, and an imager that captures an image of the measurement light projected onto the object to be measured and outputs image data, and the shape measurement device measures a shape of the object on the basis of a position of the image of the measurement light in the image data by using an optical cutting method (for example, see JP 2015-68654 A). The image of the measurement light captured by the imager changes depending on a measurement condition such as a relative position of the imager with respect to the object to be measured. Accordingly, in imaging the measurement light, the measurement condition is set in advance, and the imaging is performed. Then, there is a demand to easily set a measurement condition that enables accurate shape measurement.

SUMMARY

According to a first aspect of the present disclosure, an image analysis device includes an image analyzer configured to detect, in a case of capturing an image of light projected onto an object to be measured, an improper image for shape measurement of the object to be measured, based on design information on the object to be measured, and a measurement condition, and an output unit configured to output detection result information that is information based on a detection result of the image analyzer.

According to a second aspect of the present disclosure, an analysis device includes the image analysis device according to the first aspect, and a display configured to display the detection result information.

According to a third aspect of the present disclosure, a shape measurement device includes the analysis device according to the second aspect, an input unit configured to receive an input from an operator, an optical probe including a projector configured to project measurement light onto the object to be measured, and an imager configured to capture an image of the measurement light projected onto the object to be measured, and a condition setting unit configured to set the measurement condition by an input to the input unit.

According to a fourth aspect of the present disclosure, an image analysis method includes an image analysis step of detecting, in a case of capturing an image of light projected onto an object to be measured, an improper image for shape measurement of the object to be measured, based on design information on the object to be measured, and a measurement condition, and an output step of outputting detection result information that is information based on a detection result at the image analysis step.

According to a fifth aspect of the present disclosure, a measurement condition determination method includes the image analysis method according to the third aspect, and a measurement condition determination step of determining the measurement condition based on the detection result information output at the output step.

According to a sixth aspect of the present disclosure, a shape measurement method includes the measurement condition determination method according to the third aspect, and a shape measurement step of performing shape measurement of the object to be measured under the measurement condition determined at the measurement condition determination step.

According to a sixth aspect of the disclosure, a program causes a computer to execute the image analysis method according to the fourth aspect.

DESCRIPTION OF EMBODIMENTS

Hereinafter, embodiments of the present disclosure will be described in detail with reference to the drawings. Additionally, components in the embodiments described below include components that easily conceivable by a person skilled in the art, substantially the same components, and components in a so-called equivalent range. Further, the components disclosed in the embodiments described below can be combined as appropriate.

In the following description, an XYZ orthogonal coordinate system is set, and positional relationships between units will be described with reference to this XYZ orthogonal coordinate system. The Z-axis direction is set, for example, as the vertical direction, and the X-axis direction and the Y-axis direction are set, for example, as the directions that are parallel to the horizontal direction and orthogonal to each other. Additionally, the rotation (inclination) directions about the X-axis, the Y-axis, and the Z-axis are defined as the OX, OY, and OZ directions, respectively.

First Embodiment

Figure 1:
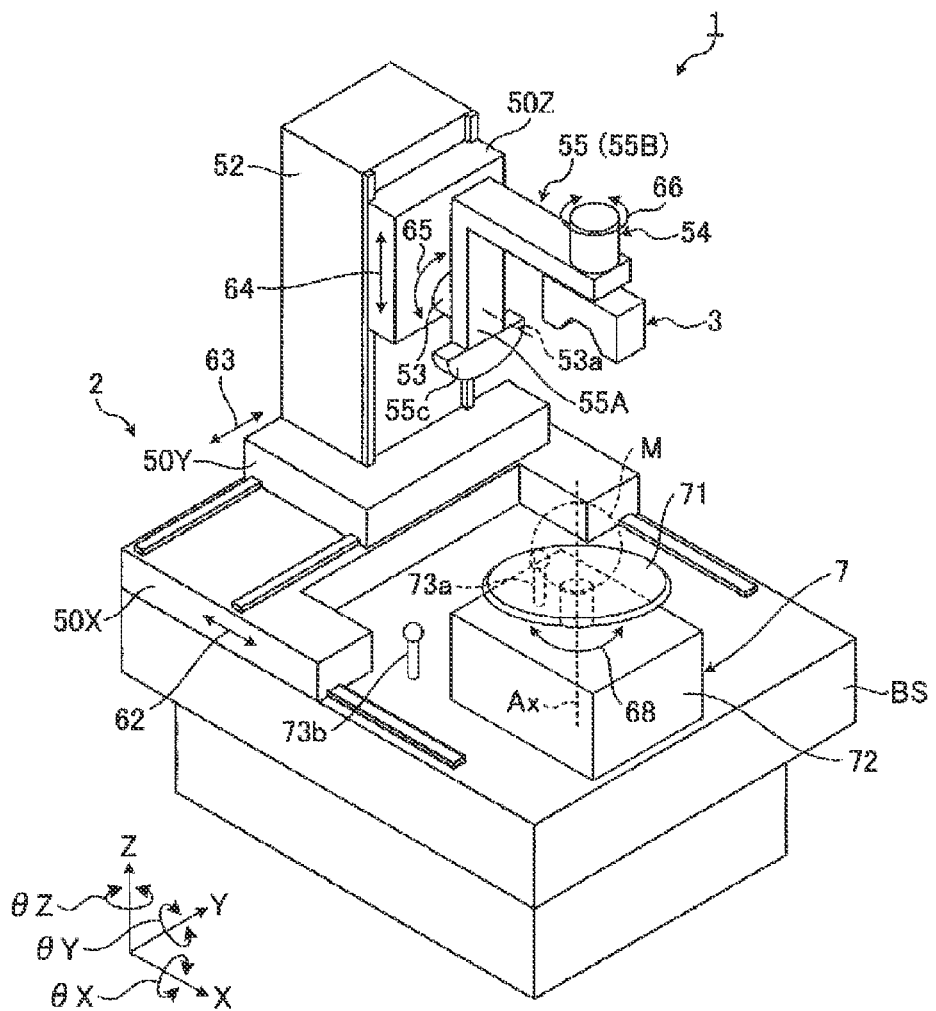
FIG. 1 is a view illustrating appearance of a shape measurement device according to a first embodiment.
Figure 2:
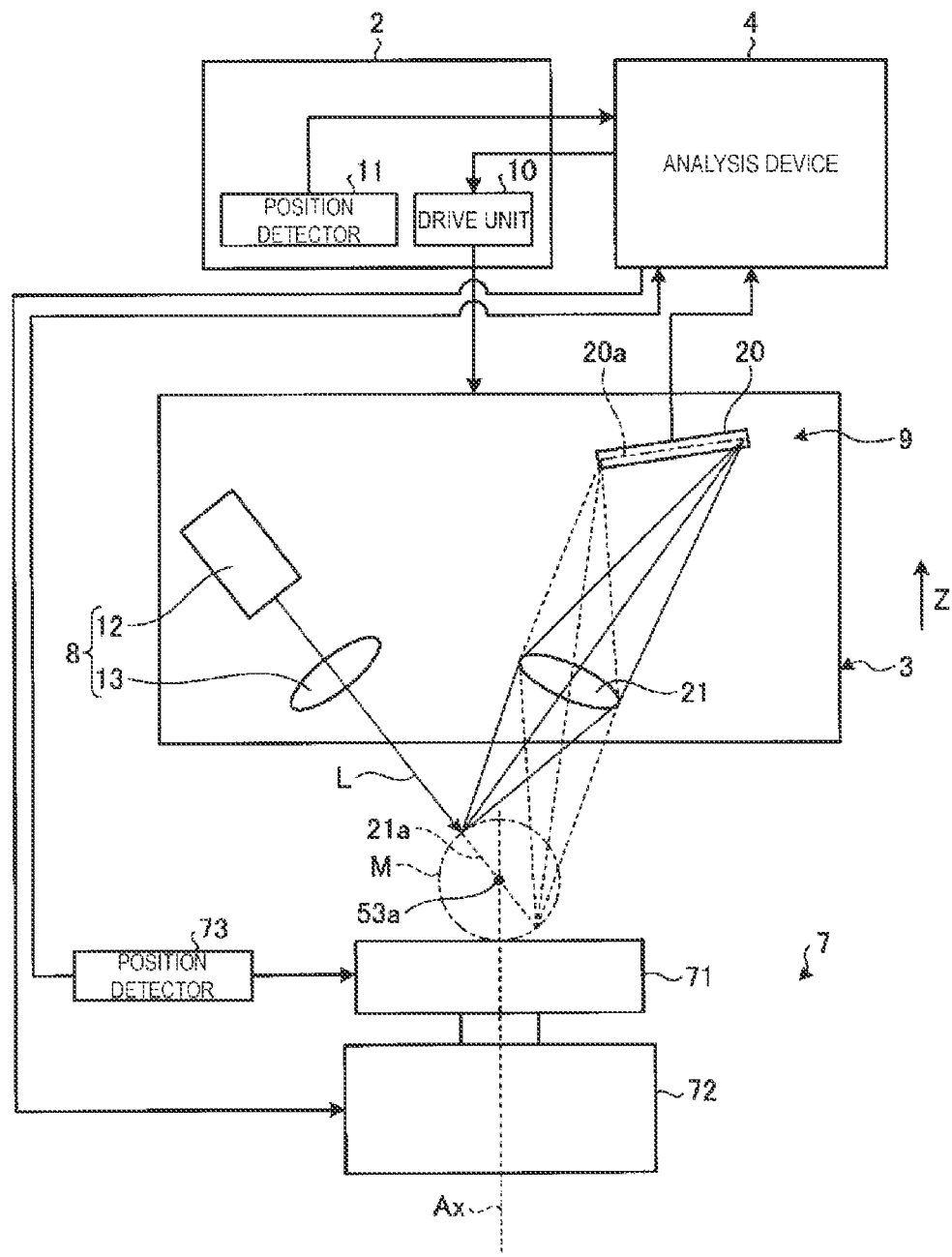
FIG. 2 is a schematic view illustrating a schematic configuration of the shape measurement device according to the present embodiment.

FIG. 1 is a view illustrating appearance of a shape measurement device 1 according to a first embodiment. FIG. 2 is a schematic view illustrating a schematic configuration of the shape measurement device 1 according to the present embodiment.

The shape measurement device 1 measures a three-dimensional shape of an object to be measured (an object to be measured M) by using an optical cutting method, for example. The shape measurement device 1 includes a probe movement device 2, an optical probe 3, an analysis device 4, and a holding/rotating device 7. The shape measurement device 1 includes the optical probe 3 that images the object to be measured M held by a holding/rotating device 7 provided in a base BS. Additionally, in the present embodiment, the probe movement device 2 and the holding/rotating device 7 constitute a movement mechanism that relatively moves the optical probe 3 and the object to be measured M.

The probe movement device 2 functions to adjust a relative position and a relative attitude of the object to be measured M and the optical probe 3 by moving the optical probe 3.

The relative position refers to a position of the optical probe 3 with respect to the object to be measured M, in other words, a relative position of the object to be measured M and the optical probe 3. The relative position changes in a case where a position (coordinates) of a device provided in the optical probe 3 changes in at least one of the X-axis direction, the Y-axis direction, and the Z-axis direction with respect to a position (coordinates) of the object to be measured M.

The relative attitude or relative orientation refers to a relative angle of the optical probe 3 with respect to the object to be measured M, in other words, a relative attitude (relative angle) of the object to be measured M and the optical probe 3. The relative attitude changes in a case where an attitude of a device provided in the optical probe 3 changes in at least one of the OX axis direction, the OY axis direction, and the OZ axis direction with respect to an attitude of the object to be measured M.

Note that the optical probe 3 includes a projector 8 and an imager 9 described below. Accordingly, the relative position of the object to be measured M and the optical probe 3 can also be considered to be a relative position of the object to be measured M and the projector 8, or a relative position of the object to be measured M and the imager 9. Similarly, the relative attitude of the object to be measured M and the optical probe 3 can also be considered to be a relative attitude of the object to be measured M and the projector 8, or a relative attitude of the object to be measured M and the imager 9. Additionally, the object to be measured M is disposed on a table 71 as described below. Accordingly, the relative position of the object to be measured M and the optical probe 3 can also be considered to be a relative position of the table 71 and the optical probe 3, a relative position of the table 71 and the projector 8, or a relative position of the table 71 and the imager 9. Similarly, the relative attitude of the object to be measured M and the optical probe 3 can also be considered to be a relative attitude of the table 71 and the optical probe, a relative attitude of the table 71 and the projector 8, or a relative attitude of the table 71 and the imager 9.

As illustrated in FIG. 2, the probe movement device 2 includes a drive unit 10 and a position detection unit 11. The drive unit 10 includes an X movement portion 50X, a Y movement portion 50Y, a Z movement portion 50Z, a first rotation portion 53, and a second rotation portion 54.

The X movement portion 50X is provided to be movable in the direction of an arrow 62, i.e., in the X-axis direction with respect to the base BS. The X movement portion 50X moves the optical probe 3 in the X-axis direction to change the relative position along the X-axis direction of the optical probe 3 and the object to be measured M. The Y movement portion 50Y is provided to be movable in the direction of an arrow 63, i.e., in the Y-axis direction with respect to the X movement portion 50X. The Y movement portion 50Y moves the optical probe 3 in the Y-axis direction to change the relative position along the Y-axis direction of the optical probe 3 and the object to be measured M. The Y movement portion 50Y is provided with a holding body 52 extending in the Z-axis direction. The Z movement portion 50Z is provided to be movable in the direction of an arrow 64, i.e., in the Z-axis direction with respect to the holding body 52. The Z movement portion 50Z moves the optical probe 3 in the Z-axis direction to change the relative position along the Z axis direction of the optical probe 3 and the object to be measured M. The X movement portion 50X, the Y movement portion 50Y, and the Z movement portion 50Z constitute a movement mechanism that enables the optical probe 3 to move in the X-axis direction, the Y-axis direction, and the Z-axis direction, and change the relative position of the optical probe 3 and the object to be measured M. The X movement portion 50X, the Y movement portion 50Y, and the Z movement portion 50Z move the optical probe 3 to change at least one of the relative position of the object to be measured M and the projector 8 described below, and the relative position of the object to be measured M and the imager 9 described below.

In this manner, in the present embodiment, the X movement portion 50X and the Y movement portion 50Y and the Z movement portion 50Z move the optical probe 3 to change the relative position of the object to be measured M and the optical probe 3. However, the shape measurement device 1 may move the object to be measured M in at least one of the X-axis direction, the Y-axis direction, and the Z-axis direction to change the relative position of the object to be measured M and the optical probe 3.

The first rotation portion 53 rotates the optical probe 3 supported by a holding member (holding portion) 55 described below around a rotation axis line (rotation axis) 53a that is parallel to the X axis, i.e., in the direction of an arrow 65 to change the attitude of the optical probe 3. That is, the first rotation portion 53 changes the relative attitude of the optical probe 3 and the object to be measured M. The second rotation portion 54 rotates the optical probe 3 supported by the holding member 55 around an axis that is parallel to the direction in which a first holding portion 55A described below extends, i.e., in the direction of an arrow 66 to change the attitude of the optical probe 3. That is, the second rotation portion 54 changes the relative attitude of the optical probe 3 and the object to be measured M. The shape measurement device 1 includes a reference sphere 73a or a reference sphere 73b used to correct a relative position of the optical probe 3 and the holding member 55 holding the optical probe 3.

Driving of the X movement portion 50X, the Y movement portion 50Y, the Z movement portion 50Z, the first rotation portion 53, and the second rotation portion 54 is controlled by the analysis device 4 on the basis of a detection result of the position detection unit 11 including an encoder or the like.

The optical probe 3 includes the projector 8 and the imager 9, and the optical probe 3 is supported by the holding member 55. The projector 8 and the imager 9 are held by a holding member 56 and are fixed in a predetermined positional relationship, i.e., with a predetermined base length. However, the positional relationship between the projector 8 and the imager 9 may be variable. The holding member 55 is formed in a substantially L shape in which the first holding portion (first portion, first member) 55A that extends in the direction orthogonal to the rotation axis line 53a and is supported by the first rotation portion 53 is orthogonal to a second holding portion (second portion, second member) 55B that is provided in an end portion of the first holding portion 55A farther from the object to be measured M and extends parallel to the rotation axis line 53a, and the optical probe 3 is supported in an end portion on the +X side of the second holding portion 55B. A position of the rotation axis line 53a of the first rotation portion 53 is disposed on the side closer to the object to be measured M than the optical probe 3. Additionally, a counterbalance 55c is provided in an end portion of the first holding portion 55A that is on the side closer to the object to be measured M. Accordingly, when no driving force is generated in the first rotation portion 53, as illustrated in FIG. 1, the first holding portion 55A extends in the Z-axis direction.

In this manner, since the positional relationship between the projector 8 and the imager 9 is fixed by the holding member 56, changing the relative position of the optical probe 3 and the object to be measured M means changing the relative position of the projector 8 and the object to be measured M, or the relative position of the imager 9 and the object to be measured M. Similarly, since the positional relationship between the projector 8 and the imager 9 is fixed by the holding member 56, changing the relative attitude of the optical probe 3 and the object to be measured M means changing the relative attitude of the projector 8 and the object to be measured M, or the relative attitude of the imager 9 and the object to be measured M.

As illustrated in FIGS. 1 and 2, the holding/rotating device 7 includes the table 71 that holds the object to be measured M, a rotational drive unit 72 that rotates the table 71 in the OZ direction, i.e., the direction of an arrow 68, and a position detection unit 73 that detects a rotational position of the table 71. The position detection unit 73 is an encoder device that detects rotation of a rotation axis of the table 71 or the rotational drive unit 72. The holding/rotating device 7 causes the rotational drive unit 72 to rotate the table 71 on the basis of a result of detection performed by the position detection unit 73. The holding/rotating device 7 rotates the table 71 to rotate the object to be measured M in the direction of the arrow 68 about a rotation axis center AX. That is, the rotational drive unit 72 changes the relative attitude of the optical probe 3 and the object to be measured M.

The first rotation portion 53 and the second rotation portion 54 constitute a movement mechanism that enables the optical probe 3 to rotate, and change the relative position of the optical probe 3 and the object to be measured M. The holding/rotating device 7 constitutes a movement mechanism that enables the object to be measured M held on the table 71 to rotate, and changes the relative position of the optical probe 3 and the object to be measured M. The first rotation portion 53 and the second rotation portion 54 change the attitude of the optical probe 3, and the holding/rotating device 7 changes the attitude of the object to be measured M held on the table 71. Thus, at least one of the projection direction to the object to be measured M in which the optical probe 3 (the projector 8 described below) projects measurement light L, and the imaging direction in which the optical probe 3 (the imager 9 described below) images the object to be measured M is changed. The holding/rotating device 7 changes the attitude of the object to be measured M, and thus changes at least one of the projection direction to the object to be measured M in which the optical probe 3 (the projector 8 described below) projects the measurement light L, and the imaging direction in which the optical probe 3 (the imager 9 described below) images the object to be measured M.

In this manner, in the present embodiment, the first rotation portion 53 and the second rotation portion 54 rotate the optical probe 3 and the holding/rotating device 7 rotates the object to be measured M to change the relative attitude. However, the shape measurement device 1 may rotate only one of the optical probe 3 and the object to be measured M as long as the relative attitude can be changed. That is, the shape measurement device 1 may rotate at least one of the optical probe 3 and the object to be measured M to change the relative attitude. In a case where the shape measurement device 1 rotates both the optical probe 3 and the object to be measured M, the rotation axis around which the optical probe 3 rotates and the rotation axis around which the object to be measured M rotates are not limited to the rotation axes described above, and can be set arbitrarily.

The projector 8 functioning as a projection unit is controlled by the analysis device 4, and irradiates at least a portion of the object to be measured M held by the holding/rotating device 7 with light, and includes a light source 12 and a projection optical system 13. The light source 12 of the present embodiment includes a laser diode, for example. Note that the light source 12 may include a solid-state light source such as a light-emitting diode (LED) other than a laser diode.

The projection optical system 13 adjusts spatial optical intensity distribution of light emitted from the light source 12. The projection optical system 13 of the present embodiment includes a cylindrical lens, for example.

The projection optical system 13 may be a single optical element, or may include a plurality of optical elements. Light emitted from the light source 12 has a spot widened in the direction in which the cylindrical lens has positive power, and is emitted as the measurement light L from the projector 8 along the first direction toward the object to be measured M. As illustrated in FIG. 2, in a case where the measurement light L is emitted from the projector 8 and projected onto the object to be measured M, when the object to be measured M having a plane orthogonal to the emission direction from the projector 8 is projected, the measurement light L becomes linear to be parallel to the rotation axis line 53a, with the direction parallel to the rotation axis line 53a as the longitudinal direction. Additionally, this measurement light L that is linear has a predetermined length in the longitudinal direction on the object to be measured M.

Note that the longitudinal direction of this measurement light L that is linear can be changed by the above-described second rotation portion 54. The longitudinal direction of the measurement light L that is linear can be changed according to the direction in which the plane of the object to be measured M spreads, and thus efficient measurement can be performed.

Note that the projection optical system 13 may include a diffractive optical element such as a CGH, and may adjust the spatial optical intensity distribution of the measurement light L emitted from the light source 12 by using the diffractive optical element. Additionally, in the present embodiment, projected light having adjusted spatial optical intensity distribution may be referred to as pattern light. The measurement light L is an example of the pattern light. The expression, the attitude of the pattern describe herein refers to the longitudinal direction of the measurement light L that is linear.

The measurement light L with which the projector 8 irradiates the object to be measured M is projected onto a surface of the object to be measured M. The imager 9 functioning as an imaging unit captures an image of the measurement light L projected onto the surface of the object to be measured M. Specifically, the imager 9 includes an imaging element 20 and an image-forming optical system 21. An illumination beam with which the projector 8 irradiates the object to be measured M, that is, the measurement light L is reflected and scattered on the surface of the object to be measured M, and at least a portion of the measurement light L reflected and scattered enters the image-forming optical system 21. The image-forming optical system 21 forms an image of the measurement light L projected onto the surface of the object to be measured M by the projector 8, on the imaging element 20. The imaging element 20 outputs an image signal in accordance with the image formed by the image-forming optical system 21.

In the image-forming optical system 21, an object plane 21a on a plane including the emission direction (traveling direction) of the measurement light L from the projector 8 and the longitudinal direction of the measurement light L projected onto the object to be measured M, and a light-receiving surface 20a (image plane) of the imaging element 20 are in a conjugate relationship. Note that the plane including the emission direction of the measurement light L from the projector 8 and the longitudinal direction of the measurement light L projected onto the object to be measured M is substantially parallel to the traveling direction of the measurement light L. The plane conjugate with the light-receiving surface 20a of the imaging element 20 is formed along the traveling direction of the measurement light L, and thus an in-focus image can be obtained regardless of a position of the surface of the object to be measured M.

The analysis device 4 performs shape measurement by controlling each unit of the shape measurement device 1. Further, the analysis device 4 of the present embodiment calculates analysis result data of an image in a case where the image of the measurement light L projected onto the object to be measured M from the projector 8 of the optical probe 3 is captured by the imager 9.

Figure 3A:
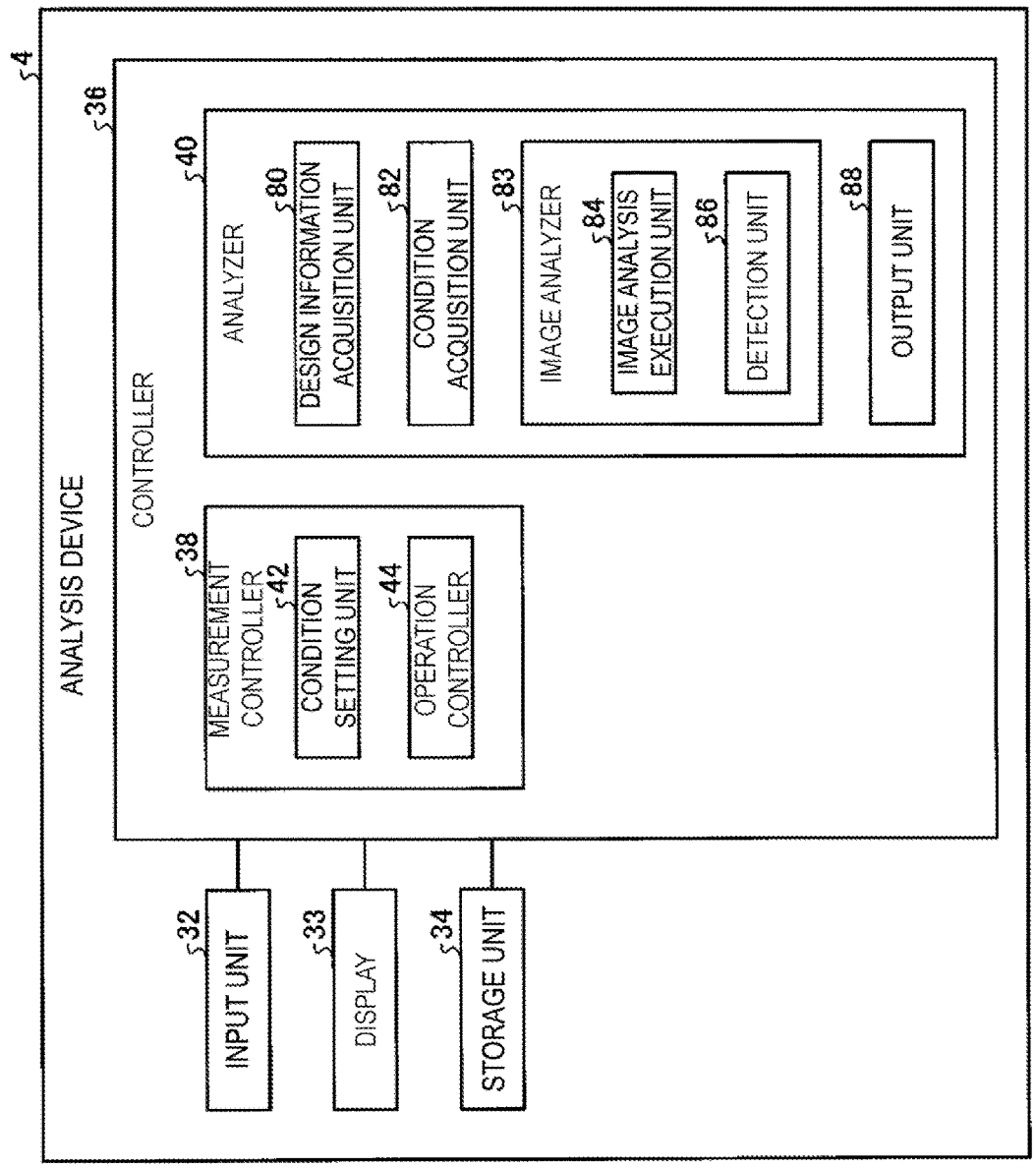
FIG. 3A is a block diagram of an analysis device according to the present embodiment.
Figure 3B:
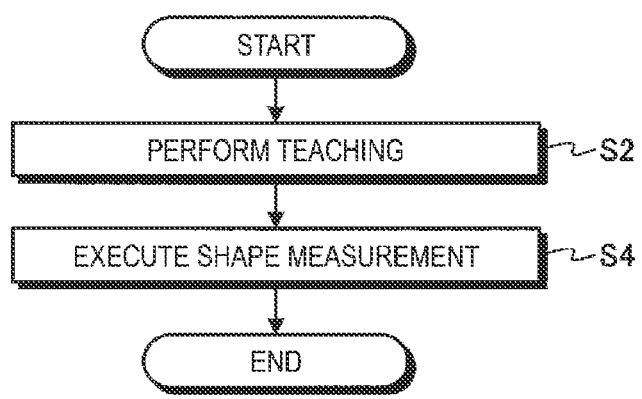
FIG. 3B is a flowchart illustrating a flow of shape measurement according to the present embodiment.

FIG. 3A is a block diagram of the analysis device 4 according to the present embodiment. FIG. 3B is a flowchart illustrating a flow of the shape measurement according to the present embodiment. The analysis device 4 is a computer in the present embodiment, and as illustrated in FIG. 3A, includes an input unit 32, a display 33, a storage unit 34, and a controller 36 as hardware. The analysis device 4 of the shape measurement device 1 may be a computer connected to the shape measurement device 1 or may be a host computer provided in a building where the shape measurement device 1 is installed, and is not limited to be located in a building where the shape measurement device 1 is installed and may be located away from the shape measurement device 1 and connected to the shape measurement device 1 by using communication means such as the Internet in a computer. Additionally, in the shape measurement device 1, the input unit 32, the display 33, the storage unit 34, and the controller 36 may be disposed at separate locations.

The input unit 32 is a device capable of receiving input of information from an operator, such as a mouse, a keyboard, a touch panel, or the like. An operator operates the input unit 32 to input a measurement condition described below of the shape measurement device 1, and thus adjusts the measurement condition. Additionally, in the case of manually moving the probe movement device 2 and the holding/rotating device 7, the input unit 32 may include a movement mechanism that moves the probe movement device 2 and the holding/rotating device 7. The display 33 is a display that displays a control result of the controller 36, contents of input from an operator, and the like, and in the present embodiment, the display 33 is a display, a touch panel, or the like. The storage unit 34 is a memory that stores arithmetic contents of the controller 36, program information, and the like, and includes at least one of a random access memory (RAM), a read only memory (ROM), and an external storage device such as a flash memory (flash memory). The controller 36 that is a control device is a computation device, that is, a central processing unit (CPU).

The controller 36 includes a measurement controller 38 and an analyzer 40 that is an image analysis device. The measurement controller 38 and the analyzer 40 read software (program) stored in a storage unit 16 to execute processing described below. In measuring a shape of the object to be measured M, as illustrated in FIG. 3B, an operator performs teaching of the shape measurement device 1 (step S2), and after a measurement condition of the shape measurement device 1 is determined by the teaching, the shape measurement of the object to be measured M is executed under the determined measurement condition of the shape measurement device 1 (step S4). Here, the "teaching" refers to an operation of adjusting and determining the measurement condition of the shape measurement device 1 on the basis of analysis of the analyzer 40 as described below, to accurately measure a three-dimensional shape of the object to be measured M. That is, the "teaching" refers to an operation of setting the measurement condition of the shape measurement device 1. The teaching is performed by an operator operating the input unit 32.

As illustrated in FIG. 3A, the measurement controller 38 includes a condition setting unit 42 and an operation controller 44. The condition setting unit 42 sets the measurement condition of the shape measurement device 1 as illustrated at step S2 of FIG. 3B on the basis of the measurement condition of the shape measurement device 1 determined by the teaching of the shape measurement device 1 by an operator operating the input unit 32. The measurement condition of the shape measurement device 1 refers to various conditions in measuring a shape of the object to be measured M by the shape measurement device 1. Examples of the measurement condition of the shape measurement device 1 include the relative position of the optical probe 3 and the object to be measured M, the relative attitude of the optical probe 3 and the object to be measured M, intensity of the measurement light L, exposure and exposure time of the imager 9, and a measurement region. Hereinafter, the measurement condition of the shape measurement device 1 will be described simply as a measurement condition.

Here, for the purpose of describing the measurement region, first, an imaging region will be described. The imaging region is an imaging region of the imager 9, that is, the range captured by the imager 9, and is a region where an image of light projected onto the object to be measured M is captured. In other words, the imaging region refers to the range including an image of the measurement light L captured, in a case where the imager 9 captures the image of the measurement light L projected onto the surface of the object to be measured M at a position and an attitude of the optical probe 3 set under the measurement condition. Magnitude of the range of the imaging region changes depending on the relative position of the object to be measured M and the optical probe 3, and the relative attitude of the object to be measured M and the optical probe 3. Additionally, the measurement region refers to a region (range) used for the shape measurement of the object to be measured M. More specifically, the measurement region refers to a region (range) including an image of the measurement light L in the imaging region. The shape measurement of the object to be measured M is performed by generating a point group from the image of the measurement light L in the measurement region. That is, the point group refers to points on an image for calculating coordinate values of a captured image, and a shape of the object to be measured M is measured on the basis of the coordinate values for each point group. Accordingly, the measurement region is also considered to be a region (range) used to generate the point group. In this manner, in the present embodiment, since the point group is generated in the measurement region, the measurement region can also be referred to as a point group region. Note that in a case where an extent and a position of the measurement region are similar to an extent and a position of the imaging region, the measurement region can be referred to as the imaging region.

Additionally, the measurement condition may include a scan start position and a scan end position of the measurement light L with which the optical probe 3 irradiates. However, the measurement condition may be at least one of the relative position of the imager 9 (imager) or the projector 8 (projector) and the object to be measured M, the relative attitude of the imager 9 or the projector 8 and the object to be measured M, the intensity of the measurement light L, the exposure and exposure time of the imager 9, and the measurement region. In the present embodiment, the condition setting unit 42 sets the measurement condition determined by the teaching of the shape measurement device 1 performed by an operator operating the input unit 32, as the measurement condition, and stores the measurement condition in the storage unit 34. However, the condition setting unit 42 may read the measurement condition stored in advance in the storage unit 34 and set the measurement condition on the basis of the read measurement condition, or may set the measurement condition by calculation.

Here, the measurement condition determined by the teaching of the shape measurement device 1 performed by an operator operating the input unit 32 is described as a determined measurement condition. The determined measurement condition include at least one of the relative position of the imager 9 (imager) or the projector 8 (projector) and the object to be measured M, the relative attitude of the imager 9 or the projector 8 and the object to be measured M, the intensity of the measurement light L, the exposure and exposure time of the imager 9, and the measurement region, which are determined by the teaching of the shape measurement device 1 performed by an operator operating the input unit 32. The condition setting unit 42 sets the determined measurement condition as the measurement condition performed by the operation controller 44, and causes the storage unit 34 to store the set measurement condition. That is, the condition setting unit 42 sets the relative position of the optical probe 3 and the object to be measured M and the relative attitude of the optical probe 3 and the object to be measured M in the determined measurement condition, as the relative position of the optical probe 3 and the object to be measured M and the relative attitude of the optical probe 3 and the object to be measured M, and causes the storage unit 34 to store the set relative position and the set relative attitude. Additionally, the condition setting unit 42 further sets intensity of the measurement light L with which the projector 8 irradiates the object to be measured M in the determined measurement condition as the intensity of the measurement light L with which the projector 8 irradiates the object to be measured M, and causes the storage unit 34 to store the set intensity. Additionally, the condition setting unit 42 also sets the exposure and exposure time of the imager 9 in the determined measurement condition as the exposure and exposure time of the imager 9, and causes the storage unit 34 to store the set exposure and exposure time. The condition setting unit 42 sets the measurement condition in the determined measurement condition as the measurement region, and causes the storage unit 34 to store the set measurement condition.

Figure 4:
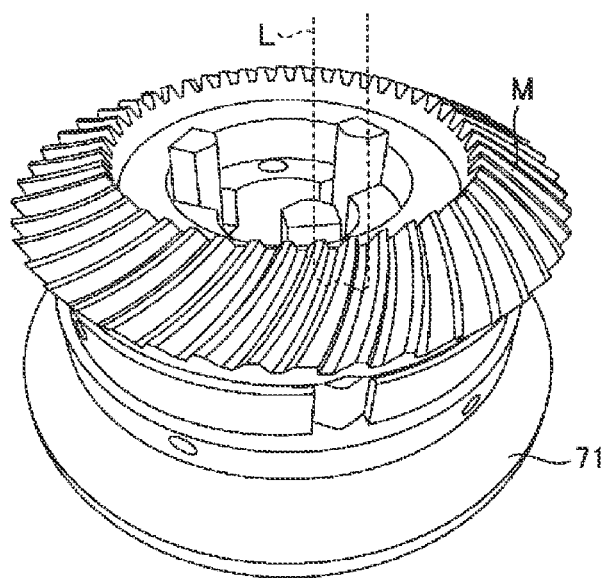
FIG. 4 is an explanatory view of an example of an operation of measuring a shape of an object to be measured by the shape measurement device.

FIG. 4 is an explanatory view of an example of an operation of measuring a shape of the object to be measured M by the shape measurement device 1. The operation controller 44 performs the shape measurement of the object to be measured M illustrated at step S4 of FIG. 3B by controlling each unit of the shape measurement device 1 under the measurement condition set by the condition setting unit 42. That is, the operation controller 44 reads the measurement condition set by the condition setting unit 42 from the storage unit 34, and perform the shape measurement of the object to be measured M under the read measurement condition. The operation controller 44 controls at least one of the X movement portion 50X, the Y movement portion 50Y, the Z movement portion 50Z, the first rotation portion 53, the second rotation portion 54, and the holding/rotating device 7 such that the relative position and the relative attitude of the optical probe 3 and the object to be measured M become the relative position and the relative attitude of the optical probe 3 and the object to be measured M that are set by the condition setting unit 42. Additionally, the operation controller 44 controls an aperture and the like of the projector 8 such that intensity of the measurement light L with which the projector 8 irradiates the object to be measured M becomes the intensity of the measurement light L with which the projector 8 irradiates the object to be measured M and which is set by the condition setting unit 42. Additionally, the operation controller 44 controls the time when a shutter of the imager 9 is opened such that exposure and exposure time of the imager 9 becomes the exposure and exposure time of the imager 9 that are set by the condition setting unit 42.

As illustrated in FIG. 4, the operation controller 44 causes the measurement light L to be projected onto the object to be measured M at the relative position and the relative position of the optical probe 3 and the object to be measured M that are set by the condition setting unit 42. The operation controller 44 measures a shape of the object to be measured M by relatively moving the optical probe 3 and the object to be measured M, moving (scanning) a position where the measurement light L is projected, detecting the position where the measurement light L is projected in the imaging region, and generating a coordinate value of each site of the object to be measured M, that is, the point group. The operation controller 44 causes the imager 9 to repeat imaging at a predetermined frame rate. The operation controller 44 acquires a maximum pixel value of each of pixel columns present in the light control range from data of a captured image, and outputs light control information to the projector 8 and the imager 9. Next, on the basis of the light control condition, the imager 9 captures an image of the measurement light L projected onto the object to be measured M, more specifically, a diffuse reflected light image T1 described below, and transmits data of the image at that time to the analysis device 4. Next, on the basis of the measurement region set by the condition setting unit 42, the operation controller 44 determine a position of the diffuse reflected light image T1 from among the image data, and calculates a three-dimensional coordinate value of a portion onto which the measurement light L of the object to be measured M is projected, from position information on the probe movement device 2 and position information on the diffuse reflected light image T1. Thus, the shape of the object to be measured M is measured.

Note that in the example of FIG. 4, the object to be measured M is a bevel gear in which teeth having substantially the same shape in design are formed at predetermined intervals in the circumferential direction. In the shape measurement device 1 of the present embodiment, the object to be measured M is a bevel gear, but objects having various shapes can be measured as the object to be measured M. Of course, in a case where the object to be measured M is a gear, the type of gear is not particularly limited. For example, a shape of a spur gear, a helical gear, a double helical gear, a worm gear, a pinion, a hypoid gear, or the like, in addition to the bevel gear, can also be measured. Additionally, the object to be measured M is not limited to a gear, and may be any object having irregularities formed at predetermined intervals, for example, a turbine blade.

Figure 5A:
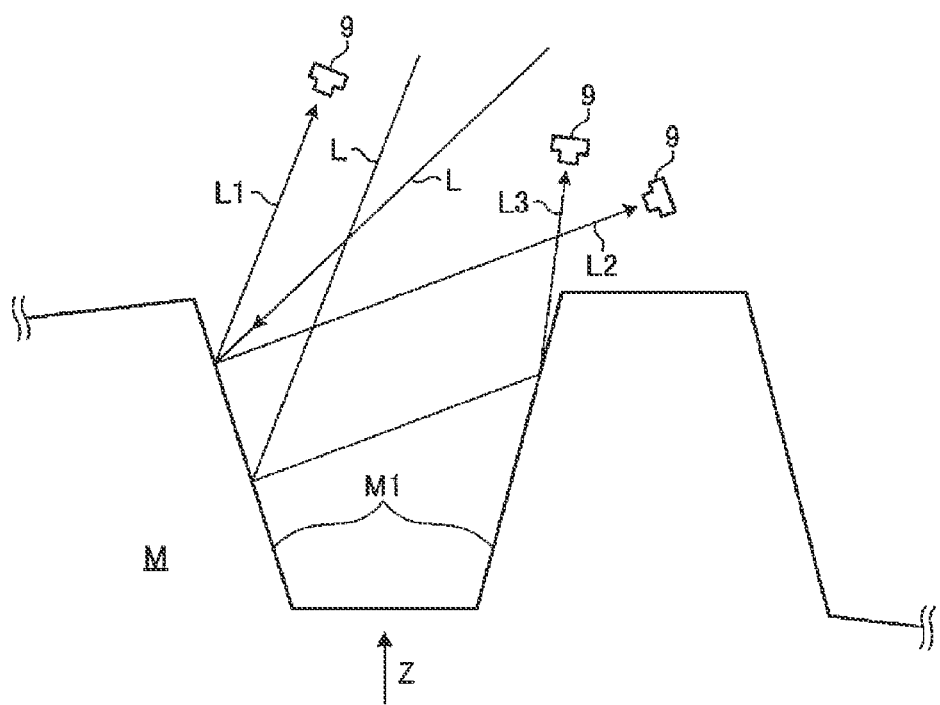
FIG. 5A is an explanatory schematic view of light incident on an imager.
Figure 5B:
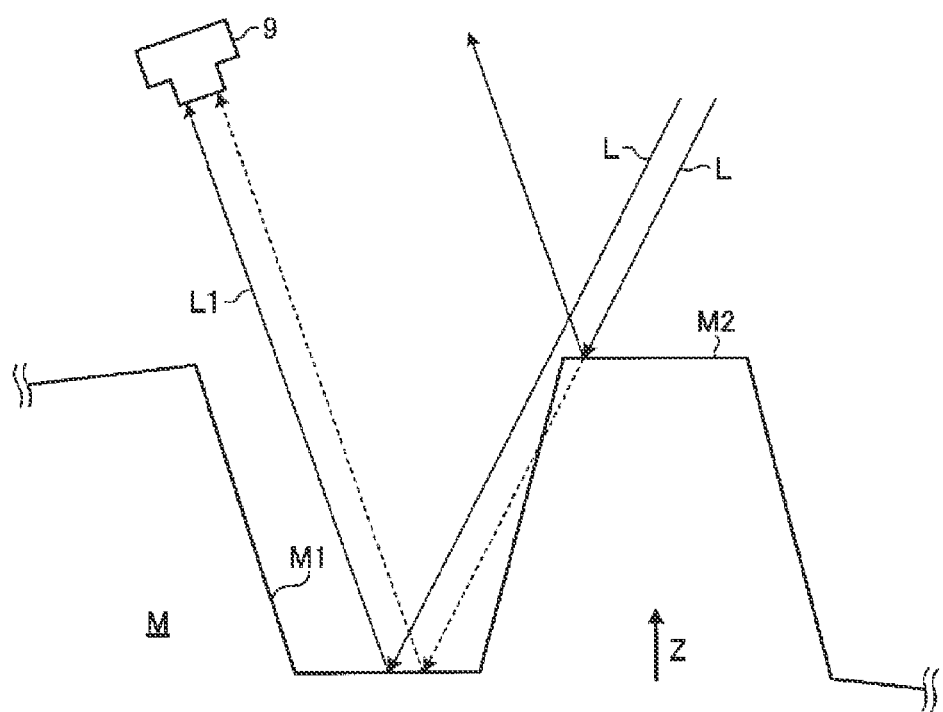
FIG. 5B is an explanatory schematic view of light incident on the imager.

FIGS. 5A and 5B are explanatory schematic views of light incident on the imager 9. FIGS. 5A and 5B are views illustrating, as an example, the case of performing the shape measurement at a location M1 of the object to be measured M. In performing the shape measurement, the shape measurement device 1 causes the projector 8 to project the measurement light L onto the location M1 of the object to be measured M under the measurement condition set by the measurement controller 38, and causes the imager 9 to capture an image of the measurement light L projected onto the object to be measured M. Here, an image that displays the image of light captured by the imager 9 is defined as a captured image (a captured image T illustrated in the example of FIG. 5C). The captured image includes an image of the measurement light L projected onto the location M1 as the image of light captured by the imager 9. The shape measurement device 1 performs the shape measurement at the location M1 of the object to be measured M by detecting the image of the measurement light L projected onto the location M1 that is displayed in the captured image, generating a point group from the detected image of the measurement light L, and calculating coordinates of the point group. Moreover, in the shape measurement at the location M1, the shape measurement device 1 is required to set the measurement condition such as the relative position and the relative attitude of the object to be measured M and the optical probe 3 such that diffuse reflected light L1 of the measurement light L projected onto the location M1 is incident on the imager 9. Hereinafter, the reason for this will be described.

As illustrated in FIG. 5A, the diffuse reflected light L1 is diffuse reflected light obtained by reflecting the measurement light L with which the projector 8 irradiates, at the location M1 of the object to be measured M only once. That is, the diffuse reflected light L1 is reflected light that is diffusely reflected at the location M1 in a case where the location M1 is irradiated with the measurement light L by the projector 8, and is light that reaches the imager 9 without being reflected at other sites. In other words, the diffuse reflected light L1 is diffuse reflected light that is reflected at the location M1 only once and reaches the imager 9. In a case where the diffuse reflected light L1 is incident on the imager 9, the image of the measurement light L projected onto the location M1 that is displayed in the captured image becomes an image of the diffuse reflected light L1. The shape measurement device 1 generates a point group from the image of the diffuse reflected light L1 displayed in the captured image, and performs the shape measurement. That is, the shape measurement device 1 defines the image of the diffuse reflected light L1 displayed in the captured image, as an image indicating a shape at the location M1 of the object to be measured M, and generates a point group from the image of the diffuse reflected light L1 displayed in the captured image.

However, depending on the measurement condition such as the relative position and the relative attitude of the object to be measured M with respect to the imager 9, and the shape of the object to be measured M, reflected light other than the diffuse reflected light L1, that is, specular reflected light L2 and multiple reflected light L3 may be incident on the imager 9, and the captured image may include an image of light other than the diffuse reflected light L1, that is, an image of the specular reflected light L2 and an image of the multiple reflected light L3. In this case, it is likely that the shape measurement device 1 cannot properly perform the shape measurement at the location M1. Hereinafter, this will be described specifically.

FIG. 5A illustrates an example in which the specular reflected light L2 is incident on the imager 9. When the specular reflected light L2 is incident on the imager 9, an image of the specular reflected light L2 is present in the image of the measurement light L captured by the imager 9, and the image of the specular reflected light L2 is present in the captured image. The specular reflected light L2 is light specularly reflected on the object to be measured M among reflected light of the measurement light L. The specular reflected light L2 has light intensity much higher than light intensity of the diffuse reflected light L. As an example, the specular reflected light L2 has light intensity from approximately 10 to 1000 times light intensity of the diffuse reflected light L1 of the measurement light L having the same intensity. Accordingly, when the light control condition such as the intensity of the measurement light L in imaging by the imager 9 is set by using the intensity of the specular reflected light L2 as a reference, a luminance of the diffuse reflected light L1 may be approximately $\frac{1}{1000}$, as compared to the case where the light control condition is set on the basis of the intensity of the diffuse reflected light L1. In this case, when the image of the measurement light L incident on the imager 9 is expressed as a pixel value having only a few hundred-level gray-scale, a luminance of the image of the diffuse reflected light L1 is too low in the captured image, and it is likely that the image of the diffuse reflected light L1 cannot be detected. Accordingly, in the captured image, when the image of the specular reflected light L2 is present in the image of the measurement light L captured by the imager 9, the image of the diffuse reflected light L1 cannot be detected, and it is likely that a point group of the image of the diffuse reflected light L1 cannot be generated properly. Since the image of the diffuse reflected light L1 is an image indicating the shape at the location M1 of the object to be measured M in the captured image, when a point group of the image of the diffuse reflected light L1 cannot be generated, the shape measurement at the location M1 cannot be performed properly. Note that, the light control condition refers to various conditions in a case where the imager 9 captures an image of the measurement light L, such as, in addition to the intensity of the measurement light L from the projector 8, an amount of exposure of the imager 9, input/output characteristics of the imager 9 (sensitivity of the imaging element 20 or an amplification factor with respect to a signal detected by the imaging element 20). Additionally, the specular reflected light L2 may be re-reflected within the image-forming optical system 21 (lens) of the imager 9, and may be incident on the light-receiving surface 20a of the imager 9. An image of the re-reflected light incident on the light-receiving surface 20a may be present in the captured image. The image of the re-reflected light incident on the light-receiving surface 20a is displayed as a high luminance image referred to as a flare, in the captured image. In a case where the image of the diffuse reflected light L1 and the flare are superimposed on each other in the captured image, it is likely that the image of the diffuse reflected light L1 superimposed on the flare causes blown out highlights due to the flare having a high luminance, and cannot be detected. In this case, since a point group of the image of the diffuse reflected light L1 at the location superimposed on the flare cannot be generated, the shape measurement cannot be performed properly.

Additionally, FIG. 5A illustrates an example in which the multiple reflected light L3 is incident on the imager 9. When the multiple reflected light L3 is incident on the imager 9, an image of the multiple reflected light L3 is present in the image of the measurement light L captured by the imager 9, and the image of the multiple reflected light L3 is present in the captured image. The multiple reflected light L3 is reflected light that is reflected on the object to be measured M a plurality of times and then is incident on the imager 9, among reflected light of the measurement light L. Specifically, light specularly reflected on the object to be measured M is incident on other locations of the object to be measured M, and light diffusely reflected at the locations is the multiple reflected light L3. However, light that is diffusely reflected on the object to be measured M, and that is incident on other locations of the object to be measured M and is diffusely reflected at the locations may be the multiple reflected light L3. Since the multiple reflected light L3 and the diffuse reflected light L1 are incident on different positions in the light-receiving surface 20a of the imager 9, the image of the multiple reflected light L3 displayed in the captured image and the image of the diffuse reflected light L1 are displayed at different positions. That is, in the captured image, the image of the diffuse reflected light L1 is an image indicating the shape at the location M1 of the object to be measured M, whereas the image of the multiple reflected light L3 is considered not to be an image indicating the shape at the location M1 of the object to be measured M. However, in the shape measurement, the image of the diffuse reflected light L1 is not distinguishable from the image of the multiple reflected light L3, and it is likely that a point group is generated from the image of the multiple reflected light L3. In a case where the shape measurement is performed on the basis of the point group generated from the image of the multiple reflected light L3, since the shape measurement is performed on the basis of an image that does not indicate the shape at the location M1 of the object to be measured M, the shape measurement at the location M1 cannot be performed properly.

Additionally, as illustrated in FIG. 5B, it is likely that occlusion occurs depending on the measurement condition, that is, the relative position and the relative attitude. That is, as illustrated in FIG. 5B, a location M2 rather than the location M1 may be irradiated with a portion of the measurement light L. Here, the location M2 refers to a location other than the location M1 of the object to be measured M. and is a location where the shape measurement is not to be performed. In this case, the diffuse reflected light L1 of a light beam of the measurement light L with which the location M1 is irradiated is incident on the imager 9, while the diffuse reflected light L1 of a light beam of the measurement light L with which the location M2 is irradiated is not incident on the imager 9. Accordingly, in this case, a portion of an image captured by the imager 9 misses by a portion of a light beam of the measurement light L with which the locations M2 is irradiated. This phenomenon is referred to as occlusion. That is, in the example in FIG. 5B, a light beam indicated by a solid arrow (the diffuse reflected light L1) is incident on the imager 9, while a portion indicated by a dashed arrow is not actually incident on the imager 9. Additionally, depending on the measurement condition such as the case where light intensity of the measurement light L with which the projector 8 irradiates is low, a luminance of the image of the diffuse reflected light L1 is low, and it is also likely that the image of the diffuse reflected light L1 cannot be recognized properly. Note that since a luminance of an image can also be considered to be intensity of light forming an image, the luminance of the image of the diffuse reflected light L1 can be referred to as intensity of light forming the image of the diffuse reflected light L1. Additionally, in FIG. 5A and FIG. 5B, for convenience of description, each of the image of the specular reflected light L2, the image of the multiple reflected light L3, and the case where occlusion occurs is described with a change in the relative position and the relative attitude of the imager 9 with respect to the object to be measured M (the location M1). However, even in a case where the measurement condition such as the relative position and the relative attitude of the imager 9 with respect to the object to be measured M (the location M1) is fixed, only one of the image of the specular reflected light L2, the image of the multiple reflected light L3, occlusion, and the image of the diffuse reflected light L1 having low intensity of light forming the image may be captured, or two or more of the image of the specular reflected light L2, the image of the multiple reflected light L3 occlusion, and the image of the diffuse reflected light L1 having low intensity of light forming the image may be captured. For example, even in a case where the measurement condition such as the relative position and the relative attitude of the imager 9 is fixed, all of the image of the specular reflected light L2, the image of the multiple reflected light L3, occlusion, and the image of the diffuse reflected light L1 having low intensity of light forming the image may be captured at one time.

Figure 5C:
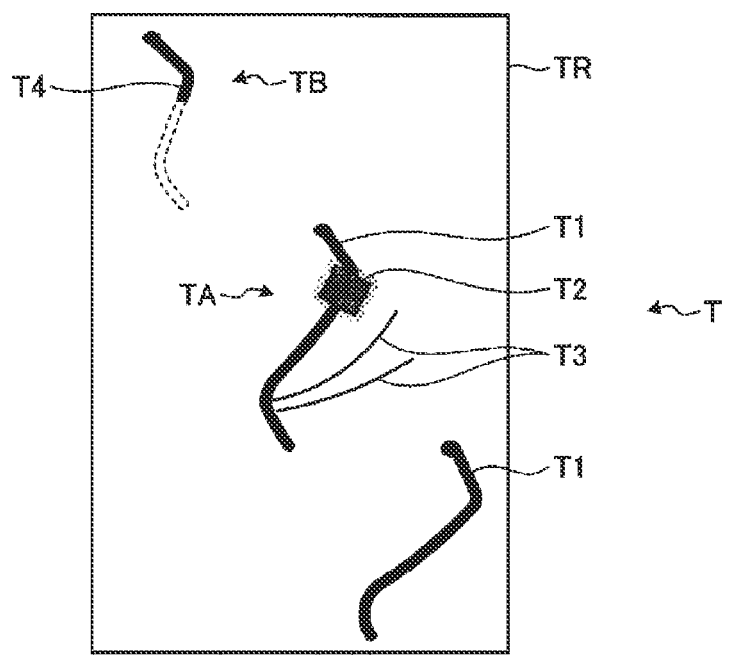
FIG. 5C is a view illustrating an example of a captured image actually captured by the imager.

FIG. 5C is a view illustrating an example of the captured image T actually captured by the imager 9. The captured image T of FIG. 5C is an image indicating an image of light captured by the imager 9 as described above, and is an image of light in an imaging region TR. Then, a diffuse reflected light image T1 is an image of the diffuse reflected light L incident on the imager 9. Additionally, a specular reflected light image T2 is an image of the specular reflected light L2 incident on the imager 9. Additionally, a multiple reflected light image T3 is an image of the multiple reflected light L3 incident on the imager 9. In the example of FIG. 5C, since the specular reflected light image T2 and the multiple reflected light image T3 are present in an image TA, it is likely that it is difficult to perform the shape measurement by using the diffuse reflected light image T1 for the reason described above. Additionally, in the example of FIG. 5C, an image TB includes a occlusion image T4. The occlusion image T4 is an image generated by occlusion, in other words, the image of the diffuse reflected light L1 having a missing portion due to occlusion. Note that in the occlusion image T4, a portion indicated by a dotted line is a missing portion due to occlusion, and actually, the dotted line portion is not imaged. Since the occlusion image T4 is an image of the diffuse reflected light L1 having a missing portion, it is difficult to perform the shape measurement of the missing portion, that is, it is difficult to detect a point group. Additionally, since similarly in a case where a luminance of the diffuse reflected light image T1 is low, the imager 9 cannot capture the diffuse reflected light image T1, it is difficult to perform the shape measurement using the diffuse reflected light image T1. Hereinafter, the diffuse reflected light image T1 having a low luminance will be described as an improper luminance image T5. The improper luminance image T5 is, for example, the diffuse reflected light image T1 having a luminance lower than a predetermined value. The predetermined value described here may be set by an operator in consideration of influence of the improper luminance image T5 on measurement accuracy of the object to be measured M, and may be a value calculated on the basis of a design tolerance of the object to be measured M. That is, the specular reflected light image T2, the multiple reflected light image T3, the occlusion image T4, and the improper luminance image T5 may be an improper image for shape measurement. Additionally, among reflected light of the measurement light L, an image other than the image that may be an improper image for shape measurement is considered to be a proper image for shape measurement. In other words, the proper image for shape measurement is an image that is not the occlusion image T4 (that is, an image that has no or less missing portion due to occlusion) in the diffuse reflected light image T1, and is considered to be an image that is not the improper luminance image T5. Note that in the present embodiment, the occlusion image T4 is an image of the diffuse reflected light L1 having a missing portion due to occlusion, but the missing portion (region), that is, the dotted line portion itself, may be referred to as the "occlusion image T4."

Moreover, the imager 9 may be irradiated with light other than the measurement light L by a light source other than the projector 8. Light with which a light source other than the projector 8 irradiates may be incident on the imager 9 and captured by the imager 9 as diffuse reflected light (including diffuse reflected light reflected on the object to be measured M only once, and multiple reflected light), and specular reflected light. Images of the diffuse reflected light and the specular reflected light that are captured by the imager 9 are also improper images for shape measurement. Note that the examples of the light source other than the projector 8 include sunlight and illumination in a factory, and various light sources other than the projector 8.

Accordingly, to properly perform the shape measurement, it is necessary to set the measurement condition such that the diffuse reflected light image T1 that is a proper image for shape measurement can be captured properly. In the related art, an operator has visually recognized whether a proper image for shape measurement is properly captured, by checking an image captured by the imager 9 while adjusting the measurement condition. However, for example, an unexperienced operator cannot distinguish images of the diffuse reflected light L1, the specular reflected light L2, and the multiple reflected light L3, and it may be difficult to recognize which is a proper image. Additionally, in teaching, it may also be difficult to recognize how the measurement condition can be adjusted to capture a proper image. To address such a problem, the analyzer 40 according to the present embodiment executes processing described below to enable an operator to easily set a measurement condition that enables accurate shape measurement. Hereinafter, the analyzer 40 will be described specifically.

Returning to FIG. 3A, the analyzer 40 includes a design information acquisition unit 80, a condition acquisition unit 82, an image analyzer 83, and an output unit 88. In the analyzer 40, the image analyzer 83 detects by analysis an improper image for shape measurement from the image of the measurement light L under the measurement condition acquired by the condition acquisition unit 82, and the output unit 88 causes the display 33 to display detection result information based on the detection result. An operator can confirm display of the display 33, and thus can easily set a measurement condition that enables accurate shape measurement.

Specifically, the design information acquisition unit 80 acquires design information on the object to be measured M. The design information acquisition unit 80 acquires the design information on the object to be measured M by reading the design information on the object to be measured M from the storage unit 34. The design information on the object to be measured M is information required for analysis by the image analyzer 83 described below. The design information on the object to be measured M may be stored in advance in the storage unit 34, may be acquired during the processing by communication, or may be acquired by an input to the input unit 32 by an operator. Additionally, the design information includes shape data of the object to be measured M and data of reflectance of the object to be measured M. The shape data is data indicating a shape in design of the object to be measured M. The shape data is, for example, CAD data, mesh data, point group data, and the like. Additionally, the design information acquisition unit 80 may acquire a design value indicating a shape (for example, an original value of the object to be measured M such as a gear, and a turbine blade), and determine by calculation the shape data on the basis of the design value. Additionally, the reflectance data is data indicating reflectance in design of the object to be measured M. The reflectance data may be data measured by a separate measuring device, or may be a value based on a material or material properties. Additionally, the object to be measured M may include a plurality of regions having different surface roughness and material properties, and in this case, reflectance varies for each region. In such a case, the reflectance data may have a different value for each of a plurality of regions having different surface roughness and material properties. However, the design information acquisition unit 80 may acquire, as the design information, other data such as tolerance, a coefficient of linear expansion, and a coefficient of thermal expansion of the object to be measured M. Additionally, the design information acquisition unit 80 may acquire at least the shape data as the design information, and may not acquire the reflectance data.

The condition acquisition unit 82 acquires the measurement condition. In the present embodiment, the condition acquisition unit 82 acquires the determined measurement condition, that is, the measurement condition determined by the teaching of the shape measurement device 1 performed by an operator operating the input unit 32. The measurement condition acquired by the condition acquisition unit 82 is used for analysis of the image analyzer 83 described below. Note that the condition acquisition unit 82 does not necessarily acquire the determined measurement condition as the measurement condition. The condition acquisition unit 82 may acquire, in addition to the determined measurement condition, information on light other than the measurement light L with which a light source other than the projector 8 irradiates, as the measurement condition used for analysis of the image analyzer 83. The information on light other than the measurement light L with which the light source other than the projector 8 irradiates is referred to as other light source information. The other light source information includes a relative position of a light source other than the projector 8 and the object to be measured M, a relative attitude of a light source other than the projector 8 and the object to be measured M. and intensity of light from a light source other than the projector 8. The other light source information may be input by an operator operating the input unit 32, or may be stored in advance in the storage unit 34, or may be set by operation. Additionally, the measurement condition acquired by the condition acquisition unit 82 other than the other light source information may be a measurement condition stored in advance in the storage unit 34, or may be a measurement condition set by operation by the condition acquisition unit 82.

The image analyzer 83 detects an improper image for shape measurement of the object to be measured M in the case of capturing an image of light projected onto the object to be measured M, on the basis of the design information on the object to be measured M and the measurement condition. Additionally, the image analyzer 83 also detects a proper image for shape measurement of the object to be measured M in the case of capturing an image of light projected onto the object to be measured M, on the basis of the design information on the object to be measured M and the measurement condition. That is, the image analyzer 83 executes analysis on the basis of the design information on the object to be measured and the measurement condition, to detect an improper image and a proper image for shape measurement, and does not analyze an image actually captured by the imager 9.

As illustrated in FIG. 3A the image analyzer 83 includes an image analysis execution unit 84 and a detection unit 86. The image analysis execution unit 84 acquires the design information on the object to be measured M acquired by the design information acquisition unit 80, and the measurement condition acquired by the condition acquisition unit 82. The image analysis execution unit 84 executes analysis on the basis of the acquired design information and the acquired measurement condition to calculate analysis result data of the image of the measurement light L. The analysis result data of the image of the measurement light L refers to information on an image of the measurement light L calculated by analysis, assuming that the object to be measured M is irradiated with the measurement light L under a predetermined measurement condition, that is, the measurement condition acquired by the condition acquisition unit 82, and an image of the measurement light L projected onto the object to be measured M is captured by the imager 9. More specifically, the analysis result data is considered to be information indicating a luminance of an image for each position on the light-receiving surface 20a of the imaging element 20, assuming that the image of the measurement light L projected onto the object to be measured M is captured by the imager 9. In other words, the analysis result data is considered to be information indicating intensity of the measurement light L incident on the light-receiving surface 20a for each position on the light-receiving surface 20a of the imaging element 20, assuming that the image of the measurement light L projected onto the object to be measured M is captured by the imager 9. In this manner, the analysis result data is considered to include information on a luminance of an image, and position information indicating a position (coordinates) on the light-receiving surface 20a of the analysis result data. The image analyzer 83 calculates the analysis result data for all positions on which the measurement light L is incident, on the light-receiving surface 20a. Note that assuming that the image of the measurement light L projected onto the object to be measured M is captured by the imager 9, the analysis result data can also be considered to be luminance information for each position on the captured image T, or is also considered to be luminance information of an image for each position on the imaging region TR. Additionally, the analysis result data is also considered to be intensity distribution (luminance distribution) of an image on the light-receiving surface 20a, the imaging region TR, or the captured image T. The detection unit 86 detects an improper image on the basis of the analysis result data as described below.

The analyzer 40 can cause the output unit 88 described below to output the analysis result data for each position on the light-receiving surface 20a, as image data, to the display 33, and can cause the display 33 to display a reproduced image C0. That is, the analyzer 40 associates coordinates on the light-receiving surface 20a in the position information present in the analysis result data with coordinates on a screen of the display 33, and turns on light with a luminance specified by the luminance information present in the analysis result data for each coordinates on the screen of the display 33, that is, for each pixel. Thus, the display 33 displays the reproduced image C0 on the screen. The reproduced image C0 is considered to be the captured image T that is generated by analysis and that is to be imaged by the imager 9, assuming that the image of the measurement light L projected onto the object to be measured M under the measurement condition acquired by the condition acquisition unit 82 is captured by the imager 9. That is, the reproduced image C0 is not the captured image T actually captured by the imager 9, but is considered to be an image obtained by reproducing the captured image T under the set measurement condition by analysis. Note that the analyzer 40 may calculate the analysis result data, and may not necessarily generate the reproduced image C0.

Figure 6:
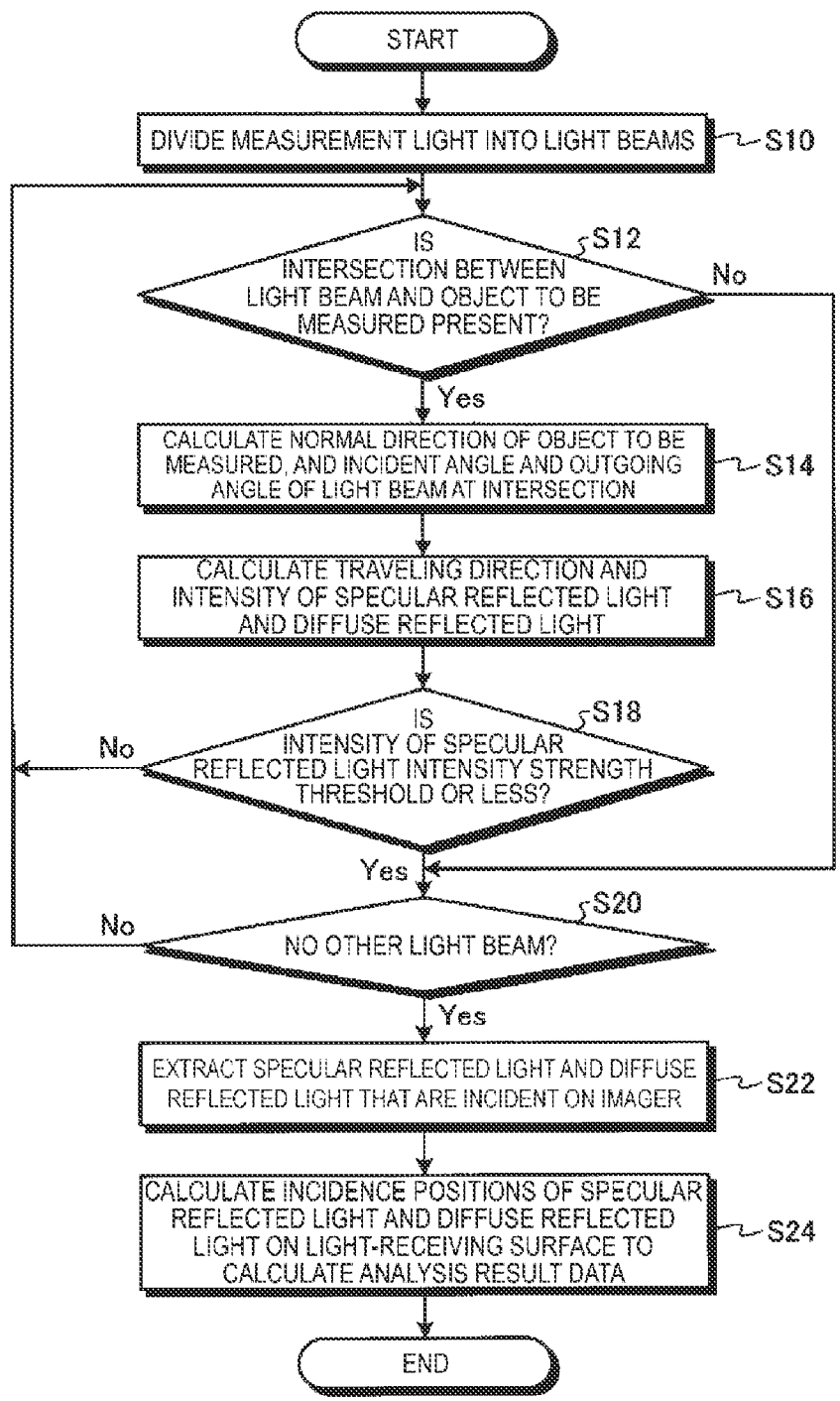
FIG. 6 is a flowchart illustrating an analysis method performed by an image analysis execution unit.

FIG. 6 is a flowchart illustrating a method of analysis performed by the image analysis execution unit 84. The image analysis execution unit 84 in the present embodiment executes light beam tracking simulation as analysis to acquire the analysis result data. Prior to the analysis illustrated in FIG. 6, the image analysis execution unit 84 acquires the design information on the object to be measured M and the measurement condition. Then, as illustrated in FIG. 6, the image analysis execution unit 84 divides the measurement light L with which the projector 8 is to irradiate, under the measurement condition acquired by the condition acquisition unit 82 into a plurality of light beams at a predetermined interval (step S10). Then, the image analysis execution unit 84 determines whether an intersection between one of the plurality of divided light beams and the object to be measured M is present (step S12). The image analysis execution unit 84 determines whether the intersection between the light beam and the object to be measured M is present, by calculating which position of the object to be measured M is irradiated with the light beam. The image analysis execution unit 84 can calculate which direction the light beam is incident on, from the measurement condition, and recognizes the shape of the object to be measured M from the design information on the object to be measured M and thus, can calculate whether the intersection between the light beam and the object to be measured M is present. That is, the case where the intersection between the light beam and the object to be measured M is present refers to the case where a location where the shape of the object to be measured M is measured is irradiated with the light beam (the light beam is projected onto the location), and the case where the intersection between the light beam and the object to be measured M is not present refers to the case where a location where the shape of the object to be measured M is measured is not irradiated with the light beam (the light beam is not projected onto the location). Hereinafter, the intersection between the light beam and the object to be measured M is referred to as simply an intersection.

In a case where the intersection is not present (step S12; No), that is, in a case where the object to be measured M is not irradiated with the light beam, the image analysis execution unit 84 ends calculation for the light beam and the processing proceeds to step S20 described below.

In a case where the intersection is present (step S12; Yes), the image analysis execution unit 84 calculates the normal direction of the object to be measured M at the intersection, an incidence angle of the light beam at the intersection, and an outgoing angle of the light beam at the intersection (step S14). The image analysis execution unit 84 calculates the incidence angle of the light beam at the intersection on the basis of the normal direction and the direction of the light beam, and calculates the outgoing angle of the light beam at the intersection according to the law of reflection. Then, the image analysis execution unit 84 calculates the traveling directions and intensity of specular reflected light and diffuse reflected light of the light beams reflected at the intersection (step S16). Specifically, the image analysis execution unit 84 calculates the traveling direction of the specular reflected light and the traveling direction of the diffuse reflected light on the basis of the outgoing angle of the light beam at the intersection. The specular reflected light described here is a light beam obtained by specularly reflecting the light beam incident on the intersection with the object to be measured M, at the intersection with the object to be measured M. Additionally, the specular reflected light described here is a light beam obtained by diffusely reflecting the light beam incident on the intersection with the object to be measured M, at the intersection with the object to be measured M. Then, the image analysis execution unit 84 calculates intensity of the specular reflected light and the diffuse reflected light on the basis of the reflectance of the object to be measured M in the design information.

Then, the image analysis execution unit 84 determines whether the calculated intensity of the specular reflected light is a predetermined intensity threshold or less (step S18), and in a case where the calculated intensity is not the intensity threshold or less (step S18; No), that is, is larger than the intensity threshold, the processing returns to step S12, and the image analysis execution unit 84 continues to calculate the intersection by using the specular reflected light as the light beam. Intensity of the specular reflected light decreases every reflection. The image analysis execution unit 84 repeats step S12 to step S18 until the intensity of the specular reflected light decreases to the intensity threshold or less due to reflection at the intersection. On the other hand, in a case where the intensity of the specular reflected light is the threshold or less (step S18; Yes), the image analysis execution unit 84 determines that the reflected light of the light beam has intensity decreased to an undetectable extent due to reflection, and ends analysis of the light beam, and determines whether there is a light beam that is not subjected to calculation at step S12 to step S18, that is, other light beam, among the plurality of light beams divided at step S10 (step S20). The intensity threshold described here may be set by an operator in consideration of, for example, an influence on measurement accuracy of the object to be measured M. or may be a value calculated on the basis of design of the object to be measured M, and the like. In a case where there is other light beam, that is, a light beam that is not subjected to calculation at step S12 to step S18 among the plurality of light beams divided at step S11 (step S20; No), the processing returns to step S12, and the image analysis execution unit 84 calculates the intersection between the light beam and the object to be measured M, and continues the processing at step S12 and subsequent steps. In a case where there is no other light beam (step S20; Yes), that is, there is no light beam that is not subjected to calculation at step S12 to step S18 among the plurality of light beams divided at step S10, the image analysis execution unit 84 extracts the specular reflected light and the diffuse reflected light incident on the imager 9 among the specular reflected light and the diffuse reflected light the traveling directions and the intensity of which are calculated at step S16 (step S22). The image analysis execution unit 84 calculates a position of the imager 9 from the measurement condition, and extracts the specular reflected light and the diffuse reflected light that are incident on the imager 9, on the basis of the position of the imager 9 and the traveling directions of the specular reflected light and the diffuse reflected light calculated at step S16. Then, the image analysis execution unit 84 calculates an incident position (coordinates) on the light-receiving surface 20*a* for each of the specular reflected light and the diffuse reflected light that are incident on the imager 9 to calculate the analysis result data (step S24). That is, the image analysis execution unit 84 calculates positions (coordinates) on the light-receiving surface 20*a* of the specular reflected light and the diffuse reflected light, on the basis of the traveling directions of the specular reflected light and the diffuse reflected light that are incident on the imager 9 and the position of the imager 9. The image analysis execution unit 84 uses the calculated positions of the specular reflected light and the diffuse reflected light on the light-receiving surface 20*a* as position information of the analysis result data, and uses the intensity of the specular reflected light and the diffuse reflected light calculated at step S16 as the luminance information of the analysis result data, to calculate the analysis result data. Note that the image analysis execution unit 84 may calculate positions (coordinate) of the specular reflected light and the diffuse reflected light on the imaging region TR on the basis of the traveling directions of the specular reflected light and the diffuse reflected light incident on the imager 9, and the position of the imager 9, and may use the calculated positions of the specular reflected light and the diffuse reflected light on the imaging region TR as position information of the analysis result data. Note that the image analysis execution unit 84 may execute the processing from step S10 and subsequent steps for light other than the measurement light L, that is, light from a light source other than the projector 8, on the basis of the other light source information. In this case, the analysis result data can be data also including position information and luminance information of light from a light source other than the projector 8.

The image analysis execution unit 84 calculates the analysis result data in this manner. The detection unit 86 detects an improper image for shape measurement on the basis of the analysis result data. Additionally, the detection unit 86 detects a proper image for shape measurement on the basis of the analysis result data. Then, the detection unit 86 evaluates the detected improper image and the detected proper image. That is, in the following description, the processing of detecting an improper image and a proper image on the basis of the analysis result data is referred to as detection, and the processing of evaluating the detected improper image and the detected proper image is referred to as evaluation. First, the detection of a proper image and an improper image by the detection unit 86 will be described. Note that the detection unit 86 may detect only an improper image, or detect only a proper image. That is, the detection unit 86 may detect at least one of an improper image and a proper image. Hereinafter, an image improper for shape measurement is defined as an improper image, and an image proper for shape measurement is defined as a proper image.

The detection unit 86 detects the improper image and the proper image by detecting a diffuse reflected light image P1, a specular reflected light image P2, and a multiple reflected light image P3 described below. Hereinafter, the detection method will be described.

In a case where a light beam that is reflected at the intersection and incident on the imager 9 is the diffuse reflected light L1, the detection unit 86 detects an image formed of a light beam of the diffuse reflected light L1 as the diffuse reflected light image P. The diffuse reflected light image P1 is an image of the diffuse reflected light L1, that is, an image obtained by reproducing the diffuse reflected light image T1 by analysis. Note that the diffuse reflected light L1 described here is light formed such that a light beam with which the projector 8 irradiates and which is not reflected on the object to be measured M is diffusely reflected at the intersection (intersection between the light beam and the object to be measured M).

Additionally, in a case where a light beam that is reflected at the intersection with the object to be measured M and incident on the imager 9 is the specular reflected light L2, the detection unit 86 detects an image formed of a light beam of the specular reflected light L2 as the specular reflected light image P2. The specular reflected light image P2 is an image of the diffuse reflected light L2, that is, an image obtained by reproducing the specular reflected light image T2 by analysis. Note that the specular reflected light L2 described here is light specularly reflected at the intersection with the object to be measured M.

Additionally, in a case where a light beam that is reflected at the intersection with the object to be measured M and incident on the imager 9 is the multiple reflected light L3, the detection unit 86 detects an image formed by a light beam of the multiple reflected light L3 as the multiple reflected light image P3. The multiple reflected light image P3 is an image of the multiple reflected light L3, that is, an image obtained by reproducing the multiple reflected light image T3 by analysis. Note that the multiple reflected light L3 described here is specular reflected light diffusely reflected at the intersection with the object to be measured M.

Note that in a case where a light beam that is reflected at the intersection with the object to be measured M and incident on the imager 9 is light with which a light source other than the projector 8 irradiates, the detection unit 86 may detect an image formed of a light beam of the light as an image of light from a light source other than the projector 8, and define the detected image of the light from a light source other than the projector 8 as the improper image.

As described above, among the captured images T, the specular reflected light image T2, the multiple reflected light image T3, and the image of light from a light source other than the projector 8 may be improper images for shape measurement. Additionally, the diffuse reflected light image T1 may be an improper image for shape measurement. Accordingly, the detection unit 86 detects, as the improper images, the specular reflected light image P2 corresponding to the specular reflected light image T2, the multiple reflected light image P3 corresponding to the multiple reflected light image T3, and the image of light from a light source other than the projector 8. Additionally, the detection unit 86 detects the diffuse reflected light image P1 as the proper image. In other words, the detection unit 86 classifies the image of the measurement light L into the specular reflected light image P2, the multiple reflected light image P3, and the diffuse reflected light image P.

However, the diffuse reflected light image P1 may include a occlusion image P4 and an improper luminance image P5. The occlusion image P4 is an image of the diffuse reflected light L1 having a missing portion due to occlusion, that is, an image obtained by reproducing the occlusion image T4 by analysis. The improper luminance image P5 is an image obtained by reproducing the improper luminance image T5 by analysis. As described above, among the captured images T, both of the occlusion image T4 and the diffuse reflected light image T1 having a low luminance may be improper images for shape measurement. In the present embodiment, the detection unit 86 evaluates the diffuse reflected light image P1 determined as the proper image by detection, and evaluates (determines) whether the occlusion image P4 and the improper luminance image P5 are present in the diffuse reflected light image P1, and in a case where the occlusion image P4 and the improper luminance image P5 are present, the detection unit 86 evaluates (determines) that the occlusion image P4 and the improper luminance image P5 are improper images.

Figure 7:
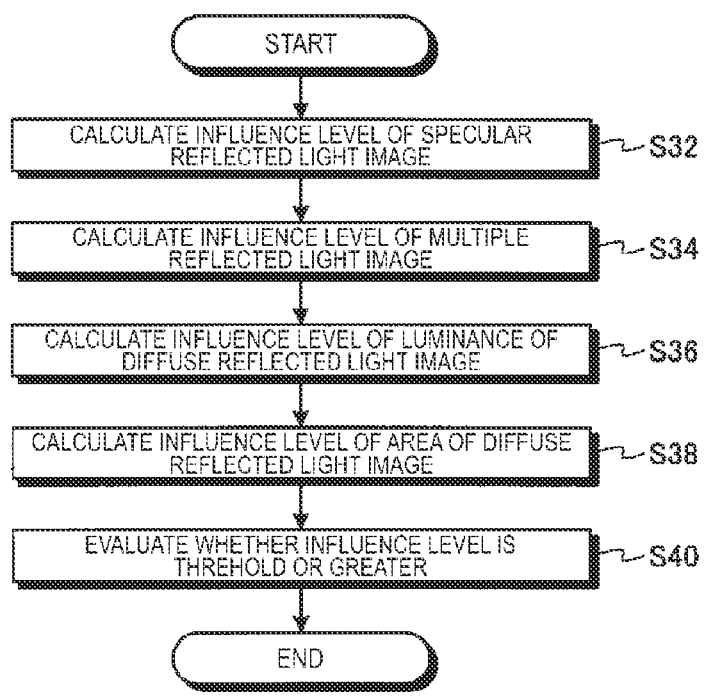
FIG. 7 is a flowchart illustrating an evaluation method performed by a detection unit according to the present embodiment.

FIG. 7 is a flowchart illustrating an evaluation method performed by the detection unit 86 according to the present embodiment. The detection unit 86 evaluates (determines) whether an image is the improper image or the proper image by performing evaluation on the basis of a detection result. The detection result refers to at least one of the improper image detected by the detection unit 86 and the proper image detected by the detection unit 86. In other words, the detection result refers to the diffuse reflected light image P1 detected by the detection unit 86, the specular reflected light image P2 detected by the detection unit 86, and the multiple reflected light image P3 detected by the detection unit 86. The detection unit 86 evaluates the diffuse reflected light image P1 detected, that is, the detected proper image, and evaluates whether the occlusion image P4 and the improper luminance image P5 are present in the diffuse reflected light image P. and in a case where the occlusion image P4 and the improper luminance image P5 are present, the detection unit 86 evaluates (determines) that the occlusion image P4 and the improper luminance image P5 are improper images. Additionally, the detection unit 86 evaluates the specular reflected light image P2 and the multiple reflected light image P3, that is, the detected improper images, and evaluates (determines) whether the specular reflected light image P2 and the multiple reflected light image P are actually improper images.

As illustrated in FIG. 7, the detection unit 86 calculates an influence level V1 of the specular reflected light image P2 detected on the diffuse reflected light image P1 (step S32). The detection unit 86 calculates the influence level V1 to be higher as a luminance of the specular reflected light image P2 (intensity of light forming the specular reflected light image P2) is higher, and additionally, calculates the influence level V1 to be higher as the specular reflected light image P2 is closer to a position of the diffuse reflected light image P1. Specifically, the detection unit 86 calculates the influence level V1 by Formula (1) below.

$$V1 = \Sigma(U1/\exp(D1^2/s)) \quad (1)$$

Here, U1 is intensity of light forming the specular reflected light image P2, and more specifically, intensity of a light beam of the specular reflected light L2 that is reflected at the intersection and incident on the imager 9 in the analysis by the image analysis execution unit 84. Additionally, D1 is a distance between a position (coordinates) in the light-receiving surface 20a of a light beam of the specular reflected light L2 that is reflected at the intersection and incident on the imager 9, and a position (coordinates) in the light-receiving surface 20a of a light beam of the diffuse reflected light L1 that is reflected at the intersection and incident on the imager 9. Additionally, D1 is also considered to be a distance between a position (coordinates) in the imaging region PL of a light beam of the specular reflected light L2 that is reflected at the intersection and incident on the imager 9, and a position (coordinates) in the imaging region PL of a light beam of the diffuse reflected light L1 that is reflected at the intersection and incident on the imager 9. In the analysis by the image analysis execution unit 84, the measurement light L is divided into a plurality of light beams and thus, there may also be a plurality of light beams of the diffuse reflected light L1 that are reflected at the intersection and incident on the imager 9. In this case, the detection unit 86 calculates a distance between a position in the light-receiving surface 20a of a light beam of the specular reflected light L2 that is reflected at the intersection and incident on the imager 9, and a position in the light-receiving surface 20a of a light beam of the diffuse reflected light L1 that is reflected at the intersection and incident on the imager 9, for each of the light beams of the diffuse reflected light L1, and defines the smallest distance among the distances calculated for the respective light beams of the diffuse reflected light L1 as D. Additionally, s is a predetermined constant. Here, the specular reflected light image P2 is formed by collecting a plurality of images formed of light beams of the specular reflected light L2 that are reflected at the intersection and incident on the imager 9. In this case, the detection unit 86 calculates a product of intensity of light and a distance to a light beam of the diffuse reflected light L1 for each of the light beams of the specular reflected light L2 that are reflected at the intersection and incident on the imager 9, and more specifically, calculates a value of $(U1/\exp(D1^2/s))$ and sums the values for all of the light beams of the specular reflected light L2 to calculate the influence level V1. Intensity of a light beam of the specular reflected light L2 corresponds to a luminance of an image formed of a light beam of the specular reflected light L2. Accordingly, the influence level V1 may be calculated by calculating a product of a luminance of an image, and the image and a light beam of the diffuse reflected light L1 in the light-receiving surface 20a, for each of images formed of the light beams of the specular reflected light L2 that are reflected at the intersection and incident on the imager 9, and summing the products for all of the images formed of the light beams of the specular reflected light L2. That is, in this case, U1 in Formula (1) is a luminance of an image formed of a light beam of the specular reflected light L2 that is reflected at the intersection and incident on the imager 9, and D1 is a distance between a position (coordinates) in the light-receiving surface 20a of an image formed of a light beam of the specular reflected light L2, and a position (coordinates) in the light-receiving surface 20a of a light beam of the diffuse reflected light L1 that is reflected at the intersection and incident on the imager 9. Additionally, in a case where the measurement region PL is set, in the calculation of D1, the detection unit 86 preferably calculates a distance between a light beam of the diffuse reflected light L1 forming the diffuse reflected light image P1 in the measurement region PL used for measurement (diffuse reflected light image PA in FIG. 8 described below) and the specular reflected light image P2. That is, in this case, D1 is a distance between a position in the light-receiving surface 20a of a light beam of the specular reflected light L2 that is reflected at the intersection and incident on the imager 9, and a position in the light-receiving surface 20a of a light beam of the diffuse reflected light L1 that is reflected at the intersection and incident on the measurement region PL. Note that, in a case where an image of specular reflected light of light from a light source other than the projector 8 is present, the image may be included in the calculation of the influence level V1 of the detection unit 86. Additionally, D1 may not be the smallest distance between a position in the light-receiving surface 20a of a light beam of the specular reflected light L2 that is incident on the imager 9, and a position in the light-receiving surface 20a of a light beam of the diffuse reflected light L1 that is reflected at the intersection and incident on the imager 9. In this case, for example, an operator may set D1 in consideration of an influence of the specular reflected light image P2 on measurement accuracy of the object to be measured M.

Then, the detection unit 86 calculates an influence level V2 of the multiple reflected light image P3 detected on the diffuse reflected light image P1 (step S34). The detection unit 86 calculates the influence level V2 to be higher as a luminance of the multiple reflected light image P3 (intensity of light forming the multiple reflected light image P3) is higher, and additionally, as the multiple reflected light image P3 is closer to the position of the diffuse reflected light image P1. Specifically, the detection unit 86 calculates the influence level V2 in a method similar to the influence level V1 by Formula (2) below.

$$V2 = \Sigma(U2/\exp(D2^2/s)) \qquad (2)$$

Here, U2 is intensity of light forming the multiple reflected light image P3, and more specifically, intensity of a light beam of the multiple reflected light L3 that is reflected at the intersection and incident on the imager 9, in the analysis of the image analysis execution unit 84. D2 is a distance between a position (coordinates) in the light-receiving surface 20a of a light beam of the multiple reflected light L3 that is reflected at the intersection and incident on the imager 9, and a position (coordinates) in the light-receiving surface 20a of a light beam of the diffuse reflected light L1 that is reflected at the intersection and incident on the imager 9. Additionally, D2 is also considered to be a distance between a position (coordinates) in the imaging region PL of a light beam of the multiple reflected light L3 that is reflected at the intersection and incident on the imager 9, and a position (coordinates) in the imaging region PL of a light beam of the diffuse reflected light L1 that is reflected at the intersection and incident on the imager 9. In the analysis of the image analysis execution unit 84, the measurement light L is divided into a plurality of light beams and thus, there may be a plurality of light beams of the diffuse reflected light L1 that are reflected at the intersection and incident on the imager 9. In this case, the detection unit 86 calculates a distance between a position in the light-receiving surface 20a of a light beam of the multiple reflected light L3 that is reflected at the intersection and incident on the imager 9, and a position in the light-receiving surface 20a of a light beam of the diffuse reflected light L1 that is reflected at the intersection and incident on the imager 9, for each of the light beams of the diffuse reflected light L1, and defines the smallest distance among the distances calculated for the light beams of the diffuse reflected light L1 as D2. Here, the multiple reflected light image P3 is also formed by collecting a plurality of images formed of light beams of the multiple reflected light L3 that are reflected at the intersection and incident on the imager 9. In this case, the detection unit 86 calculates a product of intensity of light and a distance to the diffuse reflected light image P1 for each of the light beams of the multiple reflected light L3 that are reflected at the intersection and incident on the imager 9, and more specifically, calculates a value of $(U2/\exp(D1^2/s))$ and sums the values for all of the light beams of the multiple reflected light L3 to calculate the influence level V2. Intensity of a light beam of the multiple reflected light L3 corresponds to a luminance of an image formed of a light beam of the multiple reflected light L3. Accordingly, the influence level V2 may be calculated by calculating a product of a luminance of an image, and the image and a light beam of the diffuse reflected light L1 in the light-receiving surface 20a for each image formed of a light beam of the multiple reflected light L3 that is reflected at the intersection and incident on the imager 9, and summing the products for all of the images formed of the light beams of the multiple reflected light L3. That is, in this case, U2 in Formula (2) is a luminance of an image formed of a light beam of the multiple reflected light L3 that is reflected at the intersection and incident on the imager 9, and D2 is a distance between a position (coordinates) in the light-receiving surface 20a of the image formed of a light beam of the multiple reflected light L3, and a position (coordinates) in the light-receiving surface 20a of a light beam of the diffuse reflected light L1 that is reflected at the intersection and incident on the imager 9. Additionally, in a case where the measurement region PL is set, in the calculation of D2, the detection unit 86 preferably calculates a distance between a light beam of the diffuse reflected light L1 forming the diffuse reflected light image P1 in the measurement region PL used for measurement (diffuse reflected light image PA in FIG. 8 described below) and the multiple reflected light image P3. That is, in this case, D2 is a distance between a position in the light-receiving surface 20a of a light beam of the multiple reflected light L3 that is reflected at the intersection and incident on the imager 9, and a position in the light-receiving surface 20a of a light beam of the diffuse reflected light L1 that is reflected at the intersection and incident on the measurement region PL. Note that, in a case where images of multiple reflected light and diffuse reflected light of light from a light source other than the projector 8 are present, the images may be included in the calculation of the influence level V2 of the detection unit 86. Note that D2 may not be the smallest distance between a position in the light-receiving surface 20a of a light beam of the multiple reflected light L3 that is incident on the imager 9, and a position in the light-receiving surface 20a of a light beam of the diffuse reflected light L1 that is reflected at the intersection and incident on the imager 9. In this case, for example, an operator may set D2 in consideration of an influence of the multiple reflected light image P3 on measurement accuracy of the object to be measured M. Additionally, the method of calculating the influence levels V1 and V2 is not limited to the above Formulas (1) and (2). The influence level V1 may be calculated on the basis of a relative distance between the specular reflected light image P2 and the diffuse reflected light image P1 and a luminance of the specular reflected light image P2 (intensity of light forming the specular reflected light image P2). Additionally, the influence level V2 may be calculated on the basis of a relative distance between the multiple reflected light image P3 and the diffuse reflected light image P1 and a luminance of the multiple reflected light image P3 (intensity of light forming the specular reflected light image P2).

In this manner, the detection unit 86 calculates the influence levels V1 and V2 of the specular reflected light image P2 detected and the multiple reflected light image P3 detected (detected improper images) on the diffuse reflected light image P1 detected (detected proper image).

Then, the detection unit 86 calculates an influence level V3 of a luminance of the diffuse reflected light image P1 detected (intensity of light forming the diffuse reflected light image P1) (step S36), and evaluates whether the improper luminance image P5 is present as described below. The diffuse reflected light image P1 is also formed by collecting a plurality of images formed of light beams of the diffuse reflected light L1 that are reflected at the intersection and incident on the imager 9. In this case, as indicated in Formula (3) below, the detection unit 86 sums intensity of the light beams of the diffuse reflected light L1 that are reflected at the intersection and incident on the imager 9, calculates brightness (luminance) of the diffuse reflected light image P1, that is, total intensity of light forming the images of the diffuse reflected light L1, and defines the total intensity as the influence level V3. Here, U3 is intensity of one light beam of the diffuse reflected light L1 reflected at the intersection and incident on the imager 9, and can also be considered to be a luminance of the diffuse reflected light image P1 formed of one light beam of the diffuse reflected light L1 that is reflected at the intersection and incident on the imager 9. Note that in a case where the measurement region PL is set, the detection unit 86 preferably sums intensity of light forming the images of the diffuse reflected light L1 in the measurement region PL, that is, intensity of light beams of the diffuse reflected light L1 that are reflected at the intersection and incident on the measurement region PL, and calculates the influence level V3.

$$V3=\Sigma(U3) \quad (3)$$

Then, the detection unit 86 calculates an influence level V4 of the area of the diffuse reflected light image P1 (step S38) to evaluate whether the occlusion image P4 is present as described below. As indicated in Formula (4) below, the detection unit 86 calculates the measurement range that is the area occupied by the diffuse reflected light image P1 in the imaging region PL, and defines the calculated measurement range as the influence level V4. Here, R1 is the area of the imaging region PL, and R2 is the area of the diffuse reflected light image P1 in the imaging region PL. The occlusion image P4 is the diffuse reflected light image P1 having a missing portion. Accordingly, the area of the occlusion image P4, that is, the area of the diffuse reflected light image P1 having a missing portion is smaller than the area of the diffuse reflected light image P1 without a missing portion. Accordingly, the influence level V4 is calculated in this manner, and thus whether the occlusion image P4 is present can be evaluated. Note that in a case where the measurement region PL is set, the detection unit 86 may calculate the measurement range as the area occupied by the diffuse reflected light image P1 in the measurement region PL.

$$V4=R2/R1 \quad (4)$$

In this manner, the detection unit 86 calculates the influence levels V3 and V4 of the diffuse reflected light image P1 detected (the detected proper image).

As described above, the detection unit 86 calculates the influence levels V1, V2, V3, and V4. The order of calculation of the influence levels V1, V2, V3, and V4 is not limited to the order of the above description. When the influence levels V1, V2, V3, and V4 are calculated, the detection unit 86 evaluates (determines) whether each of the influence levels V1, V2, V3, and V4 is a threshold or greater, and evaluates (determines) whether the improper image is present or the proper image is present (step S40). The detection unit 86 sets in advance the threshold for determination, for each of the influence levels V1, V2, V3, and V4. In a case where the influence level is the threshold or greater, or smaller than the threshold, the detection unit 86 evaluates (determines) that the image is the improper image. That is, information indicating the evaluation (determination) that an image is the improper image or the proper image is considered to be an evaluation result (determination result). Moreover, the evaluation result is also considered to be information on an image evaluated as the improper image and information on an image evaluated as the proper image. However, the evaluation result may be at least one of the information on an image evaluated as the improper image or the information on an image evaluated as the proper image. That is, the detection unit 86 may evaluate only whether the improper image is present, and derive the evaluation result of the improper image, or may evaluate only whether the proper image is present, and derive the evaluation result of the proper image. In other words, that is, the detection unit 86 may perform at least one of the evaluation of whether the improper image is present and the evaluation of whether the proper image is present. Additionally, an operator sets the respective thresholds for determination of the influence levels V1, V2, V3, and V4 in consideration of an influence of the specular reflected light image P2, the multiple reflected light image P3, a luminance of the diffuse reflected light image P1 (intensity of light forming the diffuse reflected light image P1), and the occlusion image P4 on measurement accuracy of the object to be measured M. Note that the respective thresholds for determination of the influence levels V1, V2. V3, and V4 may be values calculated on the basis of design tolerance of the object to be measured M. Note that the respective thresholds for determination of the influence levels V1, V2, V3, and V4 may be different values or may be the same value.

For example, in a case where the influence level V1 is the threshold or greater, the detection unit 86 evaluates (determines) that the specular reflected light image P2 is the improper image. In a case where the influence level V1 is the threshold or greater, the specular reflected light image P2 has a high luminance, or the specular reflected light image P2 is close to the diffuse reflected light image PL. In a case where the luminance of the specular reflected light image P2 is high, a luminance of an image of the diffuse reflected light L1 is too small, and it is likely that the diffuse reflected light image P cannot be detected. Additionally, in a case where the specular reflected light image P2 is close to a position of the diffuse reflected light image P1, there is high possibility that the diffuse reflected light image P1 and the specular reflected light image P2 having a high luminance are superimposed on each other, and it is likely that the diffuse reflected light image P1 causes blown out highlights and cannot be detected. That is, in a case where the influence level V1 is the threshold or greater, the detection unit 86 evaluates that there is high possibility that the diffuse reflected light image P1 cannot be detected, and evaluates that the specular reflected light image P2 detected is the improper image. In a case where the influence level V1 is not the threshold or greater, that is, smaller than the threshold, the detection unit 86 evaluates that the specular reflected light image P2 is not the improper image (is the proper image).

Additionally, in a case where the influence level V2 is the threshold or greater, the detection unit 86 evaluates (determines) that the multiple reflected light image P3 is the improper image. In a case where the influence level V2 is the threshold or greater, the multiple reflected light image P3 has a high luminance, or the multiple reflected light image P3 is close to a position of the diffuse reflected light image PL. In a case where the luminance of the multiple reflected light image P3 is high, it is highly likely that the multiple reflected light image P3 is easily detected, and that a point group is generated from the multiple reflected light image P3, and it is highly likely that the shape measurement of the object to be measured M cannot be performed properly. In a case where the multiple reflected light image P3 is close to a position of the diffuse reflected light image P1, it is highly likely that the multiple reflected light image P3 is located in the measurement region PL for generating a point group, and thus it is highly likely that the point group is generated from the multiple reflected light image P3, and it is highly likely that the shape measurement of the object to be measured M cannot be performed properly. That is, in a case where the influence level V2 is the threshold or greater, the detection unit 86 determines that it is highly likely that a point group is generated from the multiple reflected light image P3 and it is highly likely that the shape measurement of the object to be measured M cannot be performed properly, and evaluates that the multiple reflected light image P3 detected is the improper image. In a case where the influence level V2 is not the threshold or greater, that is, smaller than the threshold, the detection unit 86 evaluates that the multiple reflected light image P3 is not the improper image (is the proper image).

In this manner, the detection unit 86 performs evaluation by using the influence levels V1 and V2, and thus evaluates the detected improper image on the basis of the relative distance between the detected improper image (the specular reflected light image P2 and the multiple reflected light image P3) and the detected proper image (the diffuse reflected light image P1), and the luminance of the detected improper image (or the intensity of light forming the detected improper image). However, as long as the detection unit 86 can evaluate the detected improper image on the basis of the detected improper image and the detected proper image, the detection unit may not use the influence levels V1 and V2 in evaluating the detected improper image. For example, the detection unit 86 may evaluate only the detected improper image on the basis of the relative distance between the detected improper image and the detected proper image and the luminance of the detected improper image.

Additionally, in a case where the influence level V3 is smaller than the threshold, the detection unit 86 determines that the diffuse reflected light image P1 is dark (a luminance is low) and is improper for measurement, and evaluates that the diffuse reflected light image P1 that is dark is the improper luminance image P5, and evaluates (determines) that the improper luminance image P5 is the improper image. In a case where the influence level V3 is not smaller than the threshold, that is, the threshold or greater, the detection unit 86 evaluates that the improper luminance image P5 is not the improper image, that is, the improper luminance image P5 is absent.

Additionally, in a case where the influence level V4 is smaller than the threshold, the detection unit 86 evaluates (determines) that the area of the diffuse reflected light image P1 is small due to occlusion, and evaluates (determines) that the diffuse reflected light image P1 having the small area is the occlusion image P4, and evaluates (determines) that the occlusion image P4 is the improper image. In a case where the influence level V4 is not smaller than the threshold, that is, the threshold or greater, the detection unit 86 evaluates that the occlusion image P4 is not the improper image, that is, the occlusion image P4 is absent. That is, the detection unit 86 evaluates, among the diffuse reflected light images P1 detected, the diffuse reflected light image P1 that does not correspond to the occlusion image P4 and the improper luminance image P5, that is, the diffuse reflected light image P1 that is not evaluated as the improper image, as the proper image.

In this manner, the detection unit 86 performs evaluation by using the influence level V3, and thus, evaluates the detected proper image on the basis of the luminance of the detected proper image (the diffuse reflected light image P1), and the detection unit 86 performs evaluation by using the influence level V4, and thus evaluates the detected proper image on the basis of the area of the detected proper image (the diffuse reflected light image P1) in the light-receiving surface 20a. However, as long as the detection unit 86 can evaluate the detected proper image on the basis of the detected proper image, the detection unit 86 may not use the influence levels V3 and V4 in evaluating the detected improper image, that is, in evaluating whether the occlusion image P4 and the improper luminance image P5 are present. For example, the detection unit 86 may evaluate only the detected proper image on the basis of the luminance of the detected proper image and the area of the detected proper image.

In this manner, the detection unit 86 evaluates (determines) the values of the influence levels V1, V2, V3, and V4, and thus evaluates whether the diffuse reflected light image P1, the specular reflected light image P2, and the multiple reflected light image P3 are the improper images. The influence levels V1, V2, V3, and V4 are considered to be influence levels of the improper image on the diffuse reflected light image P. The detection unit 86 can also be considered to evaluate the detection result of the detection unit 86, and moreover, can also be considered to evaluate the detected improper image (the specular reflected light image P2 and the multiple reflected light image P3), and evaluate the detected proper image (the diffuse reflected light image P1). Then, the detection unit 86 evaluates that the specular reflected light image P2, the multiple reflected light image P3, the occlusion image P4, and the improper luminance image P5 are the improper images, and evaluates that the diffuse reflected light image P1 evaluated as not being the occlusion image P4 and the improper luminance image P5 is the proper image. Hereinafter, in a case where the influence levels V1, V2, V3, and V4 are not differentiated from each other, the influence level will be described as V0.

A value of the influence level V0 changes with a change in the measurement condition. For example, when intensity of the measurement light L is increased as the measurement condition with respect to the determined measurement condition, intensity of the specular reflected light L2 is higher than intensity of the specular reflected light L2 under the determined measurement condition and thus, the influence level V1 is larger than that under the determined measurement condition. Accordingly, for example, the detection unit 86 calculates the influence level V1 in the case of increasing the intensity of the measurement light L, and the detection unit 86 can evaluate that due to an increase in the influence level V1, a luminance of an image of the diffuse reflected light L1 becomes too small to detect the diffuse reflected light image P1, and thus it is highly likely that the shape measurement cannot be performed properly. In this manner, since the influence level V0 changes with a change in a measurement condition, the detection unit 86 calculates a value of the influence level V0 in a case where the measurement condition is changed, and thus the detection unit 86 can evaluate whether the shape measurement of the object to be measured M can be performed properly in a case where the measurement condition is changed, and whether the shape measurement of the object to be measured M cannot be performed properly in a case where the measurement condition is changed.

Figure 8:
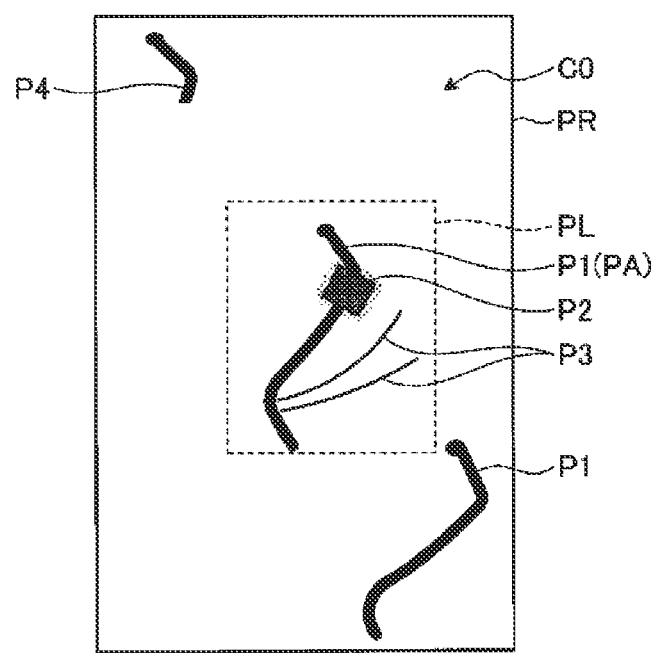
FIG. 8 is a view illustrating an example of a reproduced image.

FIG. 8 is a view illustrating an example of the reproduced image C0. The reproduced image C0 is an image displayed in the display 33 on the basis of the analysis result data of the evaluated improper image and the evaluated proper image for each position on the light-receiving surface 20a, and is an image of the measurement light L expected to be captured by the imager 9. Here, the range of the imaging region PR of the reproduced image C0 is set on the basis of the relative position of the object to be measured M and the optical probe 3, and the relative attitude of the object to be measured M and the optical probe 3, among the measurement conditions acquired by the condition acquisition unit 82. The reproduced image C0 is also considered to be a reproduced image of an image of light in the imaging region PR the range of which is set as described above. As illustrated in the example of FIG. 8, the reproduced image C0 may include the diffuse reflected light image P1, the specular reflected light image P2, the multiple reflected light image P3, and the occlusion image P4.

Additionally, although not illustrated in FIG. 8, the reproduced image C0 may include an image obtained by reproducing by analysis an image of light from a light sources other than the projector 8. Additionally, although not illustrated in FIG. 8, the reproduced image C0 may include the improper luminance image P5. Additionally, in a case where the measurement region PL is set in the measurement condition, the measurement region PL may be overlaid on the reproduced image C0 and displayed. Note that the reproduced image C0 illustrated in FIG. 8 is an example, and the reproduced image C0 changes with a change in the measurement condition. That is, in a case where the measurement condition is changed, intensity of light forming the diffuse reflected light image P1, the specular reflected light image P2, the multiple reflected light image P3, and the occlusion image P4, and positions of these images change or disappear.

Here, the detection unit 86 detects the improper images (the specular reflected light image P2 and the multiple reflected light image P3) on the basis of the analysis result data. The detection unit 86 may not evaluate the detected improper images, and may evaluate only the detected proper image (the diffuse reflected light image P1) to evaluate (determine) the presence or absence of the occlusion image P4 and the improper luminance image P5. Moreover, the detection unit 86 may only detect the proper image and the improper image, and may not evaluate both of the detected improper image and the detected proper image. Even in a case where the evaluation is not performed in this manner, the detection unit 86 detects the proper image and the improper image, and thus an operator can properly set the measurement condition by referring to the detection result.

Additionally, it is considered that on the basis of the analysis result data, the detection unit 86 detects the diffuse reflected light image P1 as the proper image, and detects the improper image from images other than the diffuse reflected light image P1. In the present embodiment, the images other than the diffuse reflected light image P1 are the specular reflected light image P2 and the multiple reflected light image P3. However, in detection based on the analysis result data, the detection unit 86 may detect the occlusion image P4 and the improper luminance image P5 as the improper images.

In the case of detecting the occlusion image P4, the detection unit 86 performs the detection based on the analysis result data. In the case of detecting the occlusion image P4, the detection unit 86 calculates, as the number of incident light beams, the number of light beams of the diffuse reflected light L1 that are reflected at the intersection and incident on the imager 9 and that are extracted at step S22 of FIG. 6. Then, the detection unit 86 calculates, as an incident ratio value, a value obtained by dividing the number of the incident light beams by the total number of the light beams divided at step S10 of FIG. 6. The incident ratio value is a value indicating a ratio of light incident on the imager 9 as the diffuse reflected light among the measurement light L. In a case where the incident ratio value is smaller than a predetermined threshold, the detection unit 86 detects an image formed by a light beam of the diffuse reflected light L1 incident on the imager 9 as the occlusion image P4, and detects the occlusion image P4 as the improper image. In a case where the incident ratio value is the predetermined threshold or greater, the detection unit 86 does not detect the occlusion image P4 (detects that the occlusion image P4 is absent), and detects an image formed by a light beam of the diffuse reflected light L1 incident on the imager 9 as the diffuse reflected light image P1, that is, the proper image. An operator may set this threshold in consideration of an influence of the occlusion image P4 on measurement accuracy of the object to be measured M. In a case where the occlusion image P4 is detected, in evaluating the occlusion image P4, the detection unit 86 uses the area of the occlusion image P4 detected, as R1 to calculate the influence level V4 at step S38 of FIG. 7. Additionally, in a case where the occlusion image P4 is detected, in evaluating the occlusion image P4, the detection unit 86 uses the area of the occlusion image P4 detected, as R1 to calculate the influence level V4 at step S38 of FIG. 7. Additionally, in a case where the occlusion image P4 is not detected, in evaluating the occlusion image P4, the detection unit 86 uses the diffuse reflected light image P1 detected, as R1 as described above. Note that the occlusion image P4 may be detected in the same method as the method of evaluating that the occlusion image P4 is present (step S38 of FIG. 7). In a case where the occlusion image P4 is detected by the same method as the evaluation of the occlusion image P4, both of the detection of the occlusion image P4 and the evaluation of the occlusion image P4 need not be performed, and at least one of the detection of the occlusion image P4 and the evaluation of the occlusion image P4 may be performed.

Additionally, in the case of detecting the improper luminance image P5, the detection unit 86 performs the detection on the basis of the analysis result data. In detecting the improper luminance image P5, the detection unit 86 calculates average intensity by averaging intensity of light beams of the diffuse reflected light L1 that are reflected at the intersection and incident on the imager 9, for all light beams of the diffuse reflected light L1 incident on the imager 9. The average intensity is an arithmetic mean value calculated by summing intensity of light beams of the diffuse reflected light L1 incident on the imager 9, for all light beams of the diffuse reflected light L1 incident on the imager 9, and dividing the total value by the number of the light beams of the diffuse reflected light L1 incident on the imager 9, and may be a geometrical mean value, for example. In a case where the average intensity is smaller than a predetermined threshold, the detection unit 86 detects an image formed of a light beam of the diffuse reflected light L1 incident on the imager 9 as the improper luminance image P5, and detects the improper luminance image P5 as the improper image. In a case where the average intensity is the predetermined threshold or greater, the detection unit 86 does not detect the improper luminance image P5 (detects that the improper luminance image P5 is absent), and detects an image formed of a light beam of the diffuse reflected light L1 incident on the imager 9 as the diffuse reflected light image P1, that is, as the proper image. An operator may set this threshold in consideration of an influence of the improper luminance image P5 on measurement accuracy of the object to be measured M. In a case where the improper luminance image P5 is detected, in evaluating the improper luminance image P5, the detection unit 86 sums intensity of light beams forming the improper luminance image P5 detected, as U3 in Formula (3), and calculates the influence level V3. In a case where the improper luminance image P5 is not detected, in evaluating the improper luminance image P5, the detection unit 86 sums intensity of light beams forming the diffuse reflected light image P1 detected, as U3 in Formula (3), and calculates the influence level V3 as described above.

Additionally, in detecting the improper luminance image P5, the detection unit 86 may detect whether intensity of a light beam of the diffuse reflected light L1 that is reflected at the intersection and incident on the image imager 9, that is, each U3 in Formula (3) is a predetermined intensity defined in advance or greater. Then, the detection unit 86 detects, among images formed of light beams of the diffuse reflected light L1 that are reflected at the intersection and incident on the imager 9, an image having intensity of a light beam that is the predetermined intensity or greater, as the diffuse reflected light image P1, that is, the proper image, and an image having intensity of a light beam that is less than the predetermined intensity, as the improper luminance image P5, that is, the improper image. Then, the detection unit 86 sums intensity of light beams forming the improper luminance image P5 detected, as U3 in Formula (3), and calculates the influence level V3. In such a case, the detection unit 86 can evaluate that an image having low intensity of one light beam (detected as the improper luminance image P5), but having a high luminance as the whole image is not the improper luminance image P5.

In this manner, the detection unit 86 detects the improper luminance image P5 in a case where a luminance of the diffuse reflected light image P1 is small. That is, in a case where a luminance of the diffuse reflected light image P1 is low, in other words, in a case where intensity of a light beam of the diffuse reflected light L1 is small, the detection unit 86 detects the improper luminance image P5. However, similarly in the intensity of a light beam of the diffuse reflected light L1, for example, since a light beam of the diffuse reflected light L1 is re-reflected within the image-forming optical system 21 (lens) of the imager 9 and formed as a flare, there is a case where the shape measurement cannot be performed properly. Accordingly, similarly in a case where intensity of a light beam of the diffuse reflected light L1 is too high (a luminance of the diffuse reflected light image P1 is too high), the detection unit 86 may detect the improper luminance image P5. In this case, in a case where the above-described average intensity or U3 in Formula (3) is outside a predetermined range, the detection unit 86 detects an image formed of a light beam of the diffuse reflected light L1 (the diffuse reflected light image P1) as the improper luminance image P5. Then, in a case where the above-described average intensity or U3 in Formula (3) is within the predetermined range, the detection unit 86 detects that an image formed of a light beam of the diffuse reflected light L1 (the diffuse reflected light image P1) includes no improper luminance image P5, that is, the improper luminance image P5 is not the improper image. Note that the predetermined range is a numerical range between a predetermined upper limit value and a predetermined lower limit value, and an operator may set the upper limit value and the lower limit value in consideration of an influence of the improper luminance image P5 on measurement accuracy of the object to be measured M.

Note that the improper luminance image P5 may be detected by the same method as the evaluation of the improper luminance image P5 (step S36 of FIG. 7). Accordingly, in a case where the improper luminance image P5 is detected, the improper luminance image P5 need not be evaluated. In a case where the occlusion image P4 is detected by the same method as the evaluation of the occlusion image P4, both of the detection of the occlusion image P4 and the evaluation of the occlusion image P4 need not be performed, and at least one of the detection of the occlusion image P4 and the evaluation of the occlusion image P4 may be performed.

In this manner, the detection unit 86 may detect the specular reflected light image P2, the multiple reflected light image P3, the occlusion image P4, and the improper luminance image P5 as the improper images, and may detect, as the proper image, the diffuse reflected light image P1 evaluated as not being the occlusion image P4 and the improper luminance image P5. Additionally, the detection unit 86 may determine on the basis of the analysis result data whether the specular reflected light image P2, the multiple reflected light image P3, the occlusion image P4, and the diffuse reflected light image P1 having a luminance of predetermined intensity or less (the improper luminance image P5) are present in the measurement region PL, and when the images are present in the measurement region PL, the detection unit 86 may detect the images as the improper images. Additionally, the detection unit 86 may determine on the basis of the analysis result data whether the specular reflected light image P2, the multiple reflected light image P3, the occlusion image P4, and the diffuse reflected light image P1 having a luminance of predetermined intensity or less (the improper luminance image P5) are present in the imaging region PR, and when the images are present in the imaging region PR, the detection unit 86 may detect the images as the improper images.

Additionally, in the present embodiment, the image analysis execution unit 84 executes analysis even under a measurement condition other than the measurement condition acquired by the condition acquisition unit 82, and also acquires analysis result data in that case. Hereinafter, the measurement condition other than the measurement condition acquired by the condition acquisition unit 82 will be described as another measurement condition, and the measurement condition acquired by the condition acquisition unit 82 will be described as an acquired measurement condition. The image analysis execution unit 84 sets another measurement condition by changing at least one acquired measurement condition (at least one of the relative position of the object to be measured M with respect to the optical probe 3, the relative attitude of the object to be measured M with respect to the optical probe 3, the intensity of the measurement light L, the exposure and exposure time of the imager 9, and the measurement region) by a predetermined value. Then, the detection unit 86 uses the analysis result data under another measurement condition to detect the improper image under another measurement condition. Then, the detection unit 86 evaluates the improper image on the basis of the detection result of the improper image under another measurement condition. That is, the detection unit 86 calculates each influence level V0 by the same method as the evaluation under the acquired measurement condition for the improper image and the proper image detected under another measurement condition.

The detection unit 86 detects how the influence level V0 under another measurement condition changes from the influence level V0 under the acquired measurement condition. That is, the detection unit 86 calculates how the influence level V0 under another measurement condition changes with respect to the influence level V0 under the acquired measurement condition.

In a case where the influence level V1 under another measurement condition is larger than the influence level V1 under the acquired measurement condition, the detection unit 86 determines that the influence level V1 becomes larger when the measurement condition is changed to another measurement condition. For example, in a case where the influence level V1 under the acquired measurement condition is smaller than a threshold (in a case where the specular reflected light image P2 is not determined as the improper image), when the influence level V under another measurement condition becomes larger than the influence level V1 under the acquired measurement condition, another measurement condition is considered to be a measurement condition under which there is high possibility that the specular reflected light image P2 is determined as the improper image. In a case where the influence level V1 under the acquired measurement condition is the threshold or greater (in a case where the specular reflected light image P2 is determined as the improper image), when the influence level V1 under another measurement condition becomes larger than the influence level V1 under the acquired measurement condition, the influence level V1 under another measurement condition becomes still larger than the threshold and thus another measurement condition is considered to be a measurement condition under which there is less possibility that the specular reflected light image P2 is determined as the proper image. That is, in a case where the influence level V1 under another measurement condition is larger than the influence level V1 under the acquired measurement condition, it is considered that under another measurement condition, there is high possibility that the specular reflected light image P2 is determined as the improper image, or there is less possibility that the specular reflected light image P2 is determined as the proper image.

In a case where the influence level V1 under another measurement condition is smaller than the influence level V1 under the acquired measurement condition, the detection unit 86 determines that the influence level V1 becomes smaller when the measurement condition is changed to another measurement condition. For example, in a case where the influence level V1 under the acquired measurement condition is smaller than a threshold (in a case where the specular reflected light image P2 is not determined as the improper image), when the influence level V1 under another measurement condition becomes smaller than the influence level V1 under the acquired measurement condition, under another measurement condition, the influence level V1 becomes still smaller than the threshold and thus, another measurement condition is considered to be a measurement condition under which there is further less possibility that the specular reflected light image P2 is determined as the improper image. In a case where the influence level V1 under the acquired measurement condition is the threshold or greater (in a case where the specular reflected light image P2 is determined as the improper image), when the influence level V1 under another measurement condition is smaller than the influence level V1 under the acquired measurement condition, another measurement condition is considered to be a measurement condition under which there is high possibility that the specular reflected light image P2 is determined as the proper image. That is, in a case where the influence level V1 under another measurement condition is smaller than the influence level V1 under the acquired measurement condition, it is considered that under another measurement condition, there is higher possibility that the specular reflected light image P2 is determined as the improper image, or there is high possibility that the specular reflected light image P2 is determined as the proper image.

In a case where the influence level V2 under another measurement condition becomes larger than the influence level V2 under the acquired measurement condition, the detection unit 86 determines that the influence level V2 becomes larger when the measurement condition is changed to another measurement condition. For example, in a case where the influence level V2 under the acquired measurement condition is smaller than a threshold (in a case where the multiple reflected light image P3 is not determined as the improper image), when the influence level V2 under another measurement condition becomes larger than the influence level V2 under the acquired measurement condition, another measurement condition is considered to be a measurement condition under which there is high possibility that the multiple reflected light image P3 is determined as the improper image. In a case where the influence level V2 under the acquired measurement condition is the threshold or greater (in a case where the multiple reflected light image P3 is determined as the improper image), when the influence level V2 under another measurement condition becomes larger than the influence level V2 under the acquired measurement condition, the influence level V2 under another measurement condition becomes still larger than the threshold, and thus, another measurement condition is considered to be a measurement condition under which there is further less possibility that the multiple reflected light image P3 is determined as the proper image. That is, in a case where the influence level V2 under another measurement condition is larger than the influence level V2 under the acquired measurement condition, it is considered that under another measurement condition, there is high possibility that the multiple reflected light image P3 is determined as the improper image, or there is less possibility that the multiple reflected light image P3 is determined as the proper image.

Similarly, in a case where the influence level V2 under another measurement condition is smaller than the influence level V2 under the acquired measurement condition, the detection unit 86 determines that the influence level V2 becomes smaller when the measurement condition is changed to another measurement condition. For example, in a case where the influence level V2 under the acquired measurement condition is smaller than the threshold (in a case where the multiple reflected light image P3 is not determined as the improper image), when the influence level V2 under another measurement condition becomes smaller than the influence level V2 under the acquired measurement condition, under another measurement condition, the influence level V2 becomes still smaller than the threshold and thus, another measurement condition is considered to be a measurement condition under which there is further less possibility that the multiple reflected light image P3 is determined as the improper image. In a case where the influence level V2 under the acquired measurement condition is the threshold or greater (in a case where the multiple reflected light image P3 is determined as the improper image), when the influence level V2 under another measurement condition is smaller than the influence level V2 under the acquired measurement condition, another measurement condition is considered to be a measurement condition under which there is high possibility that the multiple reflected light image P3 is determined as the proper image. That is, in a case where the influence level V2 under another measurement condition is smaller than the influence level V2 under the acquired measurement condition, under another measurement condition, there is less possibility that the multiple reflected light image P3 is determined as the improper image, or there is high possibility that the multiple reflected light image P3 is determined as the proper image.

In a case where the influence level V3 under another measurement condition is larger than the influence level V3 under the acquired measurement condition, the detection unit 86 determines that the influence level V3 becomes larger when the measurement condition is changed to another measurement condition. For example, in a case where the influence level V3 under the acquired measurement condition is smaller than a threshold (in a case where the improper luminance image P5 is determined as the improper image), when the influence level V3 under another measurement condition becomes larger than the influence level V3 under the acquired measurement condition, another measurement condition is considered to be a measurement condition under which there is high possibility that the improper luminance image P5 is determined as the proper image (that is, it is evaluated that the improper luminance image P5 is absent). In a case where the influence level V3 under the acquired measurement condition is the threshold or greater (in a case where it is evaluated that the improper luminance image P5 is not the improper image and the improper luminance image P5 is absent), when the influence level V3 under another measurement condition becomes larger than the influence level V3 under the acquired measurement condition, the influence level V3 under another measurement condition becomes still larger than the threshold, and thus another measurement condition is considered to be a measurement condition under which there is further less possibility that it is determined that the improper luminance image P5 is present (the improper luminance image P5 is determined as the improper image). That is, in a case where the influence level V3 under another measurement condition is larger than the influence level V3 under the acquired measurement condition, under another measurement condition, there is high possibility that the improper luminance image P5 is determined as the proper image, or there is less possibility that the improper luminance image P5 is determined as the improper image.

In a case where the influence level V3 under another measurement condition is smaller than the influence level V3 under the acquired measurement condition, the detection unit 86 determines that the influence level V3 becomes smaller when the measurement condition is changed to another measurement condition. For example, in a case where the influence level V3 under the acquired measurement condition becomes smaller than the threshold (in a case where the multiple reflected light image P5 is determined as the improper image), when the influence level V3 under another measurement condition becomes smaller than the influence level V3 under the acquired measurement condition, the influence level V3 under another measurement condition becomes still smaller than the threshold, and thus, another measurement condition is considered to be a measurement condition under which there is further less possibility that the improper luminance image P5 is determined as the proper image (that is, it is evaluated that the improper luminance image P5 is absent). In a case where the influence level V3 under the acquired measurement condition is the threshold or greater (in a case where the improper luminance image P5 is not determined as the improper image and it is evaluated that the improper luminance image P5 is absent), when the influence level V3 under another measurement condition becomes smaller than the influence level V3 under the acquired measurement condition, another measurement condition is considered to be a measurement condition under which there is high possibility that it is determined that the improper luminance image P5 is present (the improper luminance image P5 is determined as the improper image). That is, in a case where the influence level V3 under another measurement condition is smaller than the influence level V3 under the acquired measurement condition, it is considered that under another measurement condition, there is less possibility that the improper luminance image P5 is determined as the proper image, or there is high possibility that the improper luminance image P5 is determined as the improper image.

In a case where the influence level V4 under another measurement condition is larger than the influence level V4 under the acquired measurement condition, the detection unit 86 determines that the influence level V4 becomes larger when the measurement condition is changed to another measurement condition. For example, in a case where the influence level V4 under the acquired measurement condition is smaller than a threshold (in a case where the occlusion image P4 is determined as the improper image), when the influence level V4 under another measurement condition becomes larger than the influence level V4 under the acquired measurement condition, another measurement condition is considered to be a measurement condition under which there is high possibility that the occlusion image P4 is determined as the proper image (that is, it is evaluated that the occlusion image P4 is absent). In a case where the influence level V4 under the acquired measurement condition is the threshold or greater (in a case where the occlusion image P4 is not determined as the improper image and it is evaluated that the occlusion image P4 is absent), when the influence level V4 under another measurement condition becomes larger than the influence level V4 under the acquired measurement condition, the influence level V4 under another measurement condition becomes still larger than the threshold, and thus another measurement condition is considered to be a measurement condition under which there is further less possibility that it is determined that the occlusion image P4 is present (the occlusion image P4 is determined as the improper image). That is, in a case where the influence level V4 under another measurement condition is larger than the influence level V4 under the acquired measurement condition, it is considered that under another measurement condition, there is high possibility that the occlusion image P4 is determined as the proper image, or there is less possibility that the occlusion image P4 is determined as the improper image.

In a case where the influence level V4 under another measurement condition is smaller than the influence level V4 under the acquired measurement condition, the detection unit 86 determines that the influence level V4 becomes smaller when the measurement condition is changed to another measurement condition. For example, in a case where the influence level V4 under the acquired measurement condition is smaller than the threshold (in a case where the occlusion image P4 is determined as the improper image), when the influence level V4 under another measurement condition becomes smaller than the influence level V4 under the acquired measurement condition, the influence level V4 under another measurement condition becomes still smaller than the threshold, and another measurement condition is considered to be a measurement condition under which there is less possibility that the occlusion image P4 is determined as the proper image (that is, it is evaluated that the occlusion image P4 is absent). In a case where the influence level V4 under the acquired measurement condition is the threshold or greater (in a case where the occlusion image P4 is not determined as the improper image and it is evaluated that the occlusion image P4 is absent), when the influence level V4 under another measurement condition is smaller than the influence level V4 under the acquired measurement condition, and another measurement condition is considered to be a measurement condition under which there is high possibility that it is determined that the occlusion image P4 is present (the occlusion image P4 is determined as the improper image). That is, in a case where the influence level V4 under another measurement condition is smaller than the influence level V4 under the acquired measurement condition, it is considered that under another measurement condition, there is less possibility that the occlusion image P4 is determined as the proper image, or there is high possibility that the occlusion image P4 is determined as the improper image.

In this manner, the detection unit 86 calculates how the influence level V0 changes in a case where the measurement condition is changed. Since in the evaluation result of the detection unit 86 in the present embodiment, the improper image and the proper image are evaluated on the basis of the comparison of the influence level V0 and the threshold, the detection unit 86 can also calculate a change in the evaluation result of the detection unit 86 by calculating how the influence level V0 changes. That is, as described above, for example, when the influence level V4 becomes large, the evaluation result of the detection unit 86 changes such that there is less possibility that the occlusion image P4 is determined as the proper image or there is high possibility that the occlusion image P4 is determined as the improper image. Hereinafter, information on a change in the influence level V0 detected by the detection unit 86 in a case where the measurement condition is changed is referred to as change information. The change information can be considered to be information on a change in the evaluation result in a case where the measurement condition is changed.

Returning to FIG. 3A, the output unit 88 outputs the detection result information that is information based on the detection result of the image analyzer 83, to the display 33, and causes the display 33 to display an image. Hereinafter, the image that the output unit 88 causes the display 33 to display will be described.

Figure 9A:
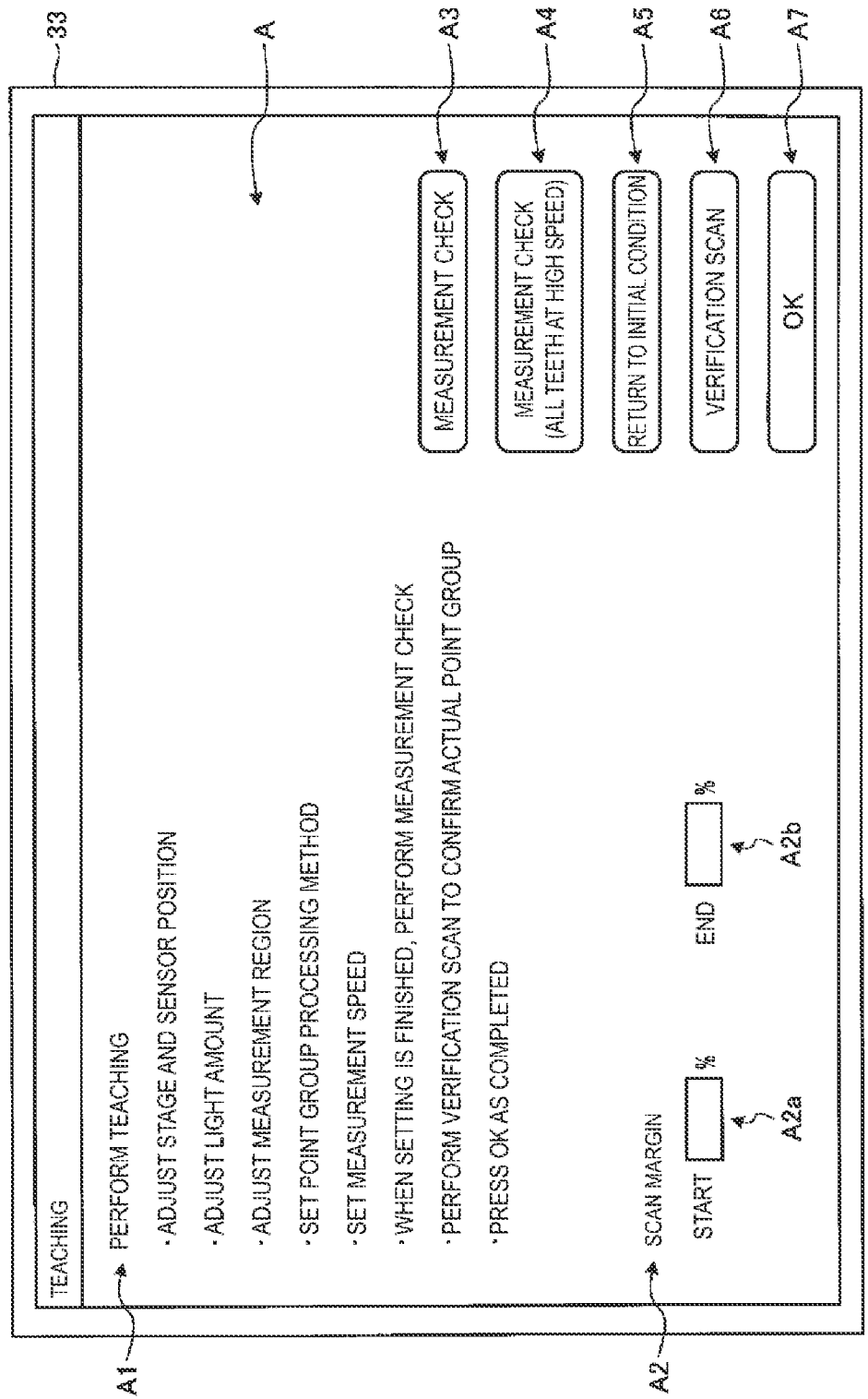
FIG. 9A is a view illustrating an example of a menu image.

FIG. 9A is a view illustrating an example of a menu image A. When an operator sets the measurement condition for shape measurement, the output unit 88 outputs information for displaying the menu image A to the display 33, and causes the display 33 to display the menu image A. The menu image A that the display 33 displays includes an instruction image A1, a scan margin setting image A2, measurement check images A3 and A4, an initial condition image A5, a verification scan image A6, and an OK image A7. When an operator selects the measurement check images A3 and A4 in the menu image A by using the input unit 32, the analyzer 40 performs measurement check. Additionally, when an operator selects the verification scan image A6 in the menu image A by using the input unit 32, the measurement controller 38 performs a verification scan. The measurement check refers to analysis by the image analyzer 83, and specifically refers to processing in which the image analysis execution unit 84 calculates analysis result data on the basis of the design information acquired by the design information acquisition unit 80 and the measurement condition acquired by the condition acquisition unit 82, and the detection unit 86 derives a detection result by detecting the improper image and the proper image, and evaluation is performed on the basis of the detection result to derive an evaluation result. Note that, as described above, in the present embodiment, the measurement condition acquired by the condition acquisition unit 82, that is, the measurement condition under which analysis is performed is the measurement condition determined by an operator by teaching (determined measurement condition). The verification scan refers to processing in which the measurement light L from the projector 8 is projected onto the object to be measured M under the measurement condition determined by an operator by teaching (determined measurement condition), the measurement light L projected onto the object to be measured M is imaged by the imager 9, and a point group is generated from the captured image T captured by the imager 9. Hereinafter, each image of the menu image A will be described.

The instruction image A1 is an image in which contents notifying of an operation to be performed by an operator are displayed. In the example of FIG. 9A, the instruction image A1 includes information "perform teaching," and this is information for making an operator recognize that teaching is to be performed. Additionally, the instruction image A1 includes information such as "adjust a stage and a sensor position," "adjust a light amount" "adjust a measurement region," and "set measurement speed," and this is information for making an operator recognize which measurement condition is to be adjusted in the teaching. Additionally, the instruction image A1 includes information "when setting is finished, perform measurement check," and this is information for making an operator recognize that when the measurement condition is set, the measurement check is to be performed. Additionally, the instruction image A1 also includes information "perform a verification scan to confirm an actual point group," and this is information for prompting an operator to perform a verification scan when the measurement check is finished, and to confirm that the generated point group has no problem. Additionally, the instruction image A1 includes information "press OK as completed," and this is information for prompting an operator to finish determining the measurement condition, and complete a verification scan to start actual shape measurement when there is no problem. However, the information displayed in the instruction image A1 is not limited to these. Additionally, the menu image A may not include the instruction image A1.

Figure 9B:
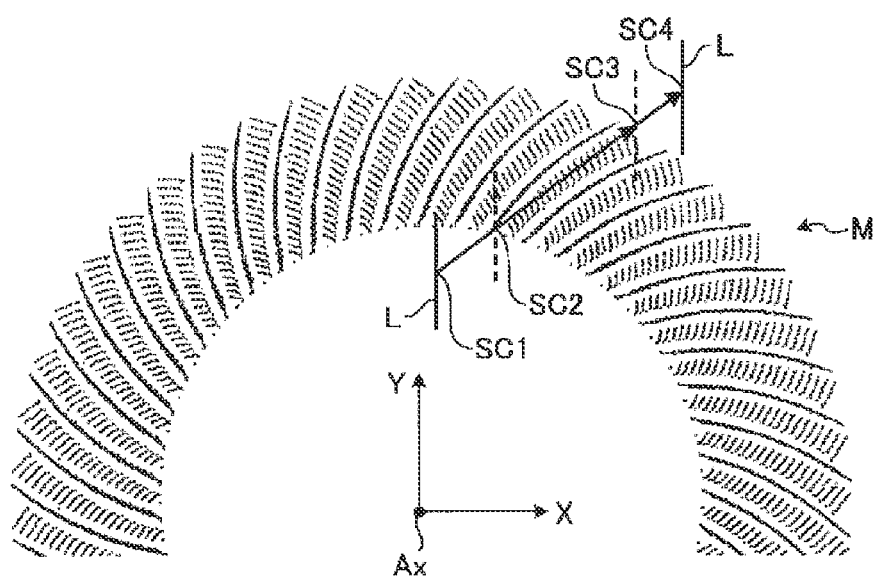
FIG. 9B is an explanatory view of a scan margin.

FIG. 9B is an explanatory view of a scan margin. The scan margin setting image A2 is an image that can be selected by operating the input unit 32 by an operator, and is an image for making an operator determine the scan margin. As illustrated in FIG. 9B, the scan margin refers to a margin between a scan start position SC1 and a scan end position SC4 of the measurement light L, that is, a margin of a position where the measurement light L starts a scan and a position where the measurement light L ends a scan, with respect to a measurement position of the object to be measured M. That is, in measuring, the measurement light L moves (scans) on a trajectory from the scan start position SC1 to the scan end position SC4. However, actually, the object to be measured M is present from a measurement start position SC2 to a measurement end position SC3. The scan margin refers to a value indicating how far the scan start position SC1 is located upstream of the measurement start position SC2 on the trajectory, or how far the scan end position SC4 is located downstream of the measurement end position SC3 on the trajectory. As illustrated in FIG. 9A, the scan margin setting image A2 includes a start setting image A2a and an end setting image A2b. In a case where the input unit 32 includes a mouse and a keyboard, an operator operates the mouse of the input unit 32 to superimpose a mouse cursor on the start setting image A2a or the end setting image A2b of the scan margin setting image A2, on the screen of the display 33, that is, on the menu image A. The start setting image A2a is an image enabling setting a percentage of the scan margin at the scan start position SC1, that is, how much the scan start position SC1 is located in front of the measurement start position SC2. The end setting image A2b is an image for setting a percentage of the scan margin at the scan end position SC4, that is, how much the scan end position SC4 is located behind the measurement end position SC3. An operator can click a mouse button with a cursor superimposed on the start setting image A2a and operate a keyboard to input a numerical value, for example, and can set the scan margin at the scan start position SC1. Additionally, an operator can click a mouse button with a cursor superimposed on the start setting image A2a and operate a keyboard provided in the input unit 32 to input a numerical value, for example, and can set the scan margin at the scan start position SC4. Note that in a case where the display 33 is a touch panel, an operator may touch a position at which the start setting image A2a or the end setting image A2b is displayed, on the display screen of the display 33, and thus, select the start setting image A2a or the end setting image A2b, and touch an operational panel displayed on the display screen of the display 33 to input a numerical value, and thus, may set the scan margin. However, the menu image A may not include the scan margin setting image A2.

As illustrated in FIG. 9A, the measurement check images A3 and A4 are display for performing the measurement check. In a case where the input unit 32 includes a mouse, an operator operates the mouse of the input unit 32 to superimpose a mouse cursor on the measurement check image A3 or the measurement check image A4, on the screen of the display 33, that is, on the menu image A. An operator clicks a mouse button with a cursor superimposed on the measurement check image A3 or the measurement check image A4, and thus, selects the measurement check image A3 or the measurement check image A4. When an operator selects the measurement check image A3 or the measurement check image A4, the analyzer 40 executes the measurement check. Additionally, in a case where the display 33 is a touch panel, an operator touches a position at which the measurement check image A3 or the measurement check image A4 is displayed on the display screen of the display 33, and thus selects the measurement check image A3 or the measurement check image A4. Note that, as an example, the measurement check image A3 is display for executing analysis under a measurement condition of scanning teeth one by one, as illustrated in FIG. 9B. On the other hand, the measurement check image A4 is display for executing analysis under a measurement condition of rotating the object to be measured M to scan all teeth and performing measurement at high speed. Note that the menu image A may include at least one of the measurement check images A3 and A4.

The initial condition image A5 is display for returning the measurement condition to initial setting. In a case where the input unit 32 includes a mouse, an operator operates the mouse of the input unit 32 to superimpose a mouse cursor on the initial condition image A5 on the screen of the display 33. An operator clicks a mouse button with the cursor superimposed on the initial condition image A5, and thus, selects the initial condition image A5. Additionally, in a case where the display 33 is a touch panel, an operator touches a position at which the initial condition image A5 is displayed, on the display screen of the display 33, and thus, selects the initial condition image A5. When an operator selects the initial condition image A5, the measurement condition returns to an initially set measurement condition (initial condition).

The verification scan image A6 is display for performing a verification scan. In a case where the input unit 32 includes a mouse, an operator operates the input unit 32 to superimpose a mouse cursor on the verification scan image A6 on the screen of the display 33. An operator clicks a mouse button with the cursor superimposed on the verification scan image A6, and thus, selects the verification scan image A6. Additionally, in a case where the display 33 is a touch panel, an operator touches a position at which the verification scan image A6 is displayed, on the display screen of the display 33, and thus, selects the verification scan image A6. When an operator selects the verification scan image A6, the measurement controller 38 executes a verification scan under the determined measurement condition. That is, the measurement controller 38 causes the projector 8 to project the measurement light L onto the object to be measured M, and causes the imager 9 to capture an image of the measurement light L projected onto the object to be measured M. Then, the measurement controller 38 generates a point group from the captured image T captured by the imager 9. An operator confirms the generated point group, and thus determines whether the measurement condition is proper.

The OK image A7 is display for ending the teaching and shifting to actual measurement. In a case where the input unit 32 includes a mouse, an operator operates the input unit 32 to superimpose a mouse cursor on the OK image A7 on the screen of the display 33. An operator clicks a mouse button with the cursor superimposed on the OK image A7, and thus, selects the OK image A7. Additionally, in a case where the display 33 is a touch panel, an operator touches a position at which the OK image A7 is displayed, on the display screen of the display 33, and thus, selects the OK image A7. When an operator selects the OK image A7, the determination of the measurement condition by the teaching ends, and the shape measurement under the determined measurement condition starts.

Figure 10:
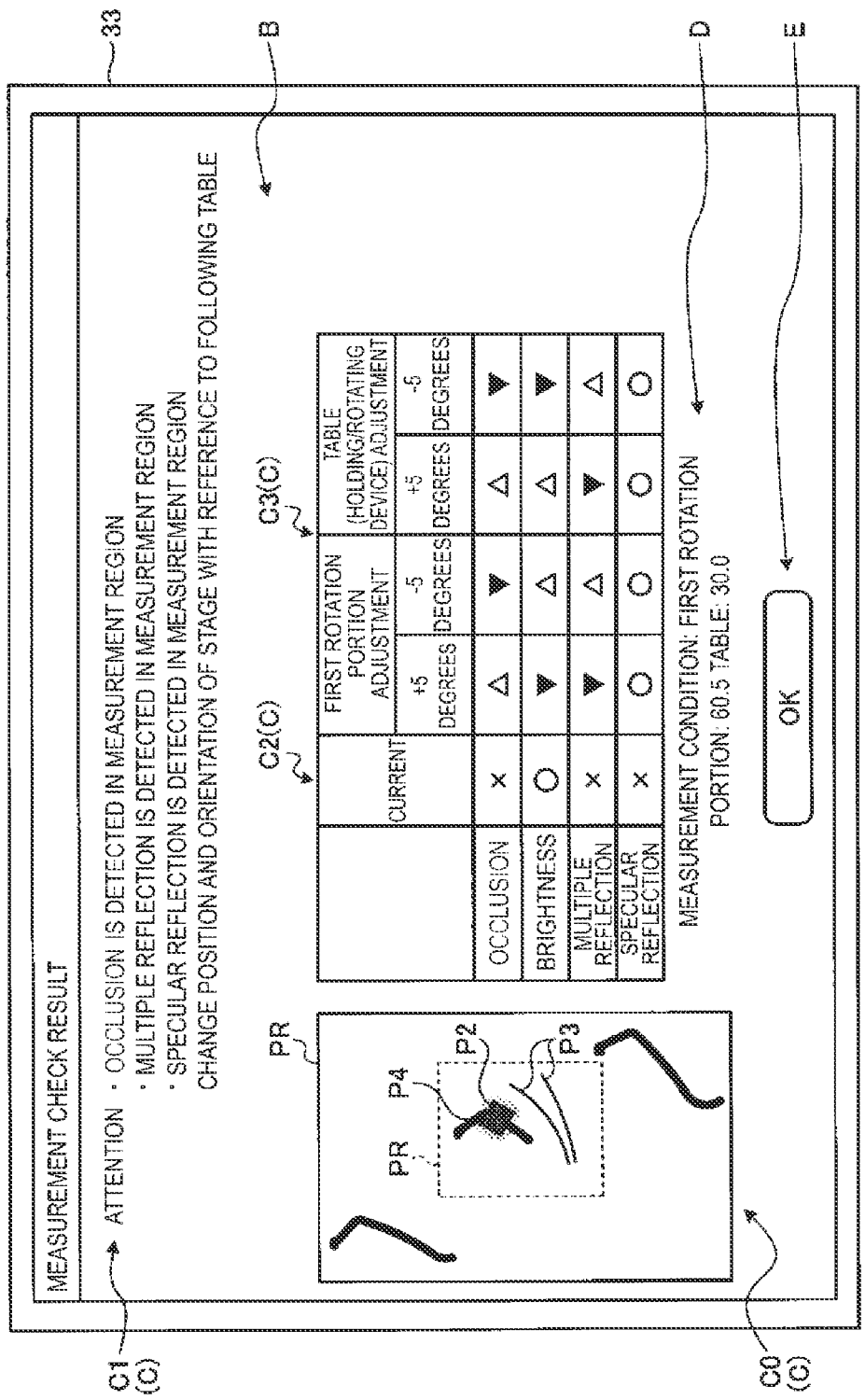
FIG. 10 is a view illustrating an example of a measurement check result screen.
Figure 11:
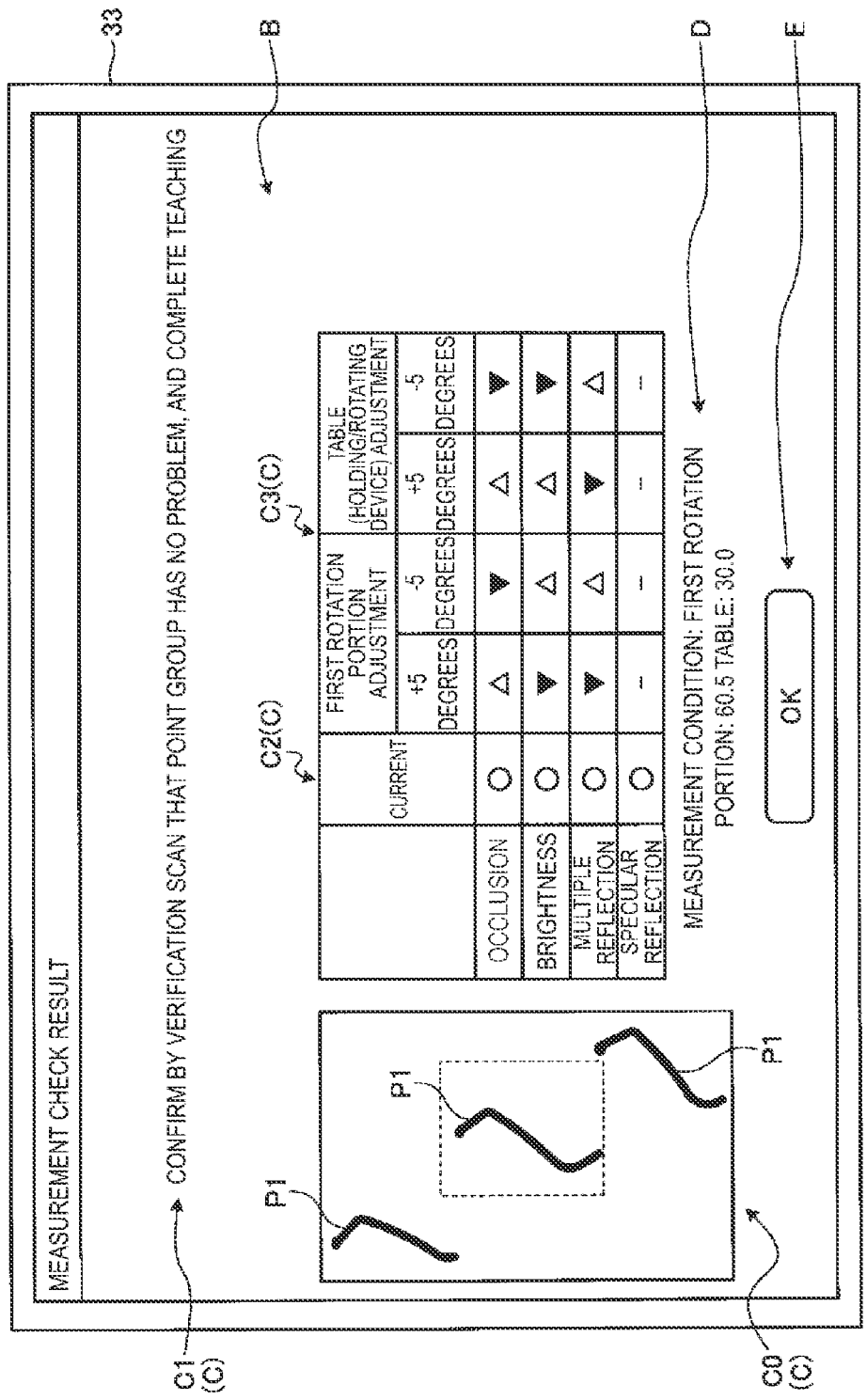
FIG. 11 is a view illustrating an example of a measurement check result screen.

FIG. 10 and FIG. 11 are views illustrating examples of a measurement check result screen B. As described above, an operator operates, for example, the mouse of the input unit 32 to click the mouse button with the cursor superimposed on the measurement check images A3 and A4, and thus, selects the measurement check images A3 and A4. The image analyzer 83 selects the measurement check images A3 and A4 in this manner, and thus starts the measurement check. That is, the image analysis execution unit 84 of the image analyzer 83 performs analysis to generate analysis result data. Then, the detection unit 86 of the image analyzer 83 detects the improper image and the proper image on the basis of the analysis result data, and evaluates the improper image and the proper image on the basis of the detection result. When the measurement check ends, the output unit 88 outputs the detection result information to the display 33, and causes the display to display the measurement check result screen B illustrated in FIG. 10. As described in detail below, the detection result information is information based on the detection result of the detection unit 86. The measurement check result screen B displayed by the display 33 is a screen displaying an image indicating the detection result information (a detection result image C described below). An operator confirms the detection result image C of the measurement check result screen B. and thus can visually recognize the improper image or the proper image under the measurement condition in the measurement check. An operator confirms contents of the detection result image C and, for example, in a case where the improper image is present, the operator readjusts the measurement condition.

FIG. 10 illustrates an example of the measurement check result screen B in the case of detection of the improper image. FIG. 10 illustrates an example in which the specular reflected light image P2, the multiple reflected light image P3, and the occlusion image P4 are detected as the improper images. As illustrated in FIG. 10, the measurement check result screen B displays the detection result image C, a measurement condition image D. and an OK image E. The detection result image C is an image indicating contents of the detection result information based on the detection result of the detection unit 86, in other words, an image displaying information on the improper image detected by the detection unit 86.

The output unit 88 outputs the detection result information to the display 33, and causes the display 33 to display the detection result image C. As described above, the detection result information is information based on the detection result of the detection unit 86. As described above, the detection result of the detection unit 86 refers to the diffuse reflected light image P detected (detected proper image) and the specular reflected light image P2 detected and the multiple reflected light image P3 detected (detected improper images).

Additionally, the detection result information includes the evaluation result of the detection unit 86 as information based on the detection result. As described above, the evaluation result refers to information indicating evaluation (determination) whether an image is the improper image or the proper image, in other words, information indicating whether an image evaluated as the improper image is present, and information indicating whether an image evaluated as the proper image is present. Additionally, the evaluation result also include information indicating what kind of improper image is evaluated to be present, that is, the type of an image determined as the improper image by evaluation. Accordingly, the information indicating the type of an image determined as the improper image by evaluation is considered to be information indicating which of the specular reflected light image P2, the multiple reflected light image P3, the occlusion image P4, and the improper luminance image P5 an image evaluated as the improper image is. In other words, the evaluation result includes information indicating whether it is evaluated that the specular reflected light image P2 is present, information indicating whether it is evaluated that the multiple reflected light image P3 is present, information indicating whether it is evaluated that the occlusion image P4 is present, and information indicating whether it is evaluated that the improper luminance image P5 is present. Additionally, the evaluation result also includes information indicating that it is not evaluated that the improper image is present, that is, information indicating that it is evaluated that the improper image is absent (only the proper image is present).

Additionally, the detection result information also includes the change information indicating a change in the influence level V0 in a case where the measurement condition is changed. Additionally, the detection result information also includes image data for displaying the reproduced image C0 in the display 33, that is, information based on the analysis result data for each position on the light-receiving surface 20$a$. In the present embodiment, the image data for displaying the reproduced image C0 in the display 33 includes both of image data of the improper image evaluated as the improper image by the detection unit 86, and image data of the proper image evaluated as the proper image by the detection unit 86. Accordingly, the reproduced image C0 displayed by using the image data becomes the reproduced image C0 including the improper image and the proper image. In this manner, the reproduced image C0 is considered to be information based on the evaluation result including the evaluated improper image and the evaluated proper image. Note that the image data for displaying the reproduced image C0 in the display 33 may be image data of the improper image detected by the detection unit 86 and image data of the proper image detected by the detection unit 86. That is, the reproduced image C0 may be information based on the detection result including the detected improper image and the detected proper image.

Note that the detection result information may include the detection result. The detection result in the detection result information is information indicating the improper image and the proper image detected by the detection unit 86. Additionally, the detection result in the detection result information is considered to be information indicating whether an image detected as the improper image is present, and information indicating whether an image detected as the proper image is present. Additionally, the detection result in the detection result information also includes information indicating what kind of improper image is detected to be present, that is, information indicating the type of image detected as the improper image. The information indicating the type of image detected as the improper image is considered to be information indicating which of the specular reflected light image P2 and the multiple reflected light image P3 an image detected as the improper image is. In other words, the detection result in the detection result information includes information indicating whether the specular reflected light image P2 is detected and information indicating whether the multiple reflected light image P3 is detected. Additionally, the detection result in the detection result information also includes information indicating that it is not detected that the improper image is present, that is, information indicating that it is detected that the improper image is absent. Note that the evaluation result described above is information indicating whether the improper image and the proper image are present, and may overlap with this detection result. Accordingly, in a case where the detection result information includes the evaluation result, the detection result information may not include the detection result. Conversely, in a case where the detection result information includes the detection result, the detection result information may not include the evaluation result. That is, the detection result information may include at least one of the evaluation result and the detection result. Hereinafter, the detection result information will be described assuming that the detection result information include the evaluation result and does not include the detection result.

As illustrated in FIG. 10, the detection result image C displayed by the display 33 on the basis of the detection result information includes the reproduced image C0, a detection result notification image C1, an evaluation result image C2, and a change image C3. The output unit 88 outputs image data for displaying the reproduced image C0 in the display 33, as the detection result information to the display 33, and causes the display 33 to display the reproduced image C0. The reproduced image C0 in FIG. 10 includes the specular reflected light image P2, the multiple reflected light image P3, and the occlusion image P4 as the improper images. The reproduced image C0 is displayed adjacent to the evaluation result image C2 and the change image C3, but may be displayed at any position.

Additionally, the output unit 88 outputs the evaluation result to the display 33 as the detection result information, and causes the display 33 to display the detection result notification image C1 The detection result notification image C1 is an image indicating the presence or absence of the improper image. However, the image data for displaying the reproduced image C0 is also considered to be information indicating the presence or absence of the improper image. Accordingly, the reproduced image C0 and the evaluation result image C2 described below are also considered to be images indicating information on the presence or absence of the improper image. Accordingly, in other words, the detection result image C is considered to be an image indicating information on the presence or absence of the improper image.

In a case where it is evaluated that the improper image is present, the output unit 88 outputs, as the evaluation result, information indicating that an image evaluated as the improper image is present, and information indicating what kind of improper image is present, that is, information on the type of evaluated improper image, to the display 33. In this case, the detection result notification image C1 includes display of "occlusion is detected in the measurement region" indicating that the type of improper image is the occlusion image P4, and that the occlusion image P4 is evaluated as the improper image, display of "multiple reflection is detected in the measurement region" indicating that the type of improper image is the multiple reflected light image P3 and that the multiple reflected light image P3 is evaluated as the improper image, and display of "specular reflected light is detected in the measurement region," indicating that the type of improper image is the specular reflected light image P2 and that the specular reflected light image P2 is evaluated as the improper image. Additionally, the detection result notification image C1 also includes information that prompts adjusting the measurement condition, "change a position and attitude of a stage with reference to the following table." Note that the detection result notification image C1 is not limited to display using the above-described character string, and may be display using other character strings. Additionally, the detection result notification image C1 is not limited to display using characters, and may be display using a picture and a symbol indicating information indicating that the improper image is detected and information on the type of detected improper image. Additionally, the detection result notification image C1 may be display only indicating information indicating the presence or absence of the improper image. Additionally, as illustrated in FIG. 10, the detection result image C is displayed in a region of an upper portion of the measurement check result screen B, but may be displayed at any position.

The output unit 88 outputs the evaluation result to the display 33 as the detection result information, and causes the display 33 to display the evaluation result image C2. The evaluation result image C2 is an image indicating the evaluation result of the improper image. The evaluation result for displaying the evaluation result image C2 is information including the evaluation of the detection unit 86 for each image evaluated as the improper image. In the example of FIG. 10, the occlusion image P4, the specular reflected light image P2, and the multiple reflected light image P3 are evaluated as the improper images, and the improper luminance image P5 is not evaluated as the improper image. That is, it is evaluated that the improper luminance image P5 is absent. Accordingly, in the example of FIG. 10, the evaluation result for displaying the evaluation result image C2 includes information indicating that the occlusion image P4, the specular reflected light image P2, and the multiple reflected light image P3 are evaluated as the improper images, and information indicating that the improper luminance image P5 is not evaluated as the improper image (the improper luminance image P5 is absent).

Accordingly, in the example of FIG. 10, the evaluation result image C2 displays evaluation of each of the occlusion image P4 ("occlusion" in FIG. 10), the improper luminance image P5 ("brightness" in FIG. 10), the specular reflected light image P2 ("specular reflection" in FIG. 10), and the multiple reflected light image P3 ("multiple reflection" in FIG. 10), as an image. In the example of FIG. 10, the detection unit 86 evaluates the occlusion image P4, the specular reflected light image P2, and the multiple reflected light image P3 as the improper images, and thus, a symbol x is displayed. On the other hand, the detection unit 86 does not evaluate the improper luminance image P5 as the improper image, and thus a symbol ○ indicating that there is no problem is displayed. Moreover, the evaluation result image C2 is a table in which each of the types of images evaluated as the improper images is displayed in a first column, and the evaluation results (here, ○ or x) of the images evaluated as the improper images displayed in the first column is displayed in a second column.

However, when the evaluation result image C2 is an image indicating the evaluation by the detection unit 86 for each image evaluated as the improper image, the display method is not limited to the form of the table as illustrated in FIG. 10, and is any method. Note that the evaluation result image C2 is not limited to symbols such as ○ and x, and may be other symbols as long as an operator can be notified of the evaluation result by the detection unit 86. Additionally, a string of characters may be used in place of a symbol. In this case, for example, when an image is not evaluated as the improper image, "OK" may be displayed, and when an image is evaluated as the improper image, "NG" may be displayed. Additionally, the evaluation result image C2 may be display in color. In this case, for example, when an image is not evaluated as the improper image, a target location in the evaluation result image C2 may be displayed in green, and when an image is evaluated as the improper image, a target location in the evaluation result image C2 may be displayed in red. Note that notification of the evaluation result is not limited to notifying an operator by visual information as the evaluation result image C2. The evaluation result may be audible information such that an operator is notified by sound of the presence or absence of the evaluated improper image. In this case, for example, a speaker (not illustrated) outputs sound to an operator.

The output unit 88 outputs the change information to the display 33 as the detection result information, and causes the display 33 to display the change image C3. The change image C3 is an image representing the change information. The change information is information indicating a change in the influence level V0 in a case where the measurement condition is changed. More specifically, the change information for displaying the change image C3 is information indicating a trend of a change in the influence level V0 of an image evaluated as the improper image in a case where a value of the measurement condition of a device provided in the shape measurement device 1 is changed. Examples of the device provided in the shape measurement device 1 include the first rotation portion 53, the second rotation portion 54, and the table 71 (the holding/rotating device 7) that change the relative attitude, the X movement portion 50X, the Y movement portion 50Y, and the Z movement portion 50Z that change the relative position, the projector 8 that changes the intensity of the measurement light L, and the imager 9 that changes the exposure and exposure time. In the example of FIG. 10, the first rotation portion 53 and the table 71 (holding/rotating device 7) of the shape measurement device 1 are the devices provided in the shape measurement device 1, and the measurement condition to be changed includes angles of the first rotation portion 53 and the table 71. Accordingly, the change information includes information on how the influence level V0 changes in a case where the angle of the first rotation portion 53 is changed, and information on how the influence level V0 changes in a case where the angle of the table 71 is changed, for each image evaluated as the improper image. Note that in the change information, a device other than the first rotation portion 53 and the table 71 may be the device provided in the shape measurement device 1.

In the example of FIG. 10, the change image C3 indicates a trend of a change in each influence level V0 in a case where the angle of the first rotation portion 53 is changed by +5 degrees, a case where the angle of the first rotation portion 53 is changed by −5 degrees, a case where the angle of the table 71 is changed by +5 degrees, and a case where the angle of the table 71 is changed by −5 degrees, from the current measurement condition. Specifically, in the example of FIG. 10, in information indicating a trend of a change in the influence level V4, the influence level V4 for the occlusion image P4 ("occlusion" in FIG. 10) increases in a case where the angle of the first rotation portion 53 is changed by +5 degrees, and a case where the angle of the table 71 is changed by +5 degrees, that is, there is high possibility that the occlusion image P4 is determined as the proper image. Accordingly, the change image C3 displays a symbol indicating the upward direction as the information indicating a trend of a change in the influence level V4. Additionally, the influence level V4 for the occlusion image P4 decreases in a case where the angle of the first rotation portion 53 is changed by −5 degrees and a case where the angle of the table 71 is changed by −5 degrees, that is, there is less possibility that the occlusion image P4 is determined as the proper image. Accordingly, the change image C3 displays a symbol indicating the downward direction as the information indicating a trend of a change in the influence level V4.

Additionally, in information indicating a trend of a change in the influence level V3, the influence level V3 for the improper luminance image P5 ("brightness" in FIG. 10) increases in a case where the angle of the first rotation portion 53 is changed by −5 degrees, and a case where the angle of the table 71 is changed by +5 degrees, that is, there is further less possibility that the improper luminance image P5 is determined as the improper image. Accordingly, the change image C3 displays a symbol indicating the upward direction as the information indicating a trend of a change in the influence level V3. Additionally, the influence level V3 for the improper luminance image P5 decreases in a case where the angle of the first rotation portion 53 is changed by +5 degrees and a case where the angle of the table 71 is changed by −5 degrees, that is, there is high possibility that the improper luminance image P5 is determined as the improper image. Accordingly, the change image C3 displays a symbol indicating the downward direction as the information indicating a trend of a change in the influence level V3.

Additionally, in information indicating a trend of a change in the influence level V2, the influence level V2 for the multiple reflected light image P3 ("multiple reflection" in FIG. 10) decreases in a case where the angle of the first rotation portion 53 is changed by −5 degrees, and a case where the angle of the table 71 is changed by −5 degrees, that is, there is high possibility that the multiple reflected light image P3 is determined as the improper image. Accordingly, the change image C3 displays a symbol indicating the upward direction as the information indicating a trend of a change in the influence level V2. Additionally, the influence level V2 for the multiple reflected light image P3 increases in a case where the angle of the first rotation portion 53 is changed by +5 degrees and a case where the angle of the table 71 is changed by +5 degrees, that is, there is further less possibility that the multiple reflected light image P3 is determined as the proper image. Accordingly, the change image C3 displays a symbol indicating the downward direction as the information indicating a trend of a change in the influence level V2.

Additionally, in information indicating a trend of a change in the influence level V1, the influence level V1 for the specular reflected light image P2 ("specular reflection" in FIG. 10) decreases in all of a case where the angle of the first rotation portion 53 is changed by +5 degrees, a case where the angle of the first rotation portion 53 is changed by −5 degrees, a case where the angle of the table 71 is changed by +5 degrees, and a case where the angle of the table 71 is changed by −5 degrees, and thus, there is high possibility that the specular reflected light image P2 is determined as the proper image. Moreover, in the example of FIG. 10, since the influence level V1 is zero in all of a case where the angle of the first rotation portion 53 is changed by +5 degrees, a case where the angle of the first rotation portion 53 is changed by −5 degrees, a case where the angle of the table 71 is changed by +5 degrees, and a case where the angle of the table 71 is changed by −5 degrees, the detection unit 86 determines in this case that the specular reflected light image P2 is the proper image. Accordingly, the change image C3 illustrated in FIG. 10 displays as the information indicating a trend of a change in the influence level V1. Additionally, the change image C3 may display x in a case where the influence level V1 is zero (determined as the proper image) under the current measurement condition and increases with a change in the measurement condition. However, the change image C3 may display a symbol indicating the upward direction in a case where the influence level V1 is larger than zero under the current measurement condition and a value of the influence level V1 becomes zero with a change in the measurement condition. Additionally, the change image C3 may display a symbol indicating the downward direction in a case where the influence level V1 is zero under the current measurement condition and a value of the influence level V1 increases with a change in the measurement condition. Additionally, the change image C3 may display a symbol indicating the downward direction in a case where the influence level V1 is larger than zero under the current measurement condition and a value of the influence level V1 does not change with a change in the measurement condition.

Additionally, in the example of FIG. 10, the change image C3 and the evaluation result image C2 are displayed in the same table. That is, in the example of FIG. 10, as described above, each of the types of images evaluated as the improper images is displayed in the first column of the table, and the evaluation of the images evaluated as the improper images and displayed in the first column is displayed in the second column. Then, the change image C3 displays information indicating a trend of a change in each influence level V0 in a case where the angle of the first rotation portion 53 is changed by +5 degrees, in the third column of the table, information indicating a trend of a change in each influence level V0 in a case where the angle of the first rotation portion 53 is changed by −5 degrees, in the fourth column of the table, information indicating a trend of a change in each influence level V0 in a case where the angle of the table 71 is changed by +5 degrees, in the fifth column of the table, and information indicating a trend of a change in each influence level V0 in a case where the angle of the table 71 is changed by −5 degrees, in the sixth column of the table. However, the result of the change image C3 illustrated in FIG. 10 is an example. Additionally, as described above, the change image C3 is displayed at the center (below the detection result notification image C1) of the measurement check result screen B together with the evaluation result image C2 in the same table. However, the display methods and the display positions of the evaluation result image C2 and the change image C3 are not limited to those, and for example, the evaluation result image C2 and the change image C3 may be displayed in separate tables.

Note that the change information may be information indicating whether the evaluation result of the improper image changes in a case where the measurement condition is changed, and is not limited to information indicating a change in the influence level V0 for each image evaluated as the improper image. For example, the change information may be information indicating the evaluation result of the presence or absence of the improper image changes in a case where the measurement condition is changed. For example, in a case where a candidate image for the improper image under the current measurement condition is evaluated as the improper image, and the candidate image for the improper image is evaluated as not being the improper image in a case where the measurement condition is changed, the change image C3 displays a symbol indicating the upward direction to indicate that the improper image is absent. Additionally, in a case where a candidate image for the improper image under the current measurement condition is not determined as the improper image, and the candidate image for the improper image is evaluated as the improper image in a case where the measurement condition is changed, the change image C3 displays a symbol indicating the downward direction to indicate that the improper image is present.

Additionally, the change information is not limited to the symbol indicating the upward direction and the symbol indicating the downward direction, and may be displayed by other symbols as long as an operator can be notified of a change in the influence level V0 or a change in the presence or absence of the improper image. In this case, for example, the change information may be displayed by an upward arrow or a downward arrow. Additionally, the change information is not limited to a symbol, and may be a string of characters. In this case, for example, the change information may be displayed as "improvement" when a value of V0 is improved, and as "deterioration" when the value of V0 is worsened. Additionally, the change information may be displayed in color. In this case, for example, when the influence level V0 is improved, a target location of the change image C3 may be displayed in green, and when the influence level V0 is worsened, the target location of the change image C3 may be displayed in red. Note that the change information is not limited to visual information, and may be output as audible information such that an operator is notified by sound of a change in the influence level V or a change in the presence or absence of the improper image. In this case, for example, a speaker (not illustrated) outputs the change information as sound to an operator. Additionally, when a change in the influence level V0 is within a predetermined threshold, visual information such as a symbol, a string of characters, and color indicating that the influence level V0 does not change may be displayed at a target location of the change image C3. In this case, for example, a symbol such as - and /, or characters such as "no change," indicating that the influence level does not change may be displayed. Additionally, in this case, similarly, the information is not limited to visual information, and an operator may be notified by sound that the influence level V0 does not change.

In this manner, the detection result notification image C1 and the evaluation result image C2 are information displayed on the basis of the evaluation result. However, the detection result notification image C1 and the evaluation result image C2 may be displayed on the basis of the detection result, rather than the evaluation result. Since the evaluation result is obtained by performing evaluation on the basis of the influence level V0, the improper image and the proper image can be distinguished accurately in the case of using the evaluation result. On the other hand, the detection result is obtained by performing detection on the basis of the analysis result data, that is, intensity distribution of an image, and is not a result obtained by using the influence level V0. Accordingly, in the case of using the detection result, the improper image and the proper image can be distinguished easily.

Hereinafter, display based on the detection result will be described. The detection result notification image C1 based on the detection result displays information indicating that an image detected as the improper image is present (information indicating the presence or absence of the detected improper image), and information indicating what kind of improper image is detected. Additionally, the evaluation result image C2 based on the detection result is information including the detection result by the detection unit 86 for each candidate image for the improper image. For example, in a case where the multiple reflected light image P3 is detected, x is displayed, and in a case where the multiple reflected light image P3 is not detected, ○ is displayed. Additionally, in a case where the specular reflected light image P2 is detected, x is displayed, and in a case where the specular reflected light image P2 is not detected, ○ is displayed.

Additionally, the change image C3 may also be displayed on the basis of the detection result. The detection result changes with a change in the measurement condition. For example, a case where the multiple reflected light image P3 is detected as the improper image under the current measurement condition is considered. In this case, when the relative position of the optical probe 3 and the object to be measured M as the measurement condition changes such that the multiple reflected light L3 is incident in the direction outside the range of the light-receiving surface 20a (imaging region PL) (direction away from the center of the light-receiving surface 20a), there is less possibility that the multiple reflected light L3 is incident on the light-receiving surface 20a, and there is high possibility that the multiple reflected light L3 does not enter the imaging region PL. Accordingly, there is high possibility that the multiple reflected light image P3 is not detected as the improper image. In this manner, since the detection result also changes with a change in the measurement condition, the change image C3 can also be displayed on the basis of the detection result. In this case, the change information for displaying the change image C3 is information indicating whether the detection result of the improper image changes in the detection result in a case where a value of the measurement condition of a device provided in the shape measurement device 1 is changed. For example, in a case where a candidate image for the improper image under the current measurement condition is detected as the improper image, and there is high possibility that the candidate image for the improper image is not detected as the improper image in a case where the measurement condition is changed, the change image C3 displays a symbol indicating the upward direction to indicate that there is high possibility that the improper image is absent. Additionally, in a case where a candidate image for the improper image under the current measurement condition is not detected as the improper image, and there is high possibility that the candidate image for the improper image is detected as the improper image in a case where the measurement condition is changed, the change image C3 displays a symbol indicating the downward direction to indicate that there is high possibility that the improper image is detected.

Additionally, the output unit 88 outputs information on the current measurement condition to the display 33, and causes the display 33 to display the measurement condition image D indicating the information on the current measurement information. The measurement condition image D is displayed below the evaluation result image C2 and the change image C3, and is an image indicating the current measurement condition, that is, information on the measurement condition set in performing analysis. The measurement condition image D is an image displaying only the measurement condition of a device provided in the shape measurement device 1 indicated in the change image C3, among measurement conditions of devices that adjust the measurement conditions. That is, in the example of FIG. 10, the measurement condition image D indicates the current angle (60.5) of the first rotation portion 53 and the current angle (30.0) of the table 71. However, the measurement condition image D may further display a measurement condition of a device other than each device that adjusts the measurement condition indicated in the change image C3.

The OK image E is displayed below the measurement condition image D, and is display for returning the image displayed in the display 33 to the menu image A. In a case where the input unit 32 includes a mouse, an operator operates the input unit 32 to superimpose a mouse cursor on the OK image E on the screen of the display 33. An operator clicks a mouse button with the cursor superimposed on the OK image E, and thus selects the OK image E. Additionally, in a case where the display 33 is a touch panel, an operator touches a position at which the OK image E is displayed, on the display screen of the display 33, and thus, selects the OK image E. When an operator selects the OK image E, the output unit 88 switches the display of the display 33 from the measurement check result screen B to the menu image A. Note that the OK image E is displayed at any position.

FIG. 11 illustrates an example of the measurement check result screen B in a case where it is not evaluated that the improper image is present. As illustrated in FIG. 11, in a case where it is not evaluated that the improper image is present, that is, in a case where it is evaluated that the improper image is absent, the output unit 88 outputs detection result notification information as information indicating that the improper image is absent. In the example of FIG. 11, the detection result notification image C1 is an image "confirm by a verification scan that a point group has no problem, and complete teaching," that indicates that the improper image is not detected and prompts confirmation of an actual captured image by a verification scan. Additionally, since it is evaluated that the improper image is absent, all items of the evaluation result image C2 have ○. Additionally, the reproduced image C0 is also displayed, and is an image that does not include the improper image. Additionally, as illustrated in FIG. 11, the change image C3 is displayed even in a case where it is evaluated that the improper image is absent, but the change image C3 is not necessarily displayed. In the example of FIG. 11, the influence level V1 for the specular reflected light image P2 is zero in all of a case where the angle of the first rotation portion 53 is changed by +5 degrees, a case where the angle of the first rotation portion 53 is changed by −5 degrees, a case where the angle of the table 71 is changed by +5 degrees, and a case where the angle of the table 71 is changed by −5 degrees, and there is no possibility that the specular reflected light image P2 is determined as the improper image. However, since the influence level V1 is also zero under the current measurement condition, there is no change. Accordingly, in the change image C3 of FIG. 11, - is displayed for the influence level V1 of the specular reflected light image P2 ("specular reflection" in FIG. 11). However, in this case, in the change image C3, ○ may be displayed instead of -. The display of the change image C3 of FIG. 11 is otherwise similar to that of FIG. 10.

Figure 12:
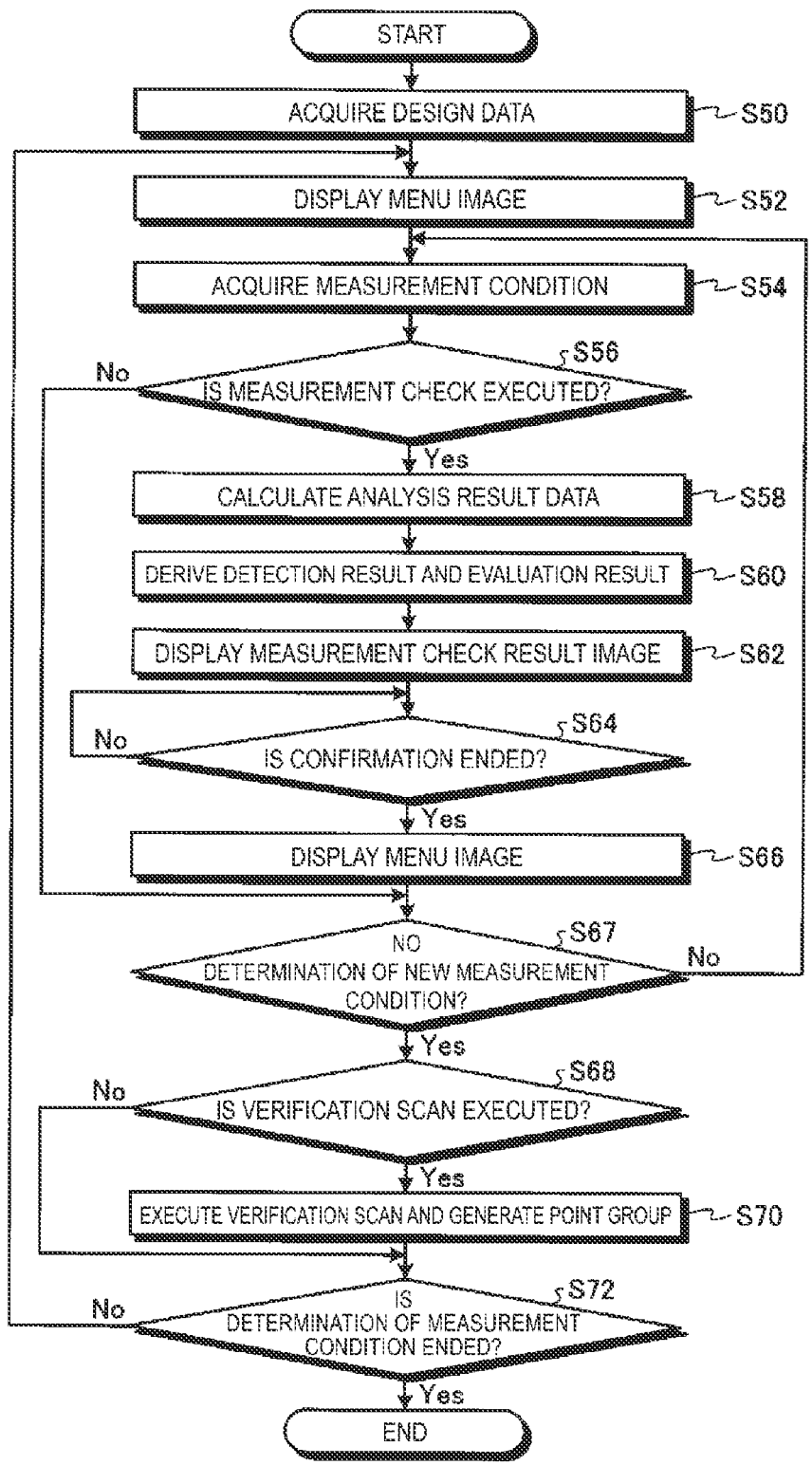
FIG. 12 is an explanatory flowchart of a flow in setting a measurement condition according to the present embodiment.

The processing of the controller 36 is as described above. Hereinafter, a flow in setting the measurement condition by using the controller 36 will be described with reference to a flowchart. FIG. 12 is an explanatory flowchart of a flow in setting the measurement condition according to the present embodiment. As illustrated in FIG. 12, in setting the measurement condition, the controller 36 acquires the design information on the object to be measured M by the design information acquisition unit 80 (step S50). Then, in the controller 36, for example, in a case where an operator activates software for performing the shape measurement, the output unit 88 causes the display 33 to display the menu image A (step S52). Note that the design information on the object to be measured M may be acquired at any timing before analysis.

When the menu image A is displayed, an operator performs teaching, for example, with reference to the instruction image A1 and the like, and inputs the measurement condition by using the input unit 32 to adjust the measurement condition and determine the measurement condition. The analyzer 40 acquires the measurement condition determined by the adjustment by the condition acquisition unit 82 (step S54), and determines whether measurement check execution is instructed (step S56). When an operator selects the measurement check image A3 (or A4) on the menu image A, the controller 36 determines that the measurement check execution is instructed (step S56; Yes), calculates the analysis result data by the image analysis execution unit 84 (step S58), and derives the detection result and the evaluation result by the detection unit 86 (step S60). That is, the image analysis execution unit 84 executes the processing illustrated in FIG. 6 to calculate the analysis result data. Then, the detection unit 86 detects the improper image and the proper image on the basis of the analysis result data to derive the detection result. Additionally, the detection unit 86 performs evaluation on the basis of the detection result to derive the evaluation result. Note that during execution of the processing of the image analysis execution unit 84 and the detection unit 86, the output unit 88 may switch an image from the menu image A to display an image indicating that analysis is being executed, or may display an image indicating that analysis is being executed such that the image is superimposed on the menu image A. Additionally, in a case where an operator does not select the measurement check image A3 (or A4) on the menu image A, that is, in a case where measurement check is not executed (step S56; No), the processing proceeds to step S68 described below, and the analyzer 40 determines whether verification scan execution is instructed. Note that in this flow, in a case where measurement check is not executed on the menu image A, the controller 36 determines whether verification scan execution is instructed, but the embodiment is not limited to this. That is, the controller 36 may concurrently determine whether measurement check is instructed and whether a verification scan is instructed. In other words, in a case where an operator selects the measurement check image A3 (or A4), the controller 36 may execute measurement check, and in a case where an operator selects the verification scan image A6, the controller 36 may execute a verification scan.

When the detection and evaluation of the improper image ends, the controller 36 causes the output unit 88 to output the detection result information to the display 33, and causes the display 33 to display the measurement check result screen B (step S62). An operator confirms the detection result image C on the measurement check result screen B to determine whether the determined measurement condition needs to be further changed. In a state where the measurement check result screen B is displayed, the analyzer 40 determines whether confirmation end is instructed (step S64). When an operator selects the OK image E on the measurement check result screen B, the controller 36 determines that the confirmation end is instructed (step S64; Yes), and causes the output unit 88 to switch display from the measurement check result screen B to the menu image A, and causes the display 33 to display the menu image A (step S66). For example, in a case where it is evaluated that the improper image is present in the detection result image C, an operator operates the input unit 32 to determine a new measurement condition. On the other hand, in a case where it is evaluated that the improper image is absent in the detection result image C, an operator does not determine a new measurement condition. However, since whether a new measurement condition is determined depends on a decision of an operator, in a case where it is evaluated that the improper image is present, an operator may not determine a new measurement condition, and in a case where it is evaluated that the improper image is absent, an operator may determine a new measurement condition. Note that in a case where an operator does not select the OK image E on the measurement check result screen B, the controller 36 determines that the confirmation end is not instructed (step S64: No), and waits for the confirmation end instruction at step S64, assuming that an operator is confirming the measurement check result screen B.

When the menu image A is displayed, the controller 36 determines whether a new measurement condition is determined by an operator (step S67). For example, in a case where a measurement condition determined by an operator is newly stored in the storage unit 34, the controller 36 determines that a new measurement condition is determined. However, the method of determining whether a new measurement condition is determined is not limited to this, and is any method. For example, in a case where an operator inputs the determination of a new measurement condition to the input unit 32, the controller 36 may determine that a new measurement condition is determined. When a new measurement condition is determined (step S67; No), the processing returns to step S54, and the controller 36 causes the condition acquisition unit 82 to acquire the new measurement condition and continues subsequent processing. That is, when an operator selects the measurement check image A3 (or A4) after determining the new measurement condition, the controller 36 performs analysis under the new measurement condition and displays the measurement result check image B.

When a new measurement condition is not determined (step S67; Yes), in a state where the menu image A is displayed, the controller 36 determines whether verification scan execution is instructed (step S68), and when an operator selects the verification scan image A6, the controller 36 determines that verification scan execution is instructed (step S68; Yes), and the measurement controller 38 executes a verification scan to actually capture the captured image T under the set measurement condition, and executes the shape measurement of the object to be measured M. That is, a point group of the object to be measured M is generated (step S70). An operator confirms a result of the shape measurement (point group) and determines whether the set measurement condition is proper. Subsequently, the controller 36 determines whether determination of the measurement condition is ended, that is, the teaching is ended (step S72). In a case where an operator does not select the verification scan image A6, and verification scan execution is not instructed (step S68; No), the processing proceeds to step S72. When an operator selects the OK image A7 on the menu image A, the controller 36 determines that the determination of the measurement condition, that is, the teaching is ended (step S72; Yes), and ends the setting processing of the measurement condition. In a case where an operator does not select the OK image A7 on the menu image A, the controller 36 determines that the determination of the measurement condition, that is, the teaching is not ended (step S72; No), and the processing returns to step S52 and the display of the menu image A continues. In this case, an operator determines a new measurement condition, and the controller 36 acquires the new measurement condition at step S54 and repeats the subsequent processing. Note that the controller 36 may not necessarily execute a verification scan, and thus steps S68 and S70 may be omitted. In this case, a step next to step S66 becomes step S72.

In this manner, in a case where analysis is performed under the measurement condition acquired by the condition acquisition unit 82, the controller 36 displays information based on the detection result as the detection result image C on the measurement check result screen B. The information based on the detection result can also be considered to be information derived by analyzing whether the improper image is present in a case where the captured image T is actually captured under the measurement condition acquired by the condition acquisition unit 82. Accordingly, an operator can easily determine by confirming the detection result image C whether the measurement condition is proper, and can easily set a measurement condition that enables accurate shape measurement.

Additionally, the controller 36 can also execute measurement check by the analyzer 40 and a verification scan by the measurement controller 38. Accordingly, an operator can determine further accurately whether the measurement condition is proper, by confirming information based on the detection result and confirming a point group generated from the captured image T actually captured under the determined measurement condition. Additionally, the controller 36 also displays the change image C3. The change image C3 is information indicating how the evaluation result changes in a case where the measurement condition is changed. There is high possibility that a trend of this change matches actual measurement. Accordingly, an operator can easily and accurately determine how the measurement condition is to be changed, by confirming the change image C3.

As described above, the controller 36 (image analysis device) according to the present embodiment includes the image analyzer 83 and the output unit 88. The image analyzer 83 detects the improper image for shape measurement of the object to be measured M (the improper image) in the case of capturing an image of light projected onto the object to be measured M, on the basis of the design information on the object to be measured M and the measurement condition. The output unit 88 outputs the detection result information that is information based on the detection result of the image analyzer 83. The controller 36 outputs the detection result information, that is, information based on the detection result of the improper image. Accordingly, according to the controller 36, another device such as the display 33 displays the output detection result information, and thus an operator can confirm the detection result information, that is, the detection result image C. Accordingly, an operator can confirm whether there is possibility that the improper image is present or there is possibility that the proper image is present. Accordingly, according to the controller 36, an operator can easily determine whether the set measurement condition is proper, and can easily set a measurement condition that enables accurate shape measurement.

Note that in the embodiment described above, the analysis device 4 includes the display 33, and the output unit 88 outputs the detection result information to the display 33, but the embodiment is not limited to this configuration. For example, the output unit 88 may output the detection result information to a storage unit (for example, the storage unit 34) provided in the analysis devices 4 and 4A, and the storage unit may store the output detection result information. In this case, a terminal such as a PC (personal computer) or a tablet of an operator connected to the analysis devices 4 and 4A via a network may access the storage unit, and acquire the detection result information via a network. Then, the acquired detection result information may be displayed in a display (display) of the PC.

Additionally, the image analyzer 83 (image analysis step) evaluates the detected improper image. Then, the output unit 88 (output step) outputs the evaluation result of the detected improper image as the detection result information to the display 33. Accordingly, according to the controller 36, an operator confirms the detection result image C, and thus can confirm the evaluation result of the improper image under the set measurement condition and more easily determine whether the setting condition is proper.

Additionally, the image analyzer 83 detects an image proper for the shape measurement of the object to be measured M (the proper image) among images of the measurement light L projected onto the object to be measured M, on the basis of the design information and the measurement condition. Then, the image analyzer 83 evaluates the detected improper image on the basis of at least one of the relative distance between the detected improper image and the detected proper image, and the luminance of the detected improper image. Since the controller 36 evaluates the improper image on the basis of the intensity of light forming the improper image and the relative distance to the proper image, the controller 36 suitably calculates an influence of the improper image on the proper image and causes the display 33 to display the evaluation result, and thus an operator is notified of the evaluation result and can more easily determine whether the setting condition is proper.

Note that the image analyzer 83 preferably evaluates the detected improper image on the basis of both of the relative distance between the detected improper image and the detected proper image, and the luminance of the detected improper image. The controller 36 can perform evaluation in this manner, and thus can accurately evaluate the improper image and suitably calculate an influence of the improper image on the proper image.

Additionally, the image analyzer 83 calculates a change in the evaluation result of the improper image in a case where the measurement condition is changed. The output unit 88 outputs the change information indicating a change in the evaluation result of the improper image in a case where the measurement condition is changed, to the display 33 as the detection result information. The controller 36 can cause the display 33 to display and communicate to an operator whether the evaluation result of the improper image changes in a case where the measurement condition is changed. Accordingly, according to the controller 36, since an operator confirms a change in the evaluation result and thus can acquire a guideline for adjusting the measurement condition, the operator can easily set a measurement condition that enables accurate shape measurement.

Additionally, the output unit 88 causes the reproduced image C0 reproduced from image analysis result data to be further displayed on the screen where the detection result information is displayed, that is, the measurement check result screen B. Additionally, the output unit 88 may causes an actual image of the measurement light L projected onto the object to be measured M that is captured by the imager 9 under the measurement condition used for detection of the detection result information, that is, the captured image T to be displayed on the screen on which the detection result information is displayed. In this case, in displaying the detection result image C, the controller 36 captures an actual image of the measurement light L under the same measurement condition as the measurement condition of the detection result image C, and displays the actual image and the detection result image C on the same screen. Thus, since an operator can confirm the captured image T actually captured, together with the detection result image C, the operator can more easily recognize that the improper image is present. Note that the output unit 88 may cause the captured image T instead of the reproduced image C0 to be displayed, or may cause the captured image T to be displayed such that the captured image T is superimposed on the reproduced image C0.

Additionally, the measurement condition include at least one of the relative position of the imager 9 or the projector 8 (irradiator) that irradiates with the measurement light L and the object to be measured M, the relative attitude of the imager 9 or the projector 8 that irradiates with the measurement light L and the object to be measured M, the intensity of the measurement light L with which the object to be measured M is irradiated, and the measurement region. The measurement region is a region used for the shape measurement of the object to be measured M. According to the controller 36, an operator can properly set these measurement conditions.

Additionally, the measurement condition preferably include both of the relative position of the imager 9 or the projector 8 (irradiator) that irradiates with the measurement light L and the object to be measured M, and the relative attitude of the imager 9 or the projector 8 that irradiates with the measurement light L and the object to be measured M. According to the controller 36, an operator can properly set these measurement conditions.

Additionally, the image analyzer 83 detects, as the improper image, at least one of an image generated by multiple reflection (multiple reflected light image P3), an image generated by specular reflection (specular reflected light image P2), an image generated by occlusion (occlusion image P4), and the improper luminance image P5. The improper luminance image P5 is an image having intensity of light forming the image (or a luminance of the image) less than a predetermined value among images of the diffuse reflected light L1 reflected once (diffuse reflected light images P1), but may be an image having intensity of light forming the image (or a luminance of the image) out of a predetermined range among images of the diffuse reflected light L1 reflected once (diffuse reflected light images P1). Such an image is determined as the improper image, and thus the controller 36 can properly detect the improper image, and enables an operator to properly set the measurement condition. Note that the predetermined value described here may be set by an operator in consideration of an influence of the improper luminance image T5 on measurement accuracy of the object to be measured M. and may be a value calculated on the basis of a design tolerance of the object to be measured M.

Additionally, in the present embodiment, as illustrated in Formula (3), in a case where the influence level V3 that is a total value of intensity of light beams of the diffuse reflected light L1 is smaller than the threshold, it is evaluated that an image is the improper luminance image P5. That is, in a case where a luminance of the diffuse reflected light image P1 is low, in other words, in a case where intensity of a light beam of the diffuse reflected light L1 is low, the detection unit 86 evaluates an image as the improper luminance image P5. However, similarly, in the case of intensity of a light beam of the diffuse reflected light L1, for example, since a light beam of the diffuse reflected light L1 is re-reflected within the image-forming optical system 21 (lens) of the imager 9 and is formed as a flare, the shape measurement cannot be performed properly. Accordingly, also in a case where intensity of a light beam of the diffuse reflected light L1 is too high (a luminance of the diffuse reflected light image P1 is too high), the detection unit 86 may evaluate an image as the improper luminance image P5. In this case, in a case where the influence level V3 that is a total value of intensity of light beams of the diffuse reflected light L1 (or a luminance of the diffuse reflected light image P1) is outside a predetermined range, the detection unit 86 evaluates an image formed of a light beam of the diffuse reflected light L1 (diffuse reflected light image P1) as the improper luminance image P5. Then, in a case where the influence level V3 that is a total value of intensity of light beams of the diffuse reflected light L1 (or a luminance of the diffuse reflected light image P1) in Formula (3) is within the predetermined range, the detection unit 86 evaluates that an image formed of a light beam of the diffuse reflected light L1 (diffuse reflected light image P1) is not the improper luminance image P5, that is, the improper luminance image P5 is not the improper image. Note that the predetermined range is a numerical range between a predetermined upper limit value and a predetermined lower limit value, and an operator may set the upper limit value and the lower limit value in consideration of an influence of the improper luminance image P5 on measurement accuracy of the object to be measured M.

Additionally, the image analyzer 83 calculates the analysis result data (intensity distribution) of an image in a case where the image of the measurement light L projected onto the object to be measured M is captured by the imager (imager 9) under the measurement condition, and thus detects the improper image. Then, on the basis of the analysis result data (intensity distribution), the image analyzer 83 detects the improper image from images other than the image of the measurement light L reflected only once on the object to be measured M (diffuse reflected light image P1).

Additionally, the analysis device 4 according to the present embodiment includes the controller 36 and the display 33 (display) that displays the detection result image C. The analysis device 4 displays the detection result image C, and thus, an operator can easily set a measurement condition that enables accurate shape measurement.

Additionally, the shape measurement device 1 according to the present embodiment includes the controller 36, the input unit 32 that receives an input from an operator, the optical probe 3 including the projector 8 (projector) that projects the measurement light L onto the object to be measured M and the imager 9 (imager) that captures an image of the measurement light L projected onto the object to be measured M, and the condition setting unit 42 that sets the measurement condition by an input to the input unit 32. According to the shape measurement device 1, since a measurement condition that enables accurate shape measurement can be set easily, the shape measurement can be performed accurately.

Additionally, an image analysis method according to the present embodiment includes an image analysis step by the image analyzer 83, and an output step by the output unit 88. At the image analysis step, the improper image is detected on the basis of the design information on the object to be measured M and the measurement condition. Then, at the output step, the detection result information that is information based on the detection result at the image analysis step is output. According to the method, a measurement condition that enables accurate shape measurement can be set easily. A program according to the present embodiment causes a computer such as the analysis device 4 to execute the image analysis method.

Additionally, a measurement condition determination method according to the present embodiment includes the above-described image analysis method and a measurement condition determination step of determining the measurement condition on the basis of the detection result information output at the output step. According to the measurement condition determination method, a measurement condition that enables accurate shape measurement can be set easily.

Additionally, a shape measurement method according to the present embodiment includes the above-described measurement condition determination method and a shape measurement step of performing the shape measurement of the object to be measured M under the measurement condition determined at the measurement condition determination step. Since the shape measurement method can perform the shape measurement under the properly set measurement condition, a decrease in measurement accuracy can be suppressed.

Additionally, the functions of the measurement controller 38 and the analyzer 40 of the controller 36 may be realized by hardware, or these functions may be realized by software. Additionally, some of the functions of the measurement controller 38 and the analyzer 40 of the controller 36 may be realized by hardware, and other portions of these functions may be realized by software. Additionally, in a case where some or all of the functions of the measurement controller 38 and the analyzer 40 of the controller 36 are realized by hardware, the functions may be realized by an ASIC or a programmable logic device. Additionally, all of the functions of the measurement controller 38 and the analyzer 40 of the controller 36 may be integrally realized, or some of these functions may be realized without being integrated.

Modifications

Next, modifications of the first embodiment will be described. Each of the modifications described hereinafter differs from the first embodiment in display contents of the measurement check result screen B. In each of the modifications, description of matters common to the first embodiment will be omitted.

Figure 13:
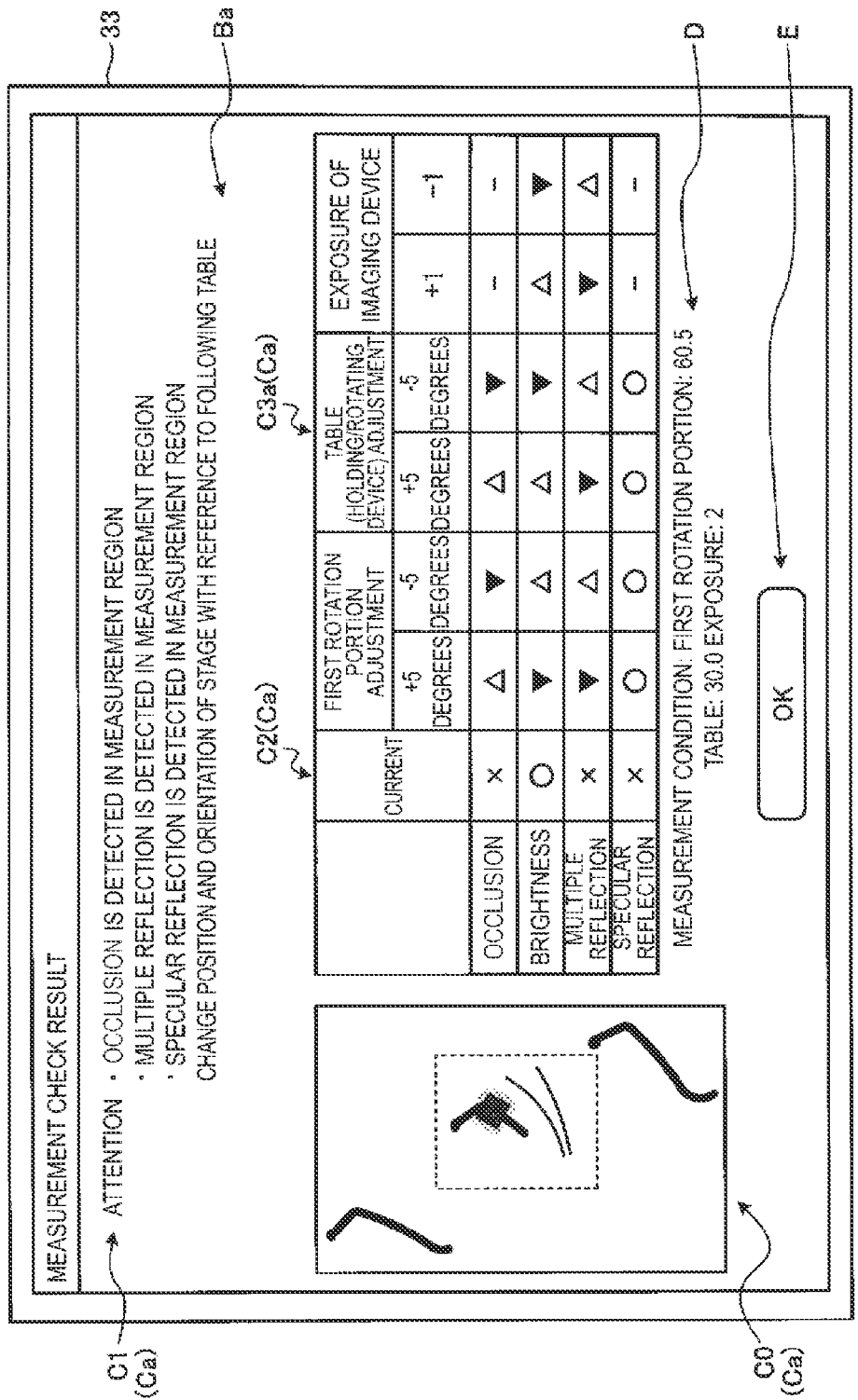
FIG. 13 is a view illustrating an example of a measurement check result screen according to a modification of the first embodiment.
Figure 14:
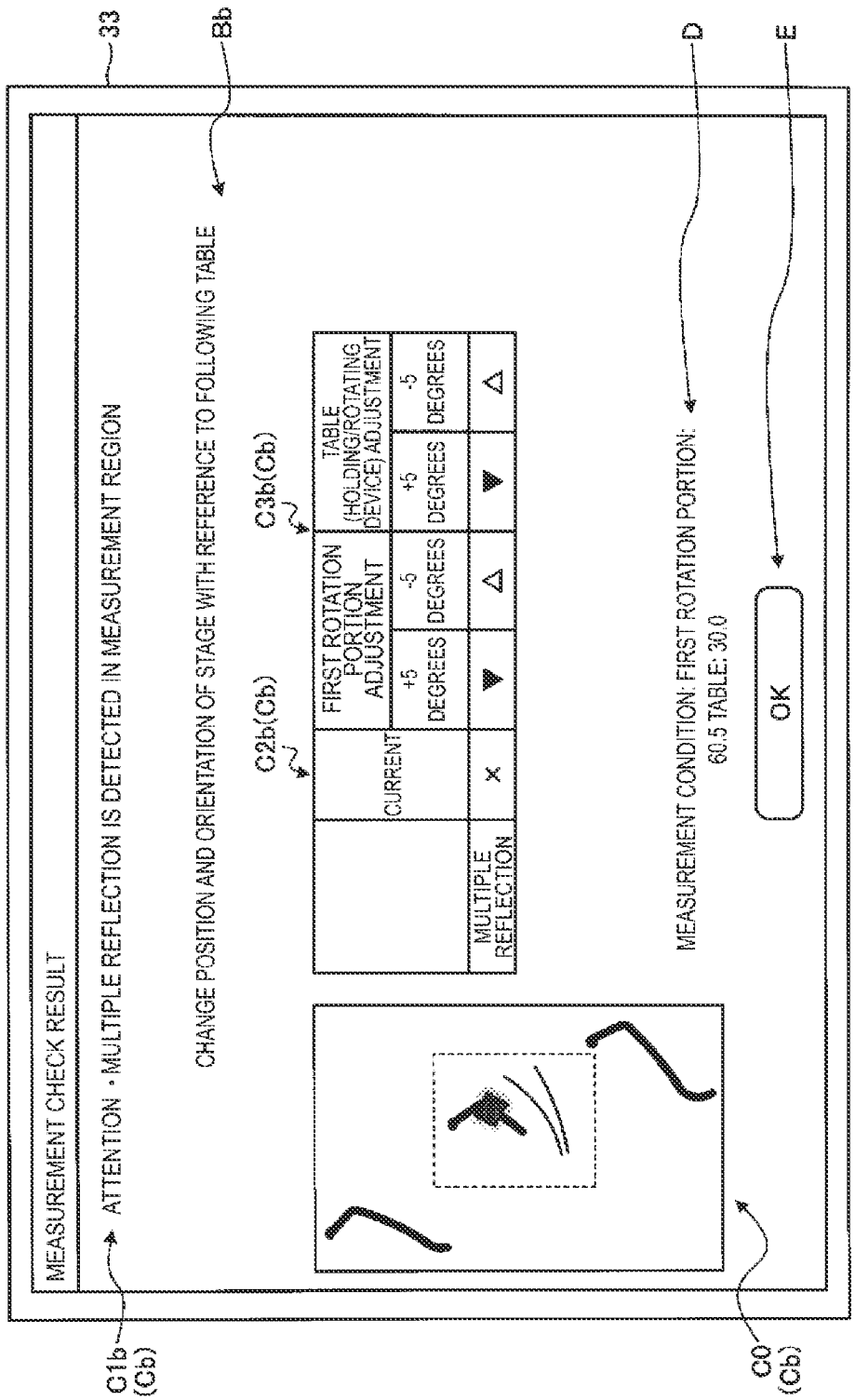
FIG. 14 is a view illustrating an example of a measurement check result screen according to a modification of the first embodiment.

FIGS. 13 to 20 are views illustrating examples of measurement check result screens according to the modifications of the first embodiment. An output unit 88 causes a display 33 to display a detection result image Ca on a measurement check result screen Ba according to the modification illustrated in FIG. 13. The detection result image Ca has a change image C3a. The change image C3a is different from the change image C3 of the first embodiment in a parameter of a measurement condition. That is, the output unit 88 may use a different parameter of the measurement condition in change information from the parameter in the first embodiment. The change image C3a includes an imager 9 in addition to a first rotation portion 53 and a table 71 as devices provided in a shape measurement device 1. Then, exposure is changed as a measurement condition of the imager 9. The exposure described here refers to an exposure value (EV). In the example of FIG. 13, information indicating a change in an influence level V3 ("brightness" in FIG. 13) displayed in the change image C3a is a symbol indicating the upward direction due to an increase in the influence level V3 in a case where the exposure becomes +1, and is a symbol indicating the downward direction due to a decrease in the influence level V3 in a case where the exposure becomes −1. Additionally, information indicating a change in an influence level V2 ("multiple reflection" in FIG. 13) displayed in the change image C3a is a symbol indicating the downward direction due to an increase in the influence level V2 in a case where the exposure becomes +1, and is a symbol indicating the upward direction due to a decrease in the influence level V2 in a case where the exposure becomes −1. Additionally, an influence level V4 ("occlusion" in FIG. 13) and an influence level V1 ("specular reflection" in FIG. 13) do not change even when the exposure changes. Accordingly, — is displayed as information indicating a change in the influence level V3 ("brightness" in FIG. 13). In this manner, the imager 9 is added as a device provided in the shape measurement device 1 and the exposure is added as the measurement condition to be changed, and thus, an operator can find a more suitable measurement condition. Note that in the example of FIG. 13, the imager 9 is added as a device provided in the shape measurement device 1, and the exposure is added as the measurement condition to be changed, however, an operator can arbitrarily set a device provided in the shape measurement device 1. That is, a device provided in the shape measurement device 1 includes at least one of the first rotation portion 53, a second rotation portion 54, the table 71 (the holding/rotating device 7), an X movement portion 50X, a Y movement portion 50Y, and a Z movement portion 50Z that change a relative position, a projector 8 that changes intensity of measurement light L, and the imager 9 that changes exposure time. Additionally, the measurement condition indicated in the change image C3a may include all the measurement conditions or may include some of all the measurement conditions. That is, the measurement condition indicated in the change image C3a may include at least one of a relative position and a relative attitude of the imager 9 or the projector 8 (irradiator) that radiates with the measurement light L and an object to be measured M, the intensity of the measurement light L with which the object to be measured M is irradiated, a measurement region PR, and the exposure and exposure time of the imager 9. For example, the output unit 88 may cause only one of the measurement conditions to be displayed as the measurement condition to be displayed in the change image C3a.

In the first embodiment, the specular reflected light image P2, the multiple reflected light image P3, the occlusion image P4, and the improper luminance image P5 are evaluated as the improper images. However, a detection unit 86 may evaluate any image as the improper image, and may detect, for example, any of the specular reflected light image P2, the multiple reflected light image P3, the occlusion image P4, and the improper luminance image P5 as the improper image. Additionally, an image detected as the improper images may be added to these images. For example, in a case where an image determined as the improper image by evaluation is only the multiple reflected light image P3, the output unit 88 outputs information in a case where the improper image is only the multiple reflected light image P3, as detection result information. In this case, the output unit 88 causes a detection result image Cb to be displayed on a measurement check result screen Bb according to the modification illustrated in FIG. 14. The detection result image Cb includes a detection result notification image CIb, an evaluation result image C2b, and a change image C3b. The output unit 88 causes only the multiple reflected light image P3 to be displayed as the improper image in the detection result image Cb. Then, the output unit 88 causes only the multiple reflected light image P3 to be displayed as a candidate for the improper image in the evaluation result image C2b and the change image C3b. Even in such a case, since the shape measurement device 1 enables an operator to recognize whether the multiple reflected light image P3 is present, a measurement condition that enables accurate shape measurement can be set easily. Note that in a controller 36, the detection unit 86 detects all of the specular reflected light image P2, the multiple reflected light image P3, the occlusion image P4, and the improper luminance image P5 as the improper images, and the output unit 88 may display only some of these images (here, the multiple reflected light image P3) as the improper image.

Figure 15:
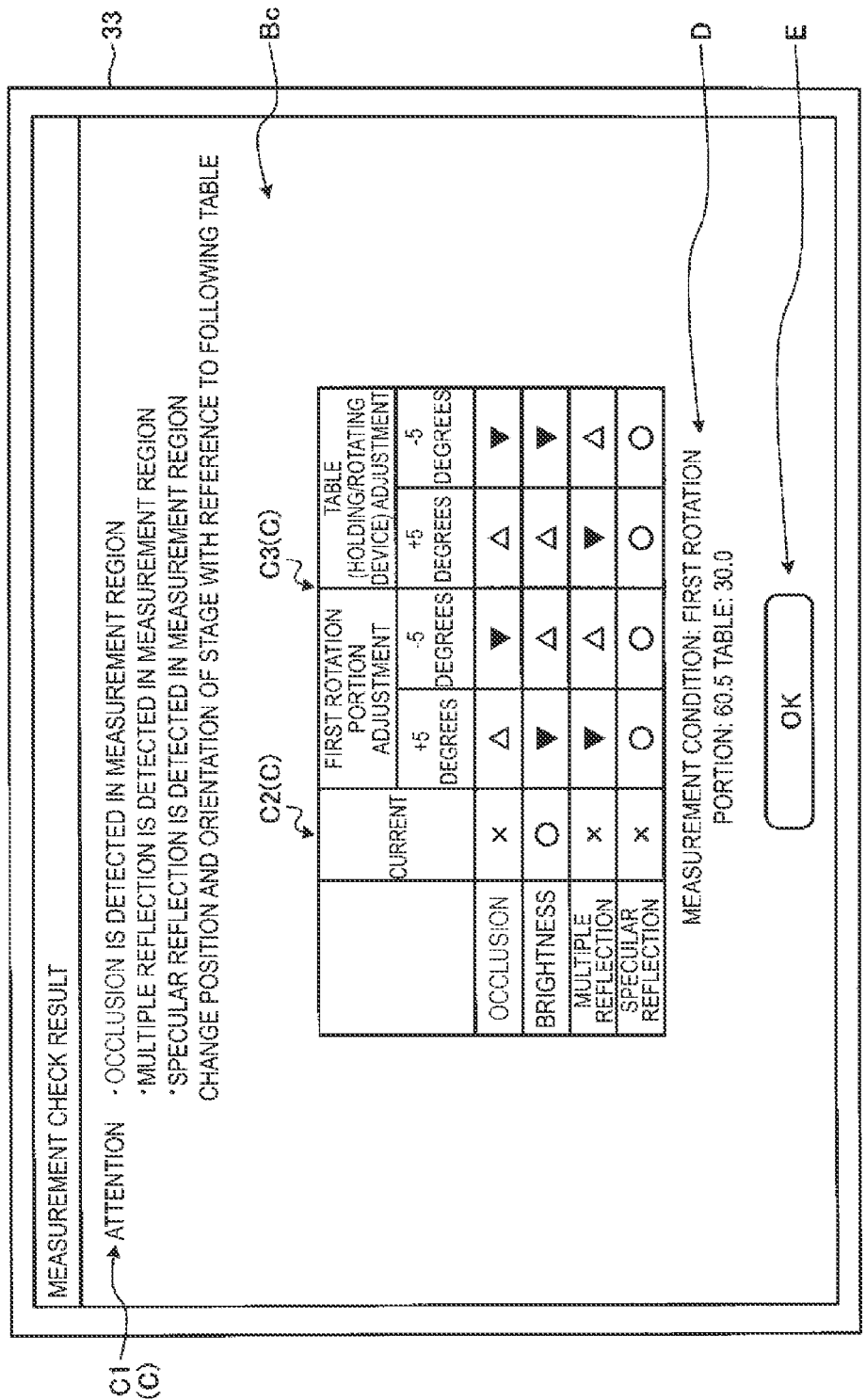
FIG. 15 is a view illustrating an example of a measurement check result screen according to a modification of the first embodiment.

The output unit 88 differs from the first embodiment in that a reproduced image C0 is not displayed in a measurement check result screen Bc according to the modification illustrated in FIG. 15. That is, the output unit 88 may not cause the detection result information to include image data for displaying the reproduced image C0. Even in a case where the reproduced image C0 is not displayed, another detection result image C is displayed and thus, an operator can recognize whether the improper image is present.

Figure 16:
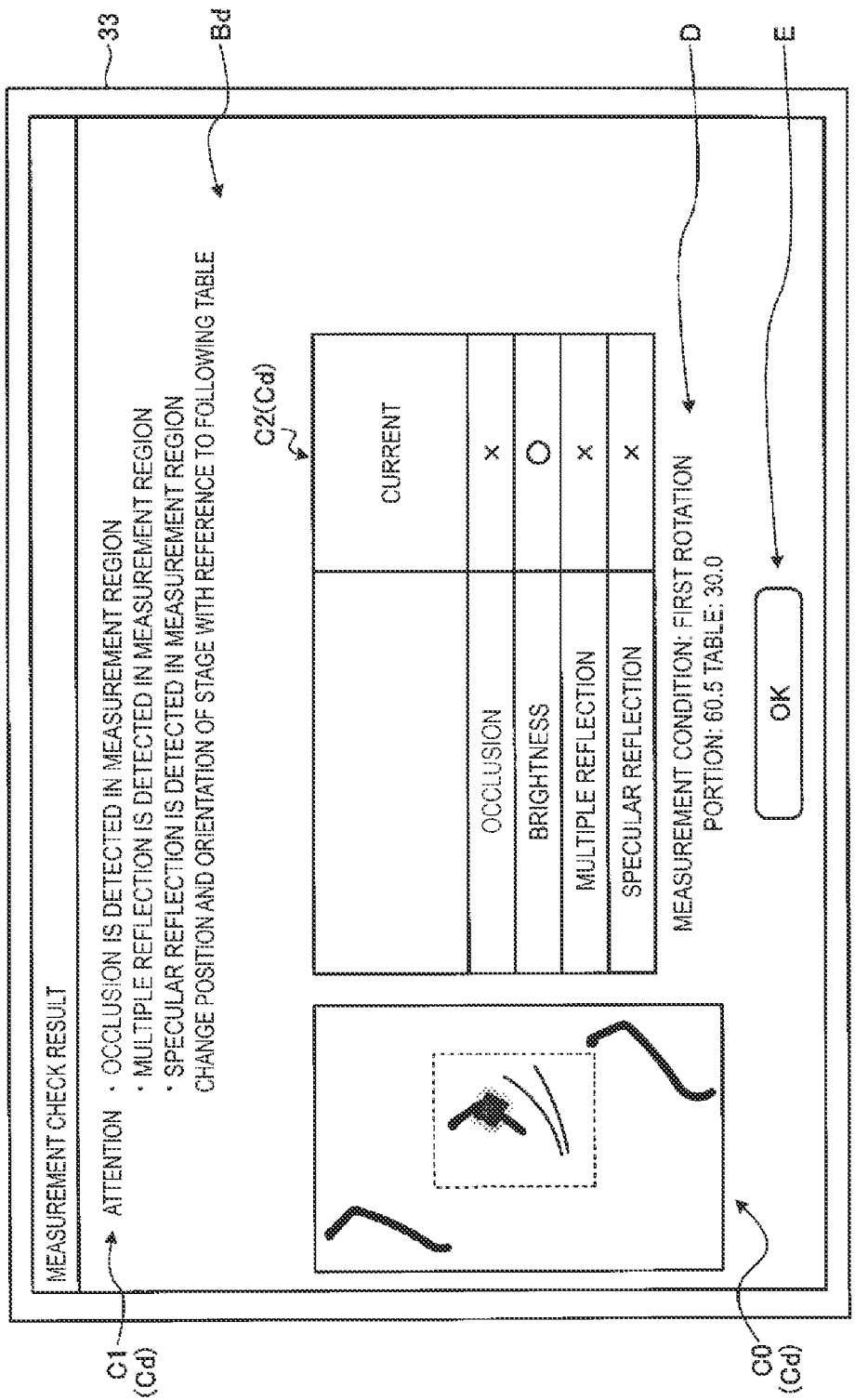
FIG. 16 is a view illustrating an example of a measurement check result screen according to a modification of the first embodiment.

The output unit 88 displays a detection result image Cd on a measurement check result screen Bd according to the modification illustrated in FIG. 16. The detection result image Cd differs from the detection result image in the first embodiment in that the detection result image Cd does not include the change image C3. That is, the output unit 88 may not cause the detection result information to include change information. Even in a case where the change image C3 is not displayed in this manner, a detection result image C is displayed and thus, an operator can recognize whether the improper image is present.

Figure 17:
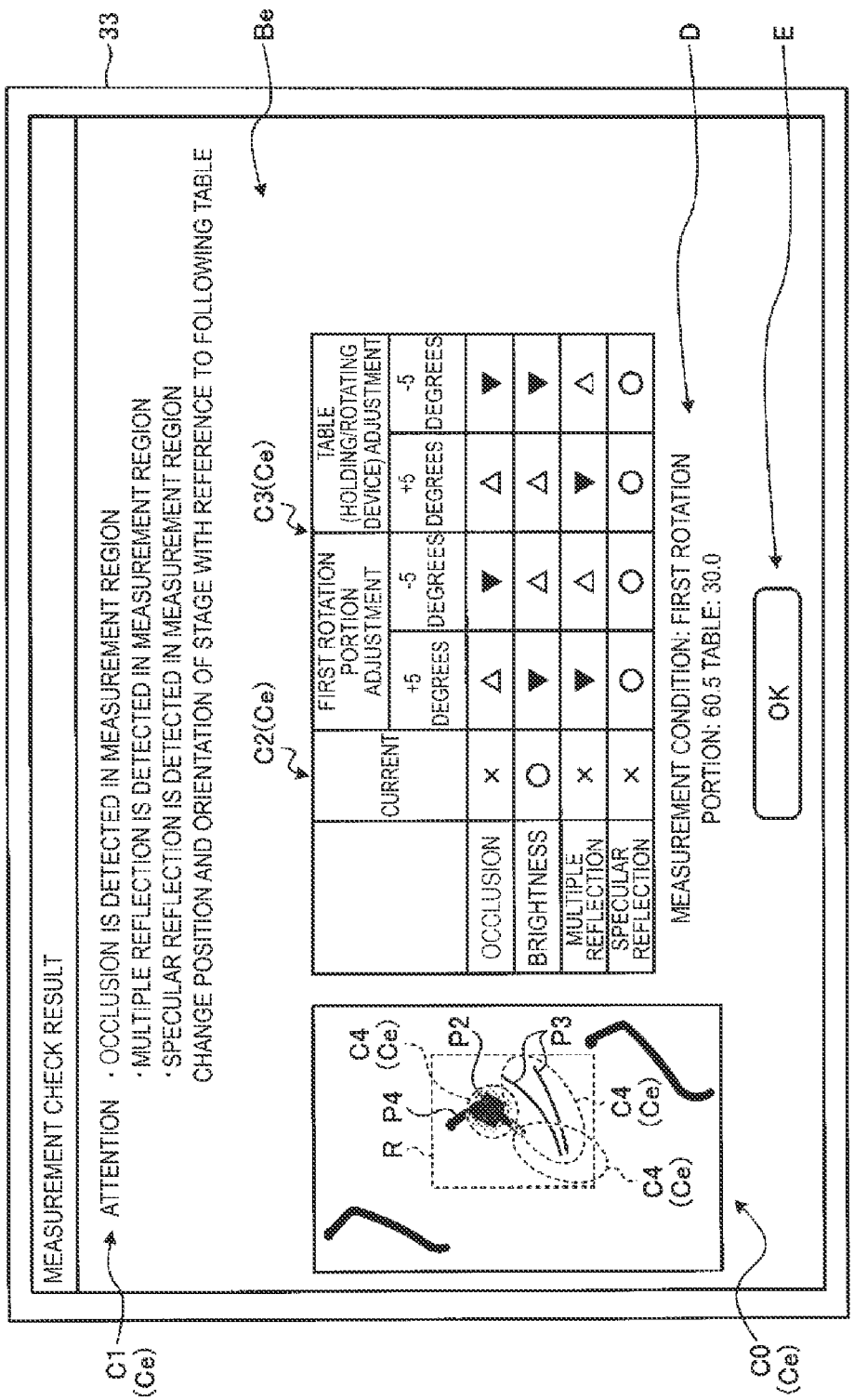
FIG. 17 is a view illustrating an example of a measurement check result screen according to a modification of the first embodiment.

The output unit 88 causes a detection result image Ce to be displayed on a measurement check result screen Be according to the modification illustrated in FIG. 17. The detection result image Ce differs from the detection result image in the first embodiment in that the detection result image Ce includes an identification image C4. That is, the output unit 88 may cause the detection result information to include identification information for displaying the identification image C4. The identification information is information for identifying the improper image in a reproduced image C0. Moreover, the identification information is information for identifying the improper image and the proper image, and in a case where a plurality of types of improper images are present, the identification information is information for identifying the improper images. For example, the information for identifying the improper images refers to information indicating, in a case where the specular reflected light image P2, the multiple reflected light image P3, and the occlusion image P4 are detected as the improper images, which of the improper images is the specular reflected light image P2 and which of the improper images is the multiple reflected light image P3.

The output unit 88 generates the identification information on the basis of the evaluation result of the detection unit 86 and the reproduced image C0. Specifically, the output unit 88 reads a position (coordinates) of the evaluated improper image on the reproduced image C0 for each type of the improper image, on the basis of the evaluation result. Then, the output unit 88 generates identification information indicating the position (coordinate) of the improper image on the reproduced image C0. In the example of FIG. 17, the output unit 88 generates the identification information such that the identification image C4 becomes a figure having an elliptical shape surrounding the improper image on the reproduced image C0. More specifically, the identification image C4 is an image displaying the identification information, and is displayed on the measurement check result screen Be such that the identification image C4 is superimposed on the reproduced image C0. An operator can recognize that a location surrounded by the ellipse of the identification image C4 is an image evaluated as the improper image. Accordingly, an operator can visually recognize where the specular reflected light image P2, the multiple reflected light image P3, and the occlusion image P4 that are the improper images are on the reproduced image C0, and can identify the improper image surrounded (indicated) by the identification image C4 and the proper image that is not surrounded (not indicated) by the identification image C4. Thus, an operator can recognize the position of the improper image, and can more easily set a measurement condition that enables accurate shape measurement.

In this manner, the output unit 88 sets the ellipse surrounding the improper image as the identification image C4. However, the identification image C4 is not limited to the ellipse surrounding the improper image, as long as the improper image can be identified. For example, the identification image C4 may have any figure other than an ellipse, such as a rectangle and a triangle. Additionally, the identification image C4 is not limited to the figure surrounding the improper image, and may be display indicating the improper image such as an arrow. Additionally, the identification image C4 may be displayed in color. In this case, for example, in the identification image C4, a region in which the improper image is displayed may be displayed in yellow, and may be distinguishable from other regions than the region of the improper image. Additionally, the identification image C4 may be a string of characters, and may be displayed next to the improper image, for example, as a string of characters "improper image." Additionally, the string of characters may be displayed together with a figure such as the above-described ellipse, color, or the like.

Additionally, the output unit 88 can cause the improper images to be distinguishable by varying display contents of the identification image C4 for each indicated improper image. For example, the identification image C4 may change a shape of the identification image C4 for each type of the improper image. In this case, for example, the specular reflected light image P2 can be surrounded by an ellipse, the multiple reflected light image P3 can be surrounded by a rectangle, and the occlusion image P4 can be surrounded by a triangle. Additionally, ellipses surrounding the improper images may be distinguishable by using a solid line and a broken line for each improper image. Additionally, the identification image C4 may be displayed in color. In this case, the identification image C4 may be displayed in different color for each improper image such that the identification image C4 is superimposed on each improper image. For example, a region in which the specular reflected light image P2 is displayed may be indicated in yellow, and a region in which the multiple reflected light image P3 is displayed may be indicated in red. Additionally, the identification image C4 may be a string of characters. In this case, for example, the identification image C4 may cause the improper images to be distinguishable by, for example, adding characters such as "specular reflected light image," "multiple reflected light image," "occlusion," and the like as a note indicating the type of improper image. Additionally, the note may be displayed together with a figure such as an ellipse, color, or the like. In a case where both of the note indicating the type of improper image, and a figure, color, or the like are used, a figure, color, or the like may be the same for each improper image. Similarly, in this case, the improper images are distinguishable by using the note indicating the type of improper image.

Note that the output unit 88 may generate information indicating a position (coordinates) of the proper image on the reproduced image C0 of the evaluated proper image, on the basis of the evaluation result, as the identification information, and sets the identification image C4 to an ellipse surrounding the proper image. Additionally, the output unit 88 may generate information indicating a position (coordinates) of the proper image on the reproduced image C of the detected improper image, on the basis of the detection result, as the identification information. Additionally, the output unit 88 may generate information indicating a position (coordinates) of the proper image on the reproduced image C of the detected proper image, on the basis of the detection result, as the identification information. Note that similarly, in a case where the captured image T of the measurement light L actually captured under the same measurement condition is displayed instead of the reproduced image C0, the output unit 88 may display the identification image C4 such that the identification image C4 is superimposed on the captured image T.

Figure 18A:
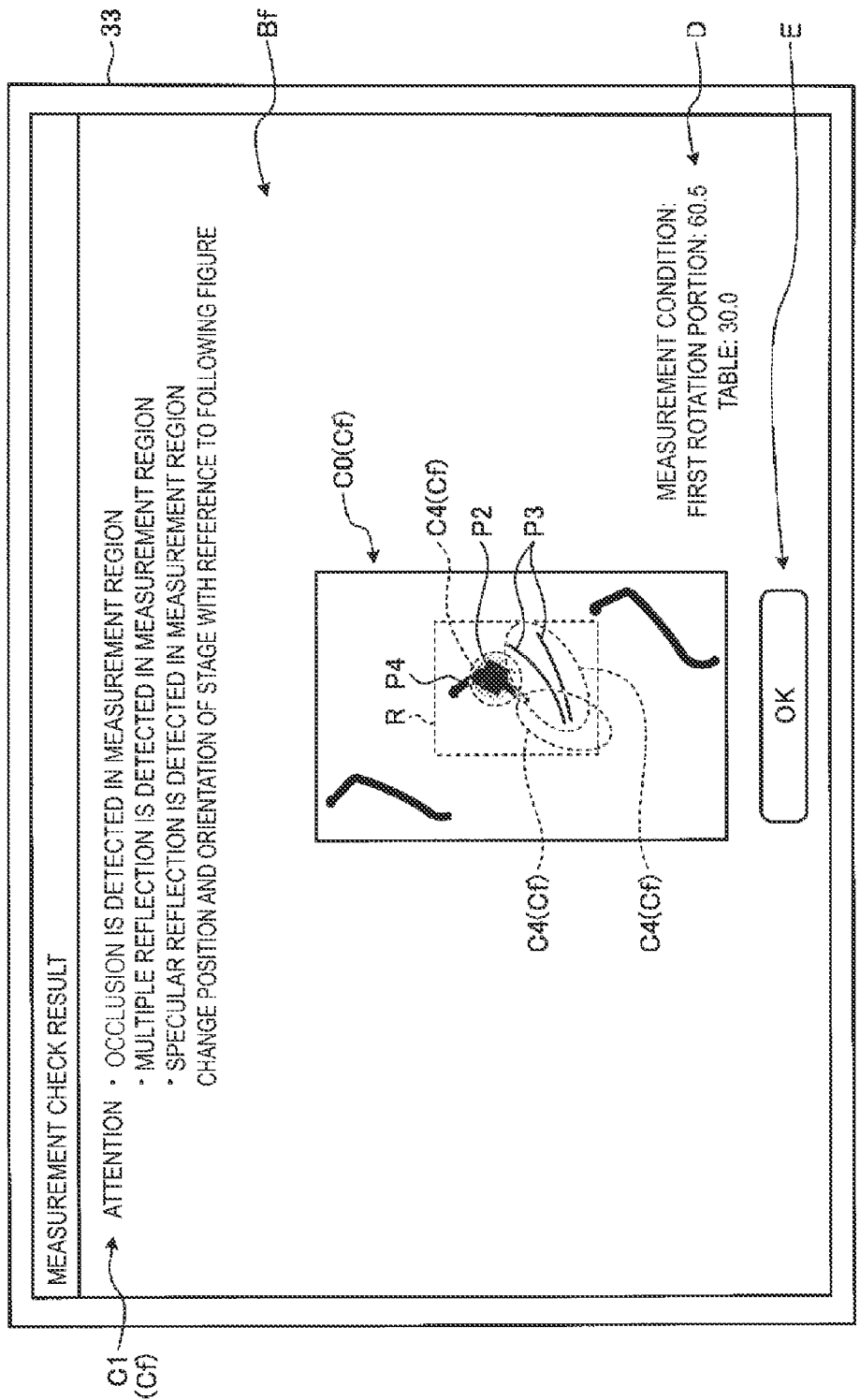
FIG. 18A is a view illustrating an example of a measurement check result screen according to a modification of the first embodiment.

Additionally, in a case where an identification image C4 is displayed as indicated in a measurement check result screen Bf according to the modification illustrated in FIG. 18A, the output unit 88 may not display the evaluation result image C2 and the change image C3. Additionally, in this case, an detection result notification image C1 may not be displayed. A reproduced image C0 and the identification image C4 are considered to be images of information based on a detection result of the improper image. Accordingly, an operator can confirm the presence or absence of the improper image by only confirming the identification image C4, and can easily set the measurement condition on the basis of the confirmation.

Figure 18B:
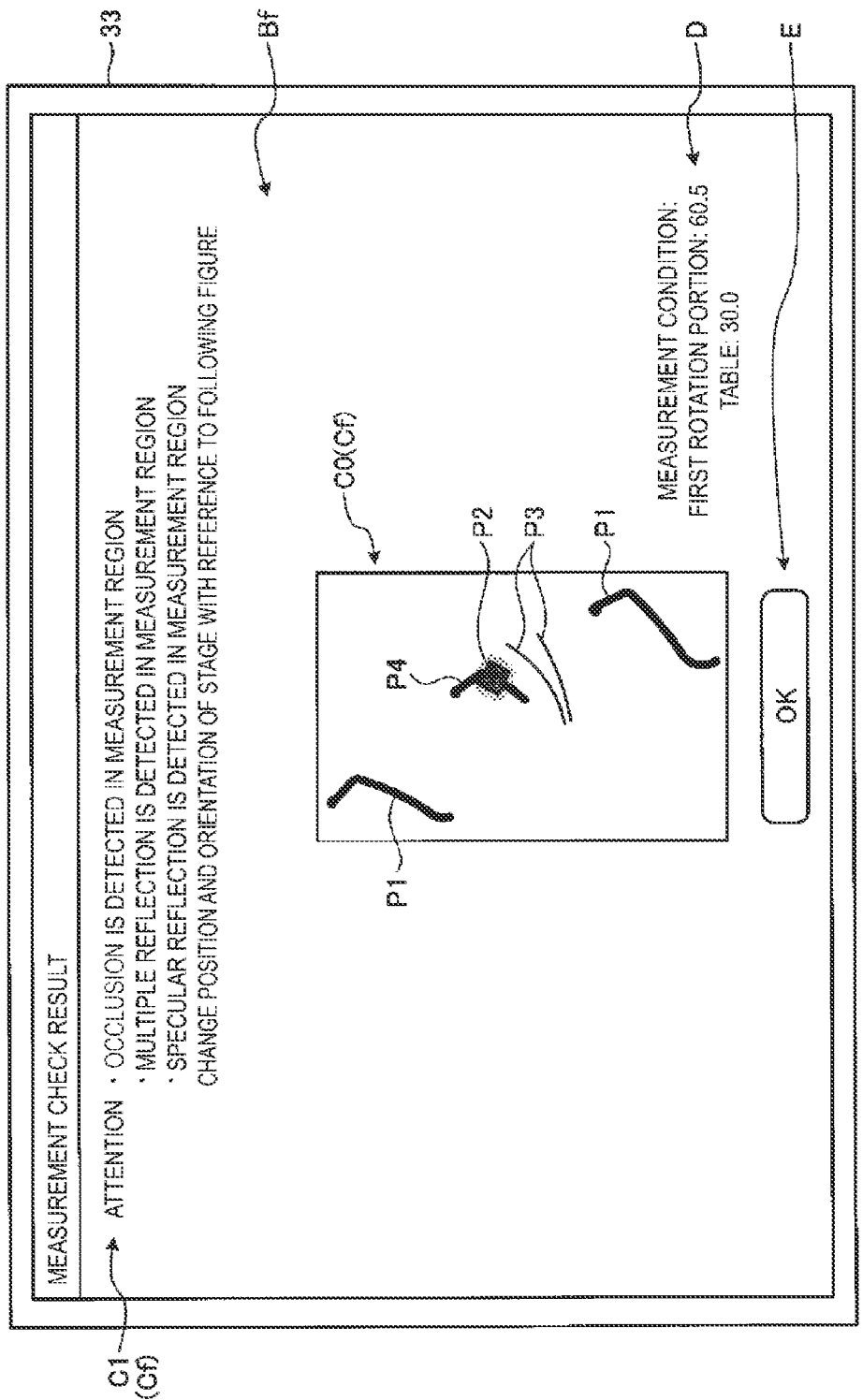
FIG. 18B is a view illustrating an example of a measurement check result screen according to a modification of the first embodiment.

Additionally, in a case where a reproduced image C0 is displayed as indicated in the measurement check result screen Bf according to the modification illustrated in FIG. 18B, the output unit 88 may not display the identification image C4. An operator can confirm whether the improper image is detected by only confirming the reproduced image C0, and can easily set the measurement condition on the basis of the confirmation.

Additionally, in the description above, the reproduced image C0 is an image in which both of the improper image and the proper image are displayed. However, as indicated in a reproduced image C0f of FIG. 18C, a reproduced image may be an image in which only the improper image is displayed without displaying the proper image. Similarly, in this case, an operator can confirm from the reproduced image C0f whether the improper image is detected, and can easily set the measurement condition on the basis of the confirmation.

Figure 18C:
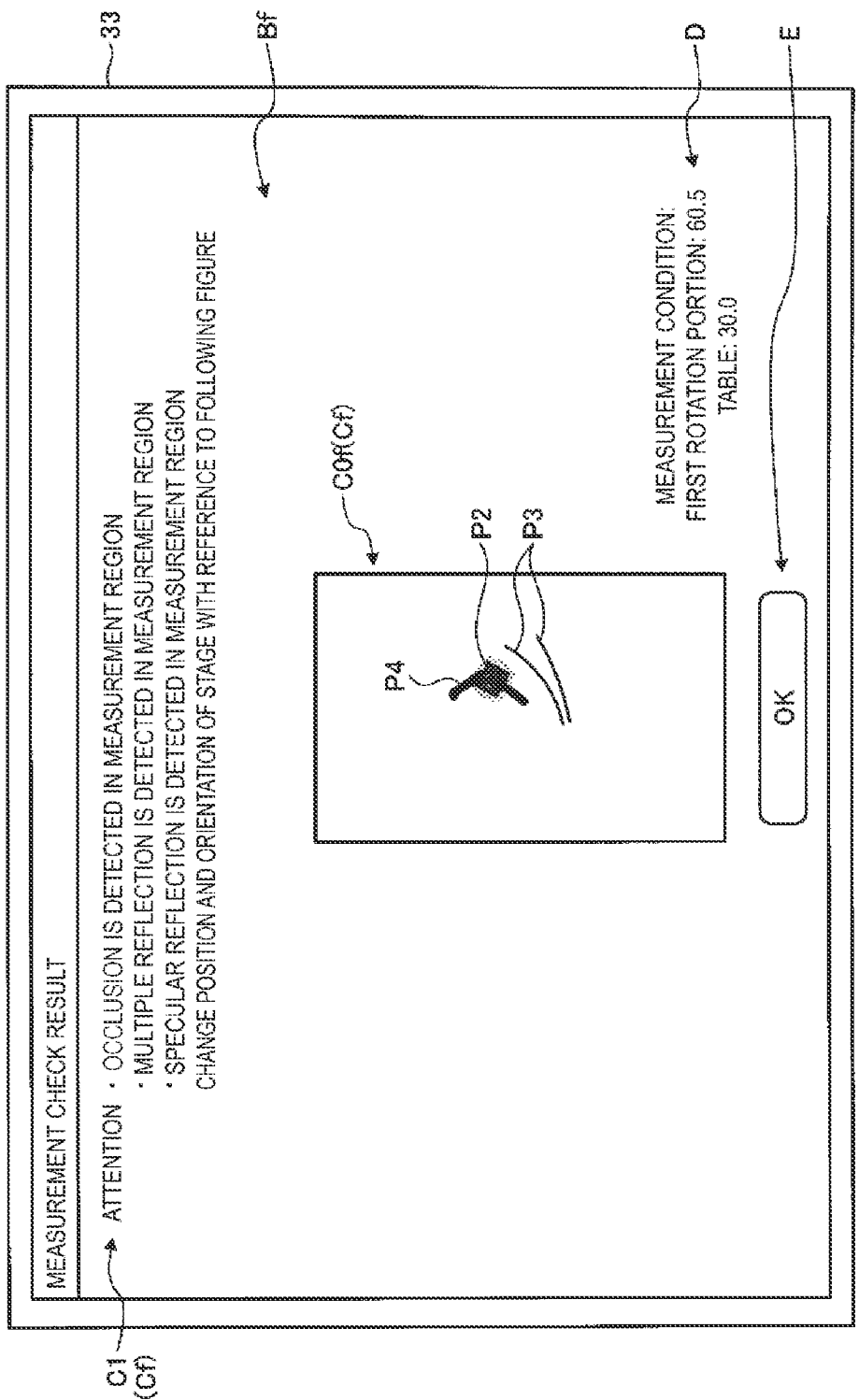
FIG. 18C is a view illustrating an example of a measurement check result screen according to a modification of the first embodiment.

In the case of FIG. 18C, an image analyzer 83 generates image data indicating the improper image, and the output unit 88 outputs the image data to the display 33 as detection result information such that an image (reproduced image C0f) indicating the improper image is displayed in the display 33. According to the controller 36, an image indicating the improper image can be communicated to an operator, and the operator can easily determine whether a setting condition is proper. The image data indicating the improper image described here may be image data indicating the improper image detected as the improper image by the detection unit 86, or may be image data indicating the improper image evaluated as the improper image by the detection unit 86. That is, in the case of the image data indicating the improper image detected as the improper image by the detection unit 86, the reproduced image C0f displays, for example, the specular reflected light image P2 and the multiple reflected light image P3 as the improper images. On the other hand, in the case of the image data indicating the improper image evaluated as the improper image by the detection unit 86, the reproduced image C0f displays, for example, the specular reflected light image P2, the multiple reflected light image P3, and the occlusion image P4 as the improper images.

Additionally, in a case where both the improper image and the proper image are present in the reproduced image C0, the image analyzer 83 generates image data indicating the proper image in addition to the improper image, on the basis of the design information and the measurement condition as described in the first embodiment. The output unit 88 outputs the image data as the detection result information to the display 33 such that an image (reproduced image C0) indicating the improper image and the proper image is displayed in the display 33. The controller 36 can communicate the image indicating the improper image and the proper image to an operator, and the operator can more easily determine whether a setting condition is proper.

Additionally, the output unit 88 outputs identification information identifying the improper image and the proper image as the detection result information to the display 33. According to the controller 36, an operator visually recognizes the identification image C4 displaying the identification information, and thus, the operator can more suitably recognize the improper image, and can more easily determine whether a setting condition is proper.

Additionally, the output unit 88 outputs identification information identifying a plurality of types of improper images as the detection result information to the display 33. According to the controller 36, an operator visually recognizes the identification image C4 displaying the identification information, and thus, the operator can more suitably recognize what kind of improper image is present, and can more easily determine whether a setting condition is proper.

Additionally, the reproduced images C0 and Cf can be considered to be images indicating the improper image in an imaging region PR. That is, the image analyzer 83 generates data indicating the improper image in the imaging region PR as image data. Note that the imaging region PR is considered to be a region where an image of light projected onto the object to be measured M is captured under the measurement condition. According to the controller 36, since the image in the imaging region PR is set to be the reproduced images C0 and Cf, reproduction accuracy of the reproduced images C0 and Cf can be increased, and an operator can more suitably determine whether a setting condition is proper.

Figure 19:
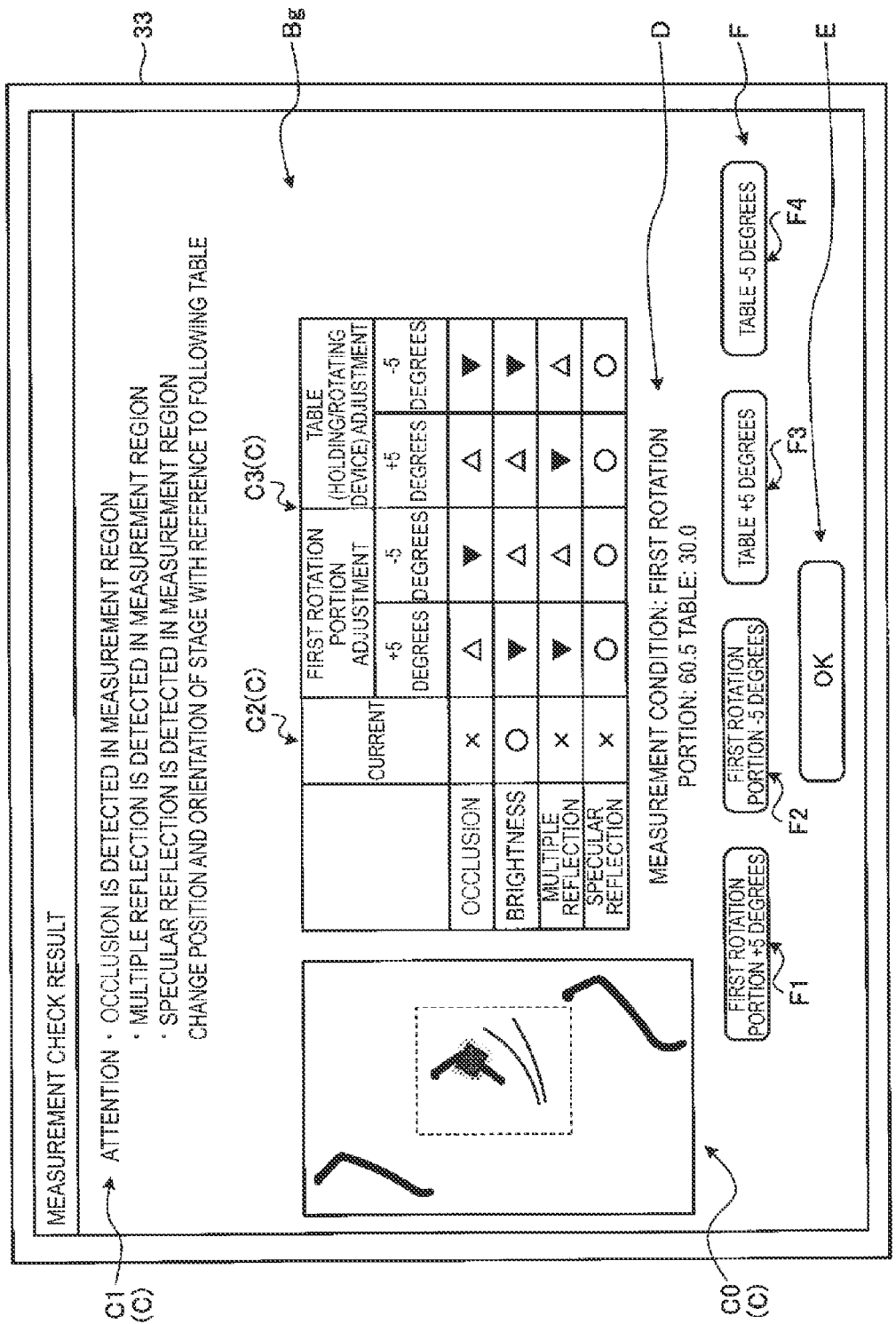
FIG. 19 is a view illustrating an example of a measurement check result screen according to a modification of the first embodiment.

Additionally, the output unit 88 causes a switch image F to be further displayed on a measurement check result screen Bg according to the modification illustrated in FIG. 19. The switch image F is display for switching to the detection result information in a case where the measurement condition is changed, as displayed in the change image C3a. In the example of FIG. 19, the switch image F includes a switch image F1, a switch image F2, a switch image F3, and a switch image F4. In a case where an input unit 32 includes a mouse, an operator operates the input unit 32 to superimpose a mouse cursor on one of the switch images F1, F2, F3, and F4 on the screen of the display 33. An operator clicks a mouse button in a state where the cursor is superimposed on one of the switch images F1, F2, F3, and F4, and thus selects one of the switch images F1, F2, F3, and F4. Additionally, in a case where the display 33 is a touch panel, an operator touches a position at which one of the switch images F1, F2, F3, and F4 is displayed, on the display screen of the display 33, and thus, selects one of the switch images F1, F2, F3, and F4.

Figure 20:
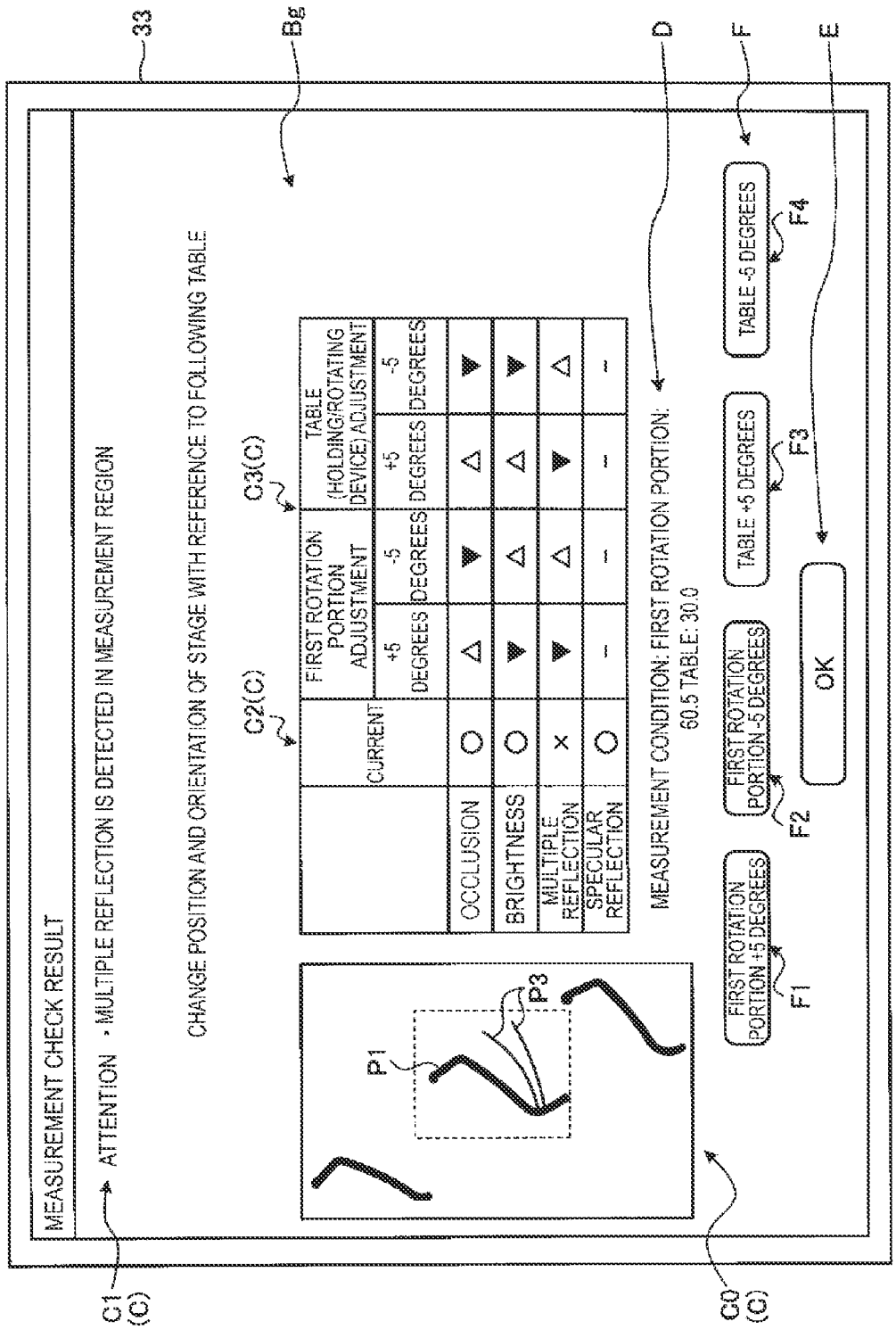
FIG. 20 is a view illustrating an example of a measurement check result screen according to a modification of the first embodiment.

When an operator selects the switch image F, the controller 36 acquires detection result information under a measurement condition specified with the switch image F from the detection unit 86. The output unit 88 outputs the detection result information under the measurement condition specified with the switch image F to the display 33. Thus, as illustrated in FIG. 20, the output unit 88 switches the measurement check result screen Bg to the measurement check result screen Bg indicating the detection result information under the measurement condition specified with the switch image F. In the present embodiment, when an operator selects the switch image F1, the output unit 88 causes the display 33 to display the detection result information under a measurement condition in which the angle of the first rotation portion 53 is changed by +5 degrees. Additionally, when an operator selects the switch image F2, the output unit 88 causes the display 33 to display the detection result information under a measurement condition in which the angle of the first rotation portion 53 is changed by −5 degrees. Additionally, when an operator selects the switch image F3, the output unit 88 causes the display 33 to display the detection result information under a measurement condition in which the angle of the table 71 is changed by +5 degrees. Additionally, when an operator selects the switch image F4, the output unit 88 causes the display 33 to display the detection result information under a measurement condition in which the angle of the table 71 is changed by −5 degrees.

FIG. 20 illustrates the measurement check result screen Bg displaying the detection result information under the measurement condition in which the angle of the first rotation portion 53 is changed by +5 degrees when an operator selects the switch image F1. As illustrated in FIG. 20, the measurement check result screen Bg switched displays the detection result image C and a measurement condition image D in the case of changing the angle of the first rotation portion 53 by +5 degrees with respect to FIG. 19. The detection result image C, here, the reproduced image C0, a detection result notification image C1, an evaluation result image C2, and a change image C3 switch to information in the case of changing the angle of the first rotation portion 53 by +5 degrees. In the example of FIG. 20, the measurement condition of FIG. 19 is switched such that the occlusion image P4 and the specular reflected light image P2 are evaluated as not being the improper images. That is, the detection result notification image C1 of FIG. 20 includes display of "multiple reflection is detected in the measurement region." Additionally, with respect to the evaluation result image C2 of FIG. 19, the evaluation result image C2 of FIG. 20 includes display of a indicating that the occlusion image P4 ("occlusion" in FIG. 20) and the specular reflected light image P2 ("specular reflection" in FIG. 20) are not the improper images. Additionally, in the change image C3 of FIG. 20, in any of a case where the angle of the first rotation portion 53 is changed by +5 degrees from the state of FIG. 20, a case where the angle of the first rotation portion 53 is changed by −5 degrees from the state of FIG. 20, a case where the angle of the table 71 is changed by +5 degrees from the state of FIG. 20, and a case where the angle of the table 71 is changed by −5 degrees from the state of FIG. 20, an influence level V1 for the specular reflected light image P2 is zero, and there is no possibility that the specular reflected light image P2 is determined as the improper image. However, since the influence level V1 is also zero under the measurement condition illustrated in FIG. 20, - is displayed to indicate that there is no change.

Additionally, in FIG. 20, in the reproduced image C0, the occlusion image P4 and the specular reflected light image P2 are images that are not displayed as the improper images. Then, the measurement condition image D illustrated in FIG. 20 is displayed such that the angle of the first rotation portion 53 is switched to 65.5 degrees. Additionally, when the switch image F is selected on the screen illustrated in FIG. 20, the screen is switched to the measurement check result screen Bg in a case where the measurement condition is further changed. In this manner, in a case where the input unit 32 receives an input for changing the measurement condition in a state where the detection result image C is displayed, the output unit 88 switches the displayed detection result information (detection result image C) to the detection result information in a case where the measurement condition is changed. Thus, an operator can easily confirm the detection result information for each measurement condition, and can easily set the measurement condition. Note that the controller 36 may derive in advance the detection result and the evaluation result in a case where the measurement condition is changed, or may derive the detection result and the evaluation result by analysis each time an instruction to change the measurement condition is received. Note that the modifications illustrated in FIGS. 13 to 20 described above can also be applied to second and third embodiments described below.

Second Embodiment

Next, a second embodiment will be described. An analysis device 4A according to the second embodiment differs from the first embodiment in that the analysis device 4A does not have a function of controlling a shape measurement device 1. In the second embodiment, description of a configuration common to the first embodiment will be omitted. Additionally, the modifications described with reference to FIGS. 13 to 20 can be applied to the analysis device 4A according to the second embodiment, in other words, the analysis device 4A may display any of the measurement check result screens Ba, Bb, Bc, Bd, Be, Bf, and Bg described with reference to FIGS. 13 to 20.

Figure 21:
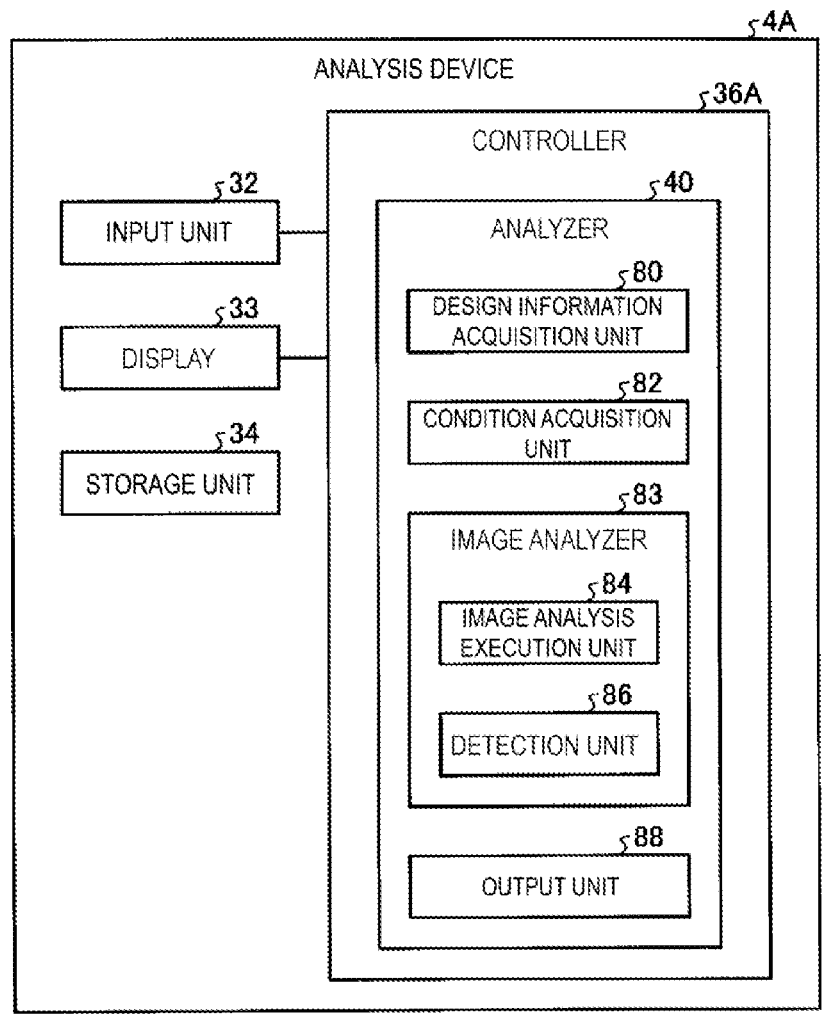
FIG. 21 is a block diagram of an analysis device according to a second embodiment.

FIG. 21 is a block diagram of the analysis device 4A according to the second embodiment. The analysis device 4A includes an input unit 32, a display 33, a storage unit 34, and a controller 36A. The controller 36A includes an analyzer 40, but unlike the controller 36 of the first embodiment, does not include the measurement controller 38. The analysis device 4A is a computer that is not connected to the shape measurement device 1, but may be a computer connected to the shape measurement device 1. The analysis device 4A does not include the measurement controller 38 and thus, does not control the shape measurement device 1, but includes the analyzer 40 that executes the same processing as the analyzer 40 of the first embodiment. Accordingly, even when the analysis device 4A (image analysis device) according to the second embodiment is used, as with the first embodiment, a measurement condition that enables accurate shape measurement can be set easily. Note that in this case, a computer including the measurement controller 38 is provided separately from the analysis device 4A.

Third Embodiment

Next, a third embodiment will be described. An analysis device 4 according to the third embodiment differs from the first embodiment in that an initial condition of a measurement condition in performing analysis is set in advance. In the third embodiment, description of a configuration common to the first embodiment will be omitted. As described in the second embodiment, the analysis device 4 according to the third embodiment may not include the measurement controller 38. Additionally, the modifications described with reference to FIGS. 13 to 20 can be applied to the analysis device 4 according to the third embodiment, in other words, the analysis device 4 according to the third embodiment may display any of the measurement check result screens Ba, Bb, Bc, Bd, Be, B, and Bg described with reference to FIGS. 13 to 20.

Figure 22:
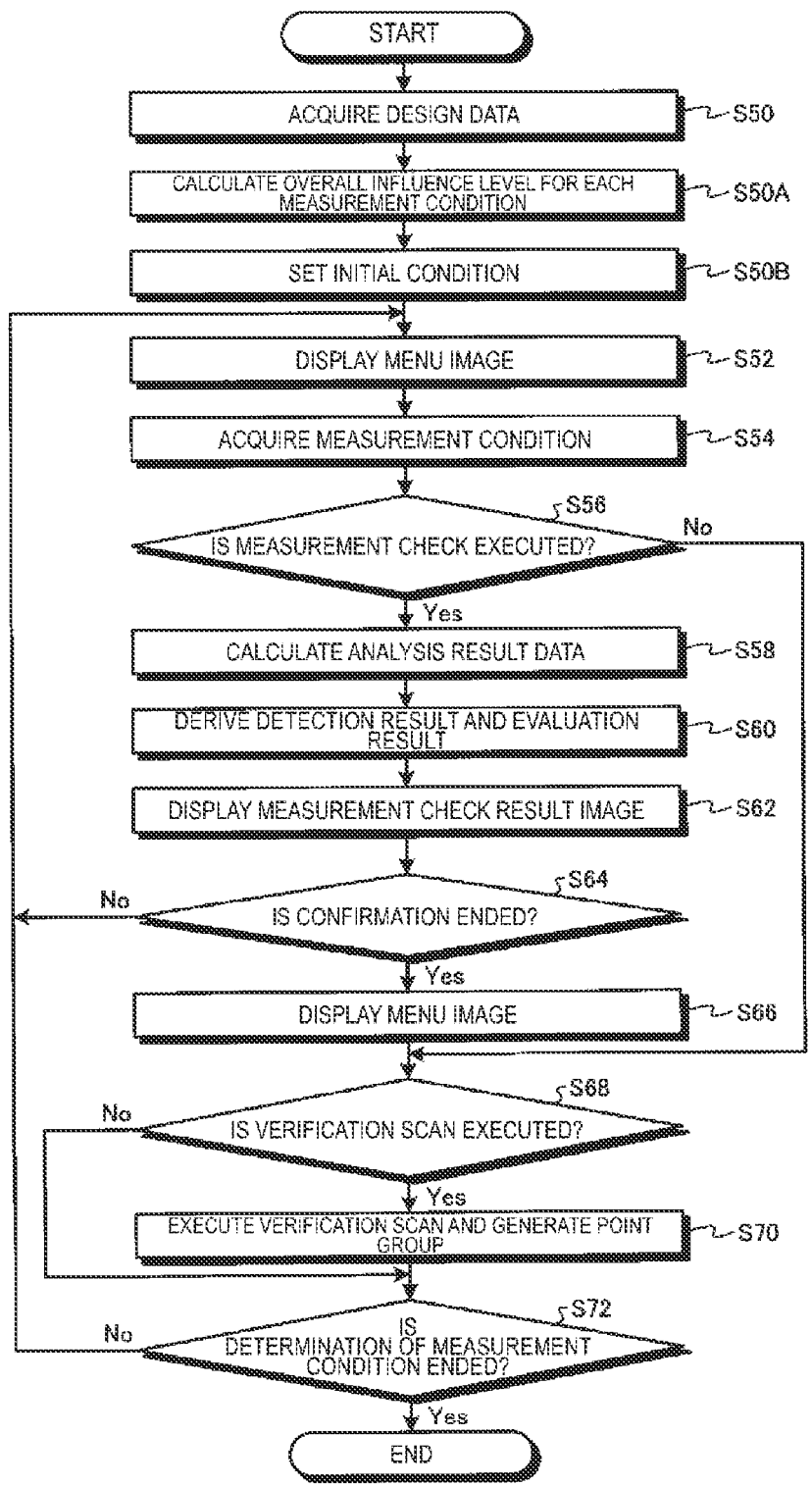
FIG. 22 is an explanatory flowchart of a flow in setting a measurement condition according to a third embodiment.

FIG. 22 is an explanatory flowchart of a flow in setting the measurement condition according to the third embodiment. As illustrated in FIG. 22, in setting the measurement condition, a controller 36 acquires design information on an object to be measured M by a design information acquisition unit 80 (step S50). Then, the controller 36 according to the third embodiment calculates an overall influence level V for each measurement condition (step S50A). Hereinafter, the overall influence level V will be described.

Before executing analysis under a measurement condition determined by an operator by teaching, a detection unit 86 according to the third embodiment executes the analysis illustrated in FIG. 6 under a preset measurement condition and calculates analysis result data. Then, the detection unit 86 derives a detection result on the basis of the analysis result data, and executes the processing from step S32 to step S38 of FIG. 7 to calculates influence levels V1, V2, V3, and V4 on the basis of the detection result. Then, the detection unit 86 calculates the overall influence level V on the basis of the influence levels V1, V2, V3, and V4. The overall influence level V is an influence level in consideration of all of the influence levels V1, V2, V3, and V4, and is a total value of the influence levels V1, V2, V3, and V4 individually weighted. The detection unit 86 calculates the overall influence level V according to Formula (5) below. The detection unit 86 calculates the overall influence level V for each preset measurement condition.

$$V=\{1/(1+V1)^{W1}\}\cdot\{1/(1+V2)^{W2}\}\cdot V3^{W3}\cdot V4^{W4}$$

Here, each of W1, W2, W3, and W4 is a uniquely set constant. In this manner, the overall influence level V decreases as the influence level V1 and the influence level V2 increase, and the overall influence level V increases as the influence level V3 and the influence level V4 increase. Accordingly, the overall influence level V having a larger value means that there is less possibility that it is evaluated that the improper image is present.

Then, the controller 36 according to the third embodiment sets an initial condition of a measurement condition on the basis of the overall influence level V for each measurement condition (step S50B), and displays a menu image A (step S52). The controller 36 sets, as the initial measurement condition of the measurement condition, a measurement condition under which the overall influence level V becomes highest among the overall influence levels V for respective measurement conditions. The processing at step S52 and subsequent steps are the same as in the first embodiment. In the first embodiment, the controller 36 does not set the measurement condition, and an operator determines the measurement condition by teaching. In contrast, in the third embodiment, the measurement condition under which the overall influence level V becomes the highest is set as the initial condition by analysis. Accordingly, an operator can acquire a measurement condition under which there is less possibility that it is evaluated that the improper image is present, as the initial condition. Thus, an operator can set the measurement condition more easily. Note that in the third embodiment, when measurement check is executed under the initial condition, a detection result under the initial condition is displayed in a display 33. Accordingly, since an operator can confirm each influence level V0, the operator can set the measurement condition more accurately. Note that similarly, in the third embodiment, since an operator can set the measurement condition at step S54, the measurement condition can be changed from the initial condition even before or after the start of analysis.

In this manner, an image analyzer 83 according to the third embodiment calculates the overall influence level V in consideration of the influence level V0 of the improper image on the proper image, for each of different measurement conditions, and defines, as the initial condition of the measurement condition, a measurement condition under which the overall influence level V becomes lowest among the different measurement conditions. Accordingly, according to the controller 36, default measurement condition, that is, the initial condition can be set properly.

Figure 23:
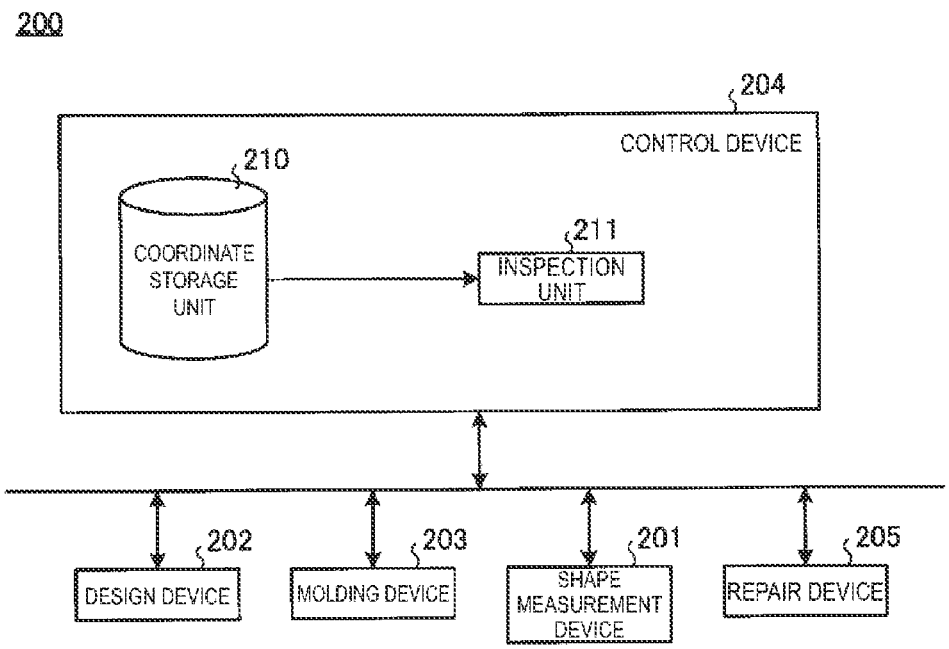
FIG. 23 is a block configuration diagram of a structure manufacturing system.

Next, a structure manufacturing system provided with the shape measurement device described above will be described with reference to FIG. 23. FIG. 23 is a block configuration diagram of a structure manufacturing system 200. The structure manufacturing system 200 according to the present embodiment includes a shape measurement device 201 as described in the above-described embodiments, a design device 202, a molding device 203, a control device (inspection device) 204, and a repair device 205. The control device 204 includes a coordinate storage unit 210 and an inspection unit 211.

The design device 202 creates design information on a shape of a structure, and transmits the created design information to the molding device 203. Additionally, the design device 202 causes the coordinate storage unit 210 of the control device 204 to store the created design information. The design information includes information indicating coordinates of each position of the structure.

The molding device 203 creates the above-described structure on the basis of the design information input from the design device 202. Molding of the molding device 203 includes, for example, casting, forging, cutting, and the like. The shape measurement device 201 measures coordinates of the created structure (object to be measured), and transmits information (shape information) indicating the measured coordinates to the control device 204.

The coordinate storage unit 210 of the control device 204 stores the design information. The inspection unit 211 of the control device 204 reads the design information from the coordinate storage unit 210. The inspection unit 211 compares the information (shape information) indicating the coordinates received from the shape measurement device 201 with the design information read from the coordinate storage unit 210. On the basis of a comparison result, the inspection unit 211 determines whether the structure is molded according to the design information. In other words, the inspection unit 211 determines whether the created structure is non-defective. In a case where the structure is not molded according to the design information, the inspection unit 211 determines whether the structure is repairable. In a case where the structure is repairable, the inspection unit 211 calculates a defect site and an amount of repair on the basis of the comparison result, and transmits information indicating the defect site and information indicating the amount of repair to the repair device 205.

The repair device 205 processes the defect site of the structure on the basis of the information indicating the defect site and the information indicating the amount of repair that are received from the control device 204.

Figure 24:
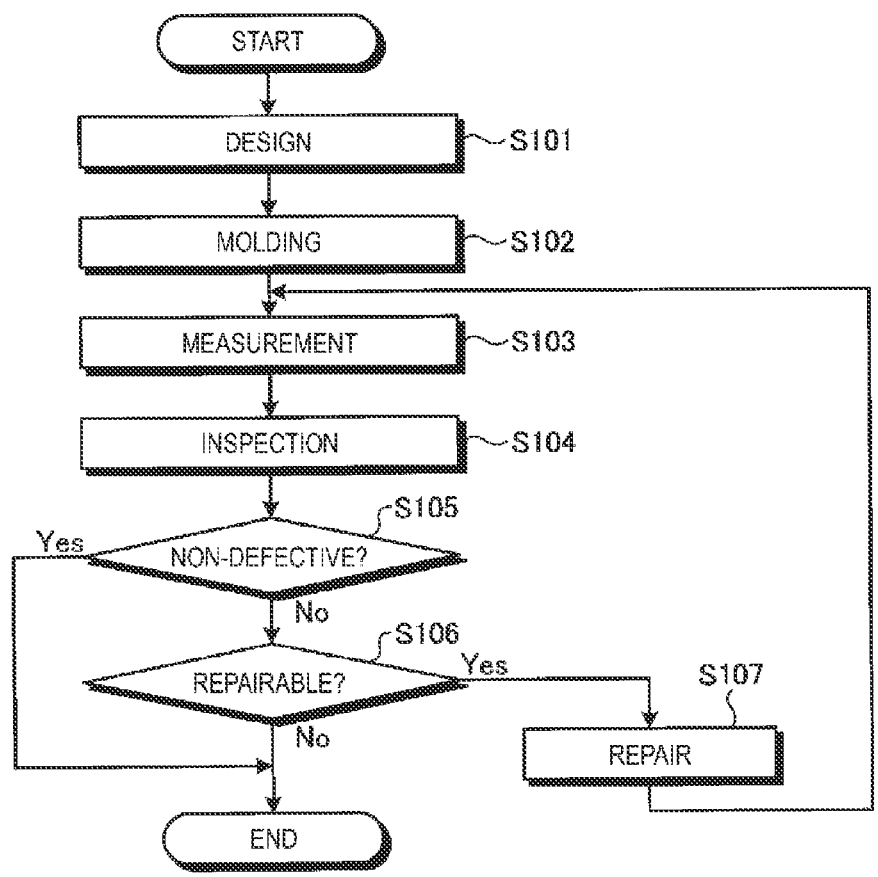
FIG. 24 is a flowchart illustrating a flow of processing performed by the structure manufacturing system.

FIG. 24 is a flowchart illustrating a flow of processing performed by the structure manufacturing system 200. First, in the structure manufacturing system 200, the design device 202 creates design information on a shape of a structure (step S101). Next, the molding device 203 creates the above-described structure on the basis of the design information (step S102). Next, the shape measurement device 201 measures a shape of the above-described created structure (step S103). Next, the inspection unit 211 of the control device 204 compares shape information acquired by the shape measurement device 201 with the above-described design information to inspect whether the structure is created according to the design information (step S104).

Next, the inspection unit 211 of the control device 204 determines whether the created structure is non-defective (step S105). In a case where the inspection unit 211 determines that the created structure is non-defective (step S105, YES), the structure manufacturing system 200 ends the processing. Additionally, in a case where the inspection unit 211 determines that the created structure is not non-defective (step S105, NO), the inspection unit 211 determines whether the created structure is repairable (step S106).

In the structure manufacturing system 200, in a case where the inspection unit 211 determines that the created structure is repairable (step S106, Yes), the repair device 205 reprocesses the structure (step S107) and the processing returns to the processing at step S103. In a case where the inspection unit 211 determines that the created structure is not repairable (step S106, No), the structure manufacturing system 200 ends the processing. Then, the structure manufacturing system 200 ends the processing of the flowchart illustrated in FIG. 24.

Since the shape measurement device 201 of the above-described embodiment can accurately measure coordinates of a structure, the structure manufacturing system 200 according to the present embodiment can determines whether a created structure is non-defective. Additionally, the structure manufacturing system 200 can reprocess and repair a structure in a case where the structure is not non-defective.

Note that the repair step executed by the repair device 205 in the present embodiment may be replaced with the step of executing the molding step by the molding device 203 again. At this time, in a case where the inspection unit 211 of the control device 204 determines that a structure is repairable, the molding device 203 executes the molding step (forging, cutting, and the like) again. Specifically, for example, the molding device 203 cuts a location in the structure that is originally to be cut and has not been cut. Thus, the structure manufacturing system 200 can accurately create a structure.

The present embodiments are described with reference to the accompanying drawings, but a shape, a combination, and the like of each of the constituent members described in the above-described examples are examples, and various modifications can be made without departing from the spirit of the present embodiments, on the basis of design requirements and the like.

For example, the shape measurement device 1 in the above-described embodiments includes the configuration where the holding member 55 holds the optical probe 3 in cantilevered manner. However, the embodiment is not limited to this, and the holding member may hold the optical probe on both sides. The holding member holds the optical probe on both sides, and thus, deformation of the holding member 55 during rotation can be reduced, and improvement of measurement accuracy can be achieved.

Additionally, in the embodiments described above, linear light is projected as the measurement light L from the optical probe 3, and an image of the measurement light reflected on the object to be measured is captured. However, the form of the optical probe 3 is not limited to this. A predetermined plane may be irradiated at once with illumination light emitted from the optical probe 3. For example, a method described in U.S. Pat. No. 6,075,605 may be used. The illumination light emitted from the optical probe may be point-like spot light.

Additionally, as with the above embodiments, the shape measurement device can be used suitably for measuring a shape of an object to be measured that has repeating shapes in the circumferential direction and irregularities extending in the direction different from the circumferential direction. In the shape measurement device, the measurement range, the light control region settable range, and a light control region may be set for one of the repeating shapes, and the set conditions can be used to measure the rest of the repeating shapes. Note that the object to be measured is not limited to an object that has repeating shapes in the circumferential direction and irregularities extending in the direction different from the circumferential direction, and may have various shapes, for example, a shape without the repeating shapes.

Note that in the embodiment described above, the shape measurement device 1 is a device that measures the three-dimensional shape of the object to be measured M by using the optical cutting method; however, the shape measurement device 1 is not limited to the device using the optical cutting method, and can be applied to a shape measurement device that receives light from the object to be measured M (for example, from an image of the object to be measured M) and measures a shape of the object to be measured M. For example, the shape measurement device 1 can be applied to an existing shape measurement device such as an existing shape measurement device that measures a three-dimensional shape of the object to be measured M from an image obtained by projecting stripe or dot-shaped pattern light onto the object to be measured M, and an existing image measuring device that measures a two-dimensional shape (dimension) of the object to be measured M from an image of the object to be measured M. Additionally, the shape measurement device 1 can also be applied to an existing inspection device and an existing measurement device other than a shape measurement device.

The invention claimed is:

1. An image analysis device comprising:
   at least one or more processors comprising:
   an image analyzer configured to analyze an image to be captured based on design information of an object to be measured and a measurement condition, the image to be captured being associated with an image of a light projected onto the object to be measured that is to be captured; and
   an output unit configured to output result information, the result information being based on an analyzing result of the image analyzer, and the result information including information of an improper image for a shape measurement of the object to be measured,
   wherein the image analyzer is further configured to generate change information regarding a change in an evaluation result of the improper image, the change in the evaluation result of the improper image being associated with a situation in which the measurement condition is to be changed, and
   wherein the output unit is further configured to output the change information generated by the image analyzer.

2. The image analysis device according to claim 1, wherein
   the image analyzed by the image analyzer includes the improper image for the shape measurement of the object to be measured and a proper image for shape measurement of the object to be measured,
   the image analyzer is configured to evaluate the improper image based on at least one of a relative distance between the improper image and the proper image and a luminance of the improper image, and
   the output unit is configured to output an evaluation result of the improper image as the result information of the improper image for the shape measurement.

3. The image analysis device according to claim 2, wherein the image analyzer is configured to evaluate the improper image based on a relative distance between the improper image and the proper image and a luminance of the improper image.

4. The image analysis device according to claim 1, wherein the image analyzer is configured to calculate the change in the evaluation result of the improper image, wherein the change in the evaluation result of the improper image is associated with a situation in which the measurement condition is to be changed.

5. The image analysis device according claim 1, wherein the output unit is configured to output image data indicating the improper image as the result information, such that an image indicating the improper image is displayed.

6. The image analysis device according to claim 5, wherein the output unit is configured to output image data indicating the improper image and a proper image for shape measurement of the object to be measured as the result information, such that an image indicating the improper image and the proper image is displayed.

7. The image analysis device according to claim 6, wherein the output unit is configured to output identification information identifying the improper image and the proper image, as the result information.

8. The image analysis device according to claim 5, wherein the output unit is configured to output identification information identifying a plurality of types of the improper images, as the result information.

9. The image analysis device according to claim 1, wherein, in response to the result information being displayed and an input unit receiving an input indicating a change in the measurement condition, the output unit is configured to switch the result information displayed to the result information generated, wherein the result information generated is associated with a situation in which the measurement condition is to be changed.

10. The image analysis device according to claim 1, wherein the output unit is configured to display, on a screen displaying the result information, a captured image captured by an imager under the measurement condition, the captured image being an actual image of measurement light projected onto the object to be measured.

11. The image analysis device according to claim 1, wherein the image analyzer includes an image analysis execution unit and a detection unit, wherein the image analysis execution unit is configured to calculate an intensity distribution of the image of the light projected onto the object to be measured, and the detection unit is configured to detect the improper image by the intensity distribution calculated by the image analysis execution unit.

12. The image analysis device according to claim 11, wherein the detection unit is configured to detect the improper image from images other than an image of diffuse reflected light of the light reflected once on the object to be measured based on the intensity distribution.

13. The image analysis device according to claim 1, wherein the measurement condition includes at least one of a relative position of a projector configured to project a light onto the object to be measured or an imager configured to image an image of a light projected onto the object to be measured and the object to be measured, a relative attitude of the projector or the imager and the object to be measured, intensity of a light with which the object to be measured is irradiated, exposure time of the imager, and a measurement region used for shape measurement of the object to be measured in an imaging region of the imager.

14. The image analysis device according to claim 13, wherein the measurement condition includes the relative position and the relative attitude.

15. The image analysis device according to claim 1, wherein the improper image includes at least one of an image generated by multiple reflection, an image generated by specular reflection, an image generated by occlusion, and an image of light having intensity out of a predetermined range among images of diffuse reflected light reflected once.

16. The image analysis device according claim 1, wherein the output unit is configured to output the result information to a display.

17. An analysis device comprising:
the image analysis device according to claim 1; and
a display configured to display the result information.

18. A shape measurement device comprising:
the analysis device according to claim 17;
an input unit configured to receive an input from an operator;
an optical probe including:
    a projector configured to project a light onto the object to be measured, and
    an imager configured to capture an image of the light projected onto the object to be measured; and
a condition setting unit configured to set the measurement condition by an input to the input unit.

19. The image analysis device according to claim 1, wherein the image analyzer is configured to generate the change information without receiving an instruction for changing the measurement condition by a user.

20. An image analysis method comprising:
an image analysis step of analyzing an image to be captured based on design information of an object to be measured and a measurement condition, the image to be captured being associated with an image of a light projected onto the object to be measured that is to be captured; and
an output step of outputting result information that is information based on an analyzing result at the image analysis step, and the result information including information of an improper image for a shape measurement of the object to be measured,
wherein the image analysis step further includes generating change information regarding a change in an evaluation result of the improper image, the change in the evaluation result of the improper image being associated with a situation in which the measurement condition is to be changed, and
the output step further includes outputting the change information generated in the image analysis step.

21. The image analysis method according to claim 20, wherein the output step includes outputting image data indicating the improper image as the result information such that an image indicating the improper image is displayed.

22. The image analysis method according to claim 20, wherein the output step includes outputting image data indicating the improper image and a proper image for shape measurement of the object to be measured as the result information, such that an image indicating the improper image and the proper image is displayed.

23. The image analysis method according to claim 22, wherein the output step includes outputting identification information identifying the improper image and the proper image as the result information.

24. The image analysis method according to claim 20, wherein the output step includes outputting identification information identifying a plurality of types of improper images as the result information.

25. The image analysis method according to claim 20, wherein, in response to the result information being displayed and an input unit receiving an input indicating a change in the measurement condition, the output step includes switching the result information displayed to the result information generated, wherein the result information generated is associated with a situation in which the measurement condition is to be changed.

26. The image analysis method according claim 20, wherein the output step includes displaying, on a screen displaying the result information, a captured image captured by an imager under the measurement condition, the captured image being an actual image of measurement light projected onto the object to be measured.

27. The image analysis method according to claim 20, wherein the output step includes outputting the result information to a display.

28. A measurement condition determination method comprising:
the image analysis method according to claim 20; and
a measurement condition determination step of determining the measurement condition based on the result information output at the output step.

29. A shape measurement method comprising:
the measurement condition determination method according to claim 28; and
a shape measurement step of performing shape measurement of the object to be measured under the measurement condition determined at the measurement condition determination step.

30. A non-transitory computer-readable medium storing a program causing a computer to execute the image analysis method according to claim 20.

31. The image analysis device according to claim 5, wherein the image analyzer is configured to generate the image data indicating the improper image.

32. The image analysis device according to claim 6, wherein the image analyzer is configured to generate image data indicating the proper image for shape measurement of the object to be measured among images of measurement light projected onto the object to be measured, based on the design information and the measurement condition.

33. The image analysis device according to claim 5, wherein the image analyzer is configured to generate, as the image data, data indicating the improper image in an imaging region in a case that an image generated by a light projected onto the object to be measured has been captured under the measurement condition.

34. The image analysis device according to claim 15, wherein the improper image includes the image generated by the multiple reflection.

35. The image analysis method according to claim 20, wherein the improper image includes an image generated by multiple reflection.

36. The image analysis method according to claim 20, wherein the image analysis step includes generating the change information without receiving an instruction for changing the measurement condition by a user.

37. An analysis device comprising:
at least one or more processors comprising:
an output unit configured to output change information indicating a change in an image to a display, the image being associated with an image of a light projected onto an object to be measured that is to be captured while changing a measurement condition,
wherein the change information is information regarding a change in an evaluation result of an improper image for a shape measurement of the object to be measured assuming that the measurement condition is to be changed.

38. The analysis device according to claim 37, wherein the improper image includes an image generated by multiple reflection.

39. The analysis device according to claim 37, wherein the change information is information generated without receiving an instruction for changing the measurement condition by a user.

* * * * *

UNITED STATES PATENT AND TRADEMARK OFFICE
CERTIFICATE OF CORRECTION

Page 1 of 1

PATENT NO. : 12,140,415 B2
APPLICATION NO. : 16/976054
DATED : November 12, 2024
INVENTOR(S) : Nakano et al.

It is certified that error appears in the above-identified patent and that said Letters Patent is hereby corrected as shown below:

On the Title Page

Item (54) and in the Specification, Column 1, Lines 1-6, "ANALYIS" should read --ANALYSIS--.

In the Claims

Claim 5, Column 71, Line 12, "according claim 1," should read --according to claim 1,--.

Claim 16, Column 72, Line 10, "according claim 1," should read --according to claim 1,--.

Claim 26, Column 73, Line 11, "according claim 20," should read --according to claim 20,--.

Signed and Sealed this
Fourteenth Day of January, 2025

Derrick Brent
*Acting Director of the United States Patent and Trademark Office*